US012332660B2

(12) United States Patent
Giuffrida et al.

(10) Patent No.: US 12,332,660 B2
(45) Date of Patent: Jun. 17, 2025

(54) NAVIGATING UNMANNED AIRCRAFT USING PITCH

(71) Applicant: Eagle View Technologies, Inc., Bothell, WA (US)

(72) Inventors: Frank D. Giuffrida, Honeoye Falls, NY (US); Matthew Finn, Burnsville, MN (US); Glenn Wallace, Redmond, WA (US)

(73) Assignee: Eagle View Technologies, Inc., Rochester, NY (US)

( * ) Notice: Subject to any disclaimer, the term of this patent is extended or adjusted under 35 U.S.C. 154(b) by 432 days.

(21) Appl. No.: 16/691,197

(22) Filed: Nov. 21, 2019

(65) Prior Publication Data

US 2020/0159252 A1    May 21, 2020

Related U.S. Application Data

(60) Provisional application No. 62/770,570, filed on Nov. 21, 2018.

(51) Int. Cl.
*B64U 101/30* (2023.01)
*G05D 1/00* (2006.01)
*H04N 7/18* (2006.01)

(52) U.S. Cl.
CPC .......... *G05D 1/101* (2013.01); *G05D 1/0088* (2013.01); *G05D 1/0094* (2013.01); *H04N 7/185* (2013.01);
(Continued)

(58) Field of Classification Search
CPC .... G05D 1/101; G05D 1/0088; G05D 1/0094; B64C 39/024; B64C 2201/027;
(Continued)

(56) References Cited

U.S. PATENT DOCUMENTS 2,273,876 A    2/1942  Lutz et al.
2,791,151 A    5/1957  Pennington
(Continued)

FOREIGN PATENT DOCUMENTS

AT         331204 T       7/2006
AU       2008230031      11/2009
(Continued)

OTHER PUBLICATIONS

Ackermann, Prospects of Kinematic GPS Aerial Triangulation, ITC Journal, 1992.
(Continued)

*Primary Examiner* — Kito R Robinson
*Assistant Examiner* — Roy Rhee
(74) *Attorney, Agent, or Firm* — DUNLAP CODDING, P.C.

(57) ABSTRACT

Methods and systems for navigating unmanned aircraft to capture images a consistent distance from a surface of a structure, such as a roof, are disclosed, including a system comprising a computer system having one or more processors and one or more non-transitory computer readable medium, the processor(s) executing instructions to cause the one or more processors to: generate unmanned aircraft information including flight path information for capturing images of a roof section having a plane, the flight path information configured to direct an unmanned aircraft to fly a flight path based at least in part on a pitch of the roof section and information from one or more sensor indicative of a location of the roof section, the flight path configured to include waypoints at which the unmanned aircraft captures images at a consistent distance from the plane of the roof section.

8 Claims, 36 Drawing Sheets

(52) U.S. Cl.
CPC ...... *B64U 2101/30* (2023.01); *B64U 2201/10* (2023.01)

(58) Field of Classification Search
CPC ........ B64C 2201/127; B64C 2201/141; B64D 47/08; H04N 7/185
See application file for complete search history.

(56) References Cited

U.S. PATENT DOCUMENTS

| | | |
|---|---|---|
| 3,153,784 A | 10/1964 | Petrides et al. |
| 3,594,556 A | 7/1971 | Edwards |
| 3,614,410 A | 10/1971 | Bailey |
| 3,617,016 A | 11/1971 | Bosley |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 4,964,598 A | 10/1990 | Berejik et al. |
| 5,034,812 A | 7/1991 | Rawlings |
| 5,067,674 A | 11/1991 | Heyche et al. |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,277,380 A | 1/1994 | Cycon et al. |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,372,337 A | 12/1994 | Kress et al. |
| 5,379,105 A | 1/1995 | Iki et al. |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,581,250 A | 12/1996 | Khvilivitzky |
| 5,596,494 A | 1/1997 | Kuo |
| 5,604,534 A | 2/1997 | Hedges et al. |
| 5,617,224 A | 4/1997 | Ichikawa et al. |
| 5,633,946 A | 5/1997 | Lachinski et al. |
| 5,633,995 A | 5/1997 | Mcclain |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,904,724 A | 5/1999 | Margolin |
| 5,936,628 A | 8/1999 | Kitamura et al. |
| 5,963,664 A | 10/1999 | Kumar et al. |
| 5,983,010 A | 11/1999 | Murdock et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,323,885 B1 | 11/2001 | Wiese |
| 6,333,749 B1 | 12/2001 | Reinhardt et al. |
| 6,373,522 B2 | 4/2002 | Mathews et al. |
| 6,385,541 B1 | 5/2002 | Blumberg et al. |
| 6,396,491 B2 | 5/2002 | Watanabe et al. |
| 6,421,610 B1 | 7/2002 | Carroll et al. |
| 6,434,280 B1 | 8/2002 | Peleg et al. |
| 6,446,053 B1 | 9/2002 | Elliott |
| 6,448,964 B1 | 9/2002 | Isaacs et al. |
| 6,496,184 B1 | 12/2002 | Freeman et al. |
| 6,597,818 B2 | 7/2003 | Kumar et al. |
| 6,636,803 B1 | 10/2003 | Hartz, Jr. et al. |
| 6,639,596 B1 | 10/2003 | Shum et al. |
| 6,711,475 B2 | 3/2004 | Murphy |
| 6,731,329 B1 | 5/2004 | Feist et al. |
| 6,741,757 B1 | 5/2004 | Torr et al. |
| 6,742,741 B1 | 6/2004 | Rivoli |
| 6,747,686 B1 | 6/2004 | Bennett |
| 6,760,117 B2 | 7/2004 | Slatter |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,836,270 B2 | 12/2004 | Du |
| 6,847,865 B2 | 1/2005 | Carroll |
| 6,876,763 B2 | 4/2005 | Sorek et al. |
| 6,980,690 B1 | 12/2005 | Taylor et al. |
| 7,003,400 B2 | 2/2006 | Bryant |
| 7,006,977 B1 | 2/2006 | Attra et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |

(56) References Cited

U.S. PATENT DOCUMENTS

| | | |
|---|---|---|
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,130,741 B2 | 10/2006 | Bodin et al. |
| 7,133,551 B2 | 11/2006 | Chen |
| 7,142,984 B2 | 11/2006 | Rahmes et al. |
| 7,184,072 B1 | 2/2007 | Loewen et al. |
| 7,233,691 B2 | 6/2007 | Setterholm |
| 7,262,790 B2 | 8/2007 | Bakewell |
| 7,305,983 B1 | 12/2007 | Meder et al. |
| 7,324,666 B2 | 1/2008 | Zoken et al. |
| 7,327,880 B2 | 2/2008 | Tek |
| 7,333,963 B2 | 2/2008 | Widrow et al. |
| 7,343,268 B2 | 3/2008 | Kishikawa |
| 7,348,895 B2 | 3/2008 | Lagassey |
| 7,373,303 B2 | 5/2008 | Moore et al. |
| 7,376,284 B2 | 5/2008 | Tao et al. |
| 7,424,133 B2 | 9/2008 | Schultz et al. |
| 7,428,337 B2 | 9/2008 | Gao et al. |
| 7,460,214 B2 | 12/2008 | Schiavi |
| 7,487,114 B2 | 2/2009 | Florance et al. |
| 7,500,391 B2 | 3/2009 | Woro |
| 7,509,241 B2 | 3/2009 | Guo |
| 7,519,206 B2 | 4/2009 | Mulet-Parada et al. |
| 7,583,275 B2 | 9/2009 | Neumann et al. |
| 7,584,071 B2 | 9/2009 | Lee |
| 7,639,842 B2 | 12/2009 | Kelle et al. |
| 7,728,833 B2 | 6/2010 | Verma |
| 7,752,018 B2 | 7/2010 | Rahmes et al. |
| 7,787,659 B2 | 8/2010 | Schultz et al. |
| 7,832,267 B2 | 11/2010 | Woro |
| 7,844,499 B2 | 11/2010 | Yahiro |
| 7,869,944 B2 | 1/2011 | Deaton et al. |
| 7,873,238 B2 | 1/2011 | Schultz et al. |
| 7,920,963 B2 | 4/2011 | Jouline et al. |
| 7,922,115 B2 | 4/2011 | Colgren et al. |
| 7,950,579 B2 | 5/2011 | Gray et al. |
| 7,962,296 B2 | 6/2011 | Ashton |
| 7,969,346 B2 | 6/2011 | Franceschini et al. |
| 7,991,226 B2 | 8/2011 | Schultz et al. |
| 7,995,799 B2 | 8/2011 | Schultz et al. |
| 7,995,862 B2 | 8/2011 | Tao et al. |
| 8,051,089 B2 | 11/2011 | Gargi et al. |
| 8,068,643 B2 | 11/2011 | Schultz et al. |
| 8,078,396 B2 | 12/2011 | Meadow |
| 8,078,436 B2 | 12/2011 | Pershing et al. |
| 8,081,798 B2 | 12/2011 | Paglieroni et al. |
| 8,081,841 B2 | 12/2011 | Schultz et al. |
| 8,103,398 B2 | 1/2012 | Duggan et al. |
| 8,106,748 B2 | 1/2012 | Lee |
| 8,131,514 B2 | 3/2012 | Royan et al. |
| 8,145,578 B2 | 3/2012 | Pershing et al. |
| 8,170,840 B2 | 5/2012 | Pershing |
| 8,204,341 B2 | 6/2012 | Schultz et al. |
| 8,209,152 B2 | 6/2012 | Pershing |
| 8,233,666 B2 | 7/2012 | Schultz et al. |
| 8,242,623 B2 | 8/2012 | Lucero et al. |
| 8,346,578 B1 | 1/2013 | Hopkins, III et al. |
| 8,385,672 B2 | 2/2013 | Giuffrida et al. |
| 8,401,222 B2 | 3/2013 | Thornberry et al. |
| 8,417,061 B2 | 4/2013 | Kennedy et al. |
| 8,418,959 B2 | 4/2013 | Kang et al. |
| 8,422,825 B1 | 4/2013 | Neophytou et al. |
| 8,437,554 B2 | 5/2013 | Kim et al. |
| 8,471,854 B2 | 6/2013 | Kelley et al. |
| 8,473,125 B2 | 6/2013 | Rischmuller et al. |
| 8,477,190 B2 | 7/2013 | Giuffrida et al. |
| 8,520,079 B2 | 8/2013 | Schultz et al. |
| 8,531,472 B2 | 9/2013 | Freund et al. |
| 8,538,151 B2 | 9/2013 | Shimamura et al. |
| 8,538,918 B1 | 9/2013 | Pearcy et al. |
| 8,588,547 B2 | 11/2013 | Giuffrida et al. |
| 8,593,518 B2 | 11/2013 | Schultz et al. |
| 8,670,961 B2 | 3/2014 | Pershing et al. |
| 8,705,843 B2 | 4/2014 | Lieckfeldt |
| 8,740,134 B2 | 6/2014 | Suzuki |
| 8,818,572 B1 | 8/2014 | Tofte et al. |
| 8,825,454 B2 | 9/2014 | Pershing et al. |
| 8,874,283 B1 | 10/2014 | Cavote |
| 8,931,144 B2 | 1/2015 | Freeman et al. |
| 8,991,758 B2 | 3/2015 | Earon |
| 9,016,617 B2 | 4/2015 | Wang et al. |
| 9,037,391 B2 | 5/2015 | Meyer |
| 9,135,737 B2 | 9/2015 | Pershing |
| 9,162,753 B1 | 10/2015 | Panto et al. |
| 9,250,630 B2 | 2/2016 | Downey et al. |
| 9,256,225 B2 | 2/2016 | Downey et al. |
| 9,256,994 B2 | 2/2016 | Downey et al. |
| 9,273,981 B1 | 3/2016 | Downey et al. |
| 9,310,221 B1 | 4/2016 | Downey et al. |
| 9,311,760 B2 | 4/2016 | Downey et al. |
| 9,330,504 B2 | 5/2016 | Ege |
| 9,340,283 B1 | 5/2016 | Downey et al. |
| 9,403,593 B2 | 8/2016 | Downey et al. |
| 9,406,237 B2 | 8/2016 | Downey et al. |
| 9,437,033 B2 | 9/2016 | Sun et al. |
| 9,437,044 B2 | 9/2016 | Ege et al. |
| 9,501,760 B2 | 11/2016 | Stanley et al. |
| 9,513,635 B1 | 12/2016 | Bethke et al. |
| 9,588,516 B1 | 3/2017 | Gurel et al. |
| 9,592,912 B1 | 3/2017 | Michini et al. |
| 9,607,522 B2 | 3/2017 | Downey et al. |
| 9,609,288 B1 | 3/2017 | Richman et al. |
| 9,613,538 B1 | 4/2017 | Poole et al. |
| 9,618,940 B1 | 4/2017 | Michini et al. |
| 9,658,619 B1 | 5/2017 | Bethke et al. |
| 9,679,227 B2 | 6/2017 | Taylor et al. |
| 9,851,716 B2 | 12/2017 | Kugelmass |
| 10,430,890 B1 * | 10/2019 | Corder ............... G06V 20/176 |
| 10,984,182 B2 | 4/2021 | Loveland et al. |
| 2002/0010594 A1 | 1/2002 | Levine |
| 2002/0041328 A1 | 4/2002 | LeCompte et al. |
| 2002/0041717 A1 | 4/2002 | Murata et al. |
| 2002/0101594 A1 | 8/2002 | Slatter |
| 2002/0114536 A1 | 8/2002 | Xiong et al. |
| 2002/0143669 A1 | 10/2002 | Scheer |
| 2002/0154174 A1 | 10/2002 | Redlich et al. |
| 2003/0014224 A1 | 1/2003 | Guo et al. |
| 2003/0028393 A1 | 2/2003 | Coulston et al. |
| 2003/0043824 A1 | 3/2003 | Remboski et al. |
| 2003/0088362 A1 | 5/2003 | Melero et al. |
| 2003/0103651 A1 | 6/2003 | Novak |
| 2003/0164962 A1 | 9/2003 | Nims et al. |
| 2003/0171957 A1 | 9/2003 | Watrous |
| 2003/0214585 A1 | 11/2003 | Bakewell |
| 2003/0233310 A1 | 12/2003 | Stavrovski |
| 2004/0105090 A1 | 6/2004 | Schultz et al. |
| 2004/0105573 A1 | 6/2004 | Neumann et al. |
| 2004/0167709 A1 | 8/2004 | Smitherman et al. |
| 2004/0193334 A1 | 9/2004 | Carlsson et al. |
| 2005/0073241 A1 | 4/2005 | Yamauchi et al. |
| 2005/0088251 A1 | 4/2005 | Matsumoto |
| 2005/0129306 A1 | 6/2005 | Wang et al. |
| 2005/0169521 A1 | 8/2005 | Hel-Or |
| 2005/0267657 A1 | 12/2005 | Devdhar |
| 2005/0288959 A1 | 12/2005 | Eraker et al. |
| 2006/0028550 A1 | 2/2006 | Palmer et al. |
| 2006/0061566 A1 | 3/2006 | Verma et al. |
| 2006/0092043 A1 | 5/2006 | Lagassey |
| 2006/0137736 A1 | 6/2006 | Nishitani et al. |
| 2006/0200311 A1 | 9/2006 | Arutunian et al. |
| 2006/0232605 A1 | 10/2006 | Imamura |
| 2006/0238383 A1 | 10/2006 | Kimchi et al. |
| 2006/0250515 A1 | 11/2006 | Koseki et al. |
| 2006/0262112 A1 | 11/2006 | Shimada |
| 2006/0265287 A1 | 11/2006 | Kubo |
| 2007/0024612 A1 | 2/2007 | Balfour |
| 2007/0046448 A1 | 3/2007 | Smitherman |
| 2007/0058850 A1 | 3/2007 | Luo et al. |
| 2007/0179757 A1 | 8/2007 | Simpson |
| 2007/0220174 A1 | 9/2007 | Abhyanker |
| 2007/0237420 A1 | 10/2007 | Steedly et al. |
| 2007/0244608 A1 | 10/2007 | Rath et al. |

(56) References Cited

U.S. PATENT DOCUMENTS

| | | |
|---|---|---|
| 2008/0120031 A1 | 5/2008 | Rosenfeld et al. |
| 2008/0123994 A1 | 5/2008 | Schultz et al. |
| 2008/0125920 A1 | 5/2008 | Miles et al. |
| 2008/0144884 A1 | 6/2008 | Habibi |
| 2008/0158256 A1 | 7/2008 | Russell et al. |
| 2008/0162380 A1 | 7/2008 | Suga et al. |
| 2008/0221843 A1 | 9/2008 | Shenkar et al. |
| 2008/0262789 A1 | 10/2008 | Pershing et al. |
| 2009/0177458 A1 | 7/2009 | Hochart et al. |
| 2009/0208095 A1 | 8/2009 | Zebedin |
| 2009/0254229 A1 | 10/2009 | Nakamura |
| 2009/0259350 A1 | 10/2009 | Morris et al. |
| 2009/0265193 A1 | 10/2009 | Collins et al. |
| 2009/0304227 A1 | 12/2009 | Kennedy et al. |
| 2010/0017114 A1 | 1/2010 | Tehan et al. |
| 2010/0042269 A1 | 2/2010 | Kokkeby et al. |
| 2010/0079267 A1 | 4/2010 | Lin |
| 2010/0100269 A1 | 4/2010 | Ekhaguere |
| 2010/0121574 A1 | 5/2010 | Ariyur et al. |
| 2010/0179787 A2 | 7/2010 | Pershing et al. |
| 2010/0204867 A1 | 8/2010 | Longstaff |
| 2010/0215212 A1 | 8/2010 | Flakes |
| 2010/0228406 A1 | 9/2010 | Hamke |
| 2010/0241406 A1 | 9/2010 | Rahmes et al. |
| 2010/0250022 A1 | 9/2010 | Hines et al. |
| 2010/0286859 A1 | 11/2010 | Feigh et al. |
| 2010/0292871 A1 | 11/2010 | Schultz |
| 2010/0296693 A1 | 11/2010 | Thornberry et al. |
| 2011/0033110 A1 | 2/2011 | Shimamura et al. |
| 2011/0086201 A1 | 4/2011 | Shiao et al. |
| 2011/0096083 A1 | 4/2011 | Schultz |
| 2011/0187713 A1 | 8/2011 | Pershing et al. |
| 2011/0205245 A1 | 8/2011 | Kennedy et al. |
| 2012/0035887 A1 | 2/2012 | Augenbraun et al. |
| 2012/0143482 A1 | 6/2012 | Goossen et al. |
| 2012/0209782 A1 | 8/2012 | Pershing et al. |
| 2012/0224770 A1 | 9/2012 | Strassenburg-Kleciak |
| 2012/0232722 A1 | 9/2012 | Fisher et al. |
| 2012/0280087 A1 | 11/2012 | Coffman |
| 2013/0162822 A1 | 6/2013 | Lee et al. |
| 2013/0202157 A1 | 8/2013 | Pershing |
| 2013/0204575 A1 | 8/2013 | Pershing |
| 2013/0216089 A1 | 8/2013 | Chen et al. |
| 2013/0226515 A1 | 8/2013 | Pershing et al. |
| 2013/0246204 A1 | 9/2013 | Thornberry et al. |
| 2013/0262029 A1 | 10/2013 | Pershing |
| 2013/0277500 A1 | 10/2013 | Miller |
| 2013/0314502 A1 | 11/2013 | Urbach |
| 2013/0317667 A1 | 11/2013 | Kruglick |
| 2013/0346020 A1 | 12/2013 | Pershing |
| 2014/0018979 A1 | 1/2014 | Goossen et al. |
| 2014/0168420 A1 | 6/2014 | Naderhirn et al. |
| 2014/0192193 A1 | 7/2014 | Zufferey et al. |
| 2014/0233863 A1 | 8/2014 | Barrington et al. |
| 2014/0316614 A1 | 10/2014 | Newman |
| 2014/0316616 A1 | 10/2014 | Kugelmass |
| 2015/0022656 A1 | 1/2015 | Carr et al. |
| 2015/0225081 A1 | 8/2015 | Stabler et al. |
| 2015/0227645 A1 | 8/2015 | Childs et al. |
| 2015/0254738 A1 | 9/2015 | Wright et al. |
| 2016/0148363 A1 | 5/2016 | Phan et al. |
| 2016/0187882 A1 | 6/2016 | Downey et al. |
| 2016/0257424 A1 | 9/2016 | Stabler et al. |
| 2016/0285774 A1 | 9/2016 | Downey et al. |
| 2016/0301859 A1 | 10/2016 | Tebay |
| 2016/0307447 A1 | 10/2016 | Johnson et al. |
| 2016/0327950 A1 | 11/2016 | Bachrach et al. |
| 2017/0154535 A1 | 6/2017 | Downey et al. |
| 2017/0192418 A1 | 7/2017 | Bethke et al. |
| 2017/0192424 A1 | 7/2017 | Poole et al. |
| 2017/0193297 A1 | 7/2017 | Michini et al. |
| 2017/0193829 A1* | 7/2017 | Bauer ................. G08G 5/0013 |
| 2017/0199647 A1 | 7/2017 | Richman et al. |
| 2017/0242873 A1 | 8/2017 | Barrow et al. |
| 2018/0156610 A1 | 6/2018 | Zhu et al. |
| 2018/0165503 A1 | 6/2018 | Larson et al. |
| 2018/0165505 A1* | 6/2018 | Loveland ............... G01C 11/02 |
| 2018/0204469 A1 | 7/2018 | Moster et al. |
| 2018/0247121 A1 | 8/2018 | Loveland et al. |
| 2018/0288303 A1 | 10/2018 | Wang et al. |
| 2019/0042829 A1* | 2/2019 | Loveland ............... G09B 9/301 |
| 2019/0118945 A1* | 4/2019 | Loveland ............ G05D 1/0202 |
| 2019/0130768 A1* | 5/2019 | Clark ................... G08G 5/0086 |

FOREIGN PATENT DOCUMENTS

| | | |
|---|---|---|
| BR | 0316110 | 9/2005 |
| CA | 2191954 | 12/1995 |
| CA | 2402234 | 9/2000 |
| CA | 2505566 | 5/2004 |
| CA | 2641373 | 10/2009 |
| CN | 1735897 A | 2/2006 |
| CN | 102194120 | 9/2011 |
| DE | 198 57 667 | 8/2000 |
| DE | 60017384 T | 3/2006 |
| DE | 60306301 T | 11/2006 |
| DK | 1418402 T | 10/2006 |
| EP | 1010966 | 2/1999 |
| EP | 1180967 | 2/2002 |
| EP | 1418402 | 5/2004 |
| EP | 1696204 | 8/2006 |
| EP | 2244150 | 10/2010 |
| EP | 2251883 | 11/2010 |
| EP | 2685336 | 1/2014 |
| ES | 2266704 T | 3/2007 |
| JP | 2000/175183 | 6/2000 |
| JP | 2000/341672 | 12/2000 |
| JP | 2003/317089 A | 11/2003 |
| JP | 2017075863 A | 4/2017 |
| KR | 10-2012-0060340 | 6/2012 |
| MX | PA05004987 | 2/2006 |
| WO | WO99/18732 | 4/1999 |
| WO | WO 1999/018732 | 4/1999 |
| WO | WO 2000/029806 | 5/2000 |
| WO | WO/2000/053090 | 9/2000 |
| WO | WO/2004/044692 | 5/2004 |
| WO | WO/2005/088251 | 9/2005 |
| WO | WO 2005/124276 | 12/2005 |
| WO | WO 2006/040775 | 4/2006 |
| WO | WO 2006/090132 | 8/2006 |
| WO | WO/2008/028040 | 3/2008 |
| WO | WO 2009/046459 | 4/2009 |
| WO | WO 2011/094760 | 8/2011 |
| WO | WO 2013/158202 | 10/2013 |
| WO | WO 2015/102731 | 7/2015 |
| WO | WO 2016/131005 | 8/2016 |
| WO | WO 2017/116860 | 7/2017 |
| WO | WO 2018/204552 | 11/2018 |

OTHER PUBLICATIONS

Ciampa, John A., "Pictometry Digital Video Mapping", SPIE, vol. 2598, pp. 140-148, 1995.

Ciampa, J. A., Oversee, Presented at Reconstruction After Urban earthquakes, Buffalo, NY, 1989.

Dunford et al., Remote Sensing for Rural Development Planning in Africa, The Journal for the International Institute for Aerial Survey and Earth Sciences, 2:99-108, 1983.

Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.

Konecny, G., "Issues of Digital Mapping", Leibniz University Hannover, Germany, GIS Ostrava 2008, Ostrava 27.—Jan. 30, 2008, pp. 1-8.

Konecny, G., "Analytical Aerial Triangulation with Convergent Photography", Department of Surveying Engineering, University of New Brunswick, pp. 37-57, 1966.

Konecny, G., "Interior Orientation and Convergent Photography", Photogrammetric Engineering, pp. 625-634, 1965.

Graham, Lee A., "Airborne Video for Near-Real-Time Vegetation Mapping", Journal of Forestry, 8:28-32, 1993.

(56) References Cited

OTHER PUBLICATIONS

Graham, Horita TRG-50 SMPTE Time-Code Reader, Generator, Window Inserter, 1990.
Hess, L.L, et al., "Geocoded Digital Videography for Validation of Land Cover Mapping in the Amazon Basin", International Journal of Remote Sensing, vol. 23, No. 7, pp. 1527-1555, 2002.
Hinthorne, J., et al., "Image Processing in the Grass GIS", Geoscience and Remote Sensing Symposium, 4:2227-2229, 1991.
Imhof, Ralph K., "Mapping from Oblique Photographs", Manual of Photogrammetry, Chapter 18, 1966.
Jensen, John R., Introductory Digital Image Processing: A Remote Sensing Perspective, Prentice-Hall, 1986; 399 pages.
Lapine, Lewis A., "Practical Photogrammetric Control by Kinematic GPS", GPS World, 1(3):44-49, 1990.
Lapine, Lewis A., Airborne Kinematic GPS Positioning for Photogrammetry—The Determination of the Camera Exposure Station, Silver Spring, MD, 11 pages, at least as early as 2000.
Linden et al., Airborne Video Automated Processing, US Forest Service Internal report, Fort Collins, CO, 1993.
Myhre, Dick, "Airborne Video System Users Guide", USDA Forest Service, Forest Pest Management Applications Group, published by Management Assistance Corporation of America, 6 pages, 1992.
Myhre et al., "An Airborne Video System Developed Within Forest Pest Management—Status and Activities", 10 pages, 1992.
Myhre et al., "Airborne Videography—A Potential Tool for Resource Managers"—Proceedings: Resource Technology 90, 2nd International Symposium on Advanced Technology in Natural Resource Management, 5 pages, 1990.
Myhre et al., Aerial Photography for Forest Pest Management, Proceedings of Second Forest Service Remote Sensing Applications Conference, Slidell, Louisiana, 153-162, 1988.
Myhre et al., "Airborne Video Technology", Forest Pest Management/ Methods Application Group, Fort Collins, CO, pp. 1-6, at least as early as Jul. 30, 2006.
Norton-Griffiths et al., 1982. "Sample surveys from light aircraft combining visual observations and very large scale color photography". University of Arizona Remote Sensing Newsletter 82-2:1-4.
Norton-Griffiths et al., "Aerial Point Sampling for Land Use Surveys", Journal of Biogeography, 15:149-156, 1988.
Novak, Rectification of Digital Imagery, Photogrammetric Engineering and Remote Sensing, 339-344, 1992.
Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.
Slaymaker, et al., "Madagascar Protected Areas Mapped with GPS-logged Aerial Video and 35mm Air Photos", Earth Observation magazine, vol. 9, No. 1, http://www.eomonline.com/Common/ Archives/2000jan/00jan_tableofcontents.html, pp. 1-4, 2000.
Slaymaker, et al., "Cost-effective Determination of Biomass from Aerial Images", Lecture Notes in Computer Science, 1737:67-76, http://portal.acm.org/citation.cfm?id=648004.743267&coll=GUIDE &dl=, 1999.
Slaymaker, et al., "A System for Real-time Generation of Georeferenced Terrain Models", 4232A-08, SPIE Enabling Technologies for Law Enforcement Boston, MA, ftp://vis-ftp.cs.umass.edu/ Papers/schultz/spie2000.pdf, 2000.
Slaymaker, et al.,"Integrating Small Format Aerial Photography, Videography, and a Laser Profiler for Environmental Monitoring", in ISPRS WG III/1 Workshop on Integrated Sensor Calibration and Orientation, Portland, Maine, 1999.
Slaymaker, et al., "Calculating Forest Biomass With Small Format Aerial Photography, Videography and a Profiling Laser", in Proceedings of the 17th Biennial Workshop on Color Photography and Videography in Resource Assessment, Reno, NV, 1999.
Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.
Star et al., "Geographic Information Systems an Introduction", Prentice-Hall, 1990.

Tomasi et al., "Shape and Motion from Image Streams: a Factorization Method"—Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers", Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
Erdas Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", MicroImages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by Applanix aided inertial technology, http://www.applanix.com/products/posav_index.php.
Mostafa, et al., "Ground Accuracy from Directly Georeferenced Imagery", Published in GIM International vol. 14 N. Dec. 12, 2000.
Mostafa, et al., "Airborne Direct Georeferencing of Frame Imagery: An Error Budget", The $3^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.
Hiatt, "Sensor Integration Aids Mapping Ground Zero" Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4, Mar. 2004.
Artes F., & Hutton, J., "GPS and Inertial Navigation Delivering", Sep. 2005, GEOconnexion International Magazine, p. 52-53, Sep. 2005.
"POS AV" Applanix, Product Outline, airborne@applanix.com, 3 pages, Mar. 28, 2007.
POSTrack, "Factsheet", Applanix, Ontario, Canada, www.applanix. com, Mar. 2007.
POS AV "Digital Frame Camera Applications", 3001 Inc., Brochure, 2007.
POS AV "Digital Scanner Applications", Earthdata Brochure, Mar. 2007.
POS AV "Film Camera Applications" AeroMap Brochure, Mar. 2007.
POS AV "Lidar Applications" MD Atlantic Brochure, Mar. 2007.

(56) References Cited

OTHER PUBLICATIONS

POS AV "OEM System Specifications", 2005.
POS AV "Synthetic Aperture Radar Applications", Overview, Orbisat Brochure, Mar. 2007.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9-13, 1990.
Heipke, et al, "Test Goals and Test Set Up for the OEEPE Test—Integrated Sensor Orientation", 1999.
Kumar, et al., "Registration of Video to Georeferenced Imagery", Sarnoff Corporation, CN5300, Princeton, NJ, 1998.
McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region.
"Standards for Digital Orthophotos", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, G., "Mechanische Radialtriangulation mit Konvergentaufnahmen", Bildmessung und Luftbildwesen, 1958, Nr. 1.
Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," *ISP RS Journal of Photogrammetry & Remote Sensing*, 56(I): I-12, Jun. 2001.
Dillow, "Grin, or bare it, for aerial shot," *Orange County Register* (California), Feb. 25, 2001.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.
Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. in 3D," *Orange County Register* (California), Sep. 27, 2000.
Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.
AeroDach® Online Roof Evaluation Standard Delivery Format and 3D Data File: Document Version 01.00.2002 with publication in 2002, 13 pages.
Noronha et al., "Detection and Modeling of Building from Multiple Aerial Images, "Institute for Robotics and Intelligent Systems, University of Southern California, Nov. 27, 2001, 32 pages.
Applicad Reports dated Nov. 25, 1999-Mar. 9, 2005, 50 pages.
Applicad Online Product Bulletin archive from Jan. 7, 2003, 4 pages.
Applicad Sorcerer Guide, Version 3, Sep. 8, 1999, 142 pages.
Xactimate Claims Estimating Software archive from Feb. 12, 2010, 8 pages.
Bignone et al, Automatic Extraction of Generic House Roofs from High Resolution Aerial Imagery, Communication Technology Laboratory, Swiss Federal Institute of Technology ETH, CH-8092 Zurich, Switzerland, 12 pages, 1996.
Geospan 2007 Job proposal.
Greening et al., Commercial Applications of GPS-Assisted Photogrammetry, Presented at GIS/LIS Annual Conference and Exposition, Phoenix, AZ, Oct. 1994.
Applanix Corp, Robust, Precise Position and Orientation Solutions, POS/AV & POS/DG Installation & Operation Manual, Redefining the way you survey, May 19, 1999, Ontario, Canada.
Applanix Corp, Robust, Precise Position and Orientation Solutions, POS/AV V4 Ethernet & Disk Logging ICD, Redefining the way you survey, Revision 3, Apr. 18, 2001, Ontario, Canada.
ardupilot.org, "Mission Planner Overview" [online webpage]; Retrieved from http://ardupilot.org/planner/docs/mission-planner-overview.html; Retrieved Dec. 15, 2016.
ardupilot.org, "Planning a Mission with Waypoints and Events" [online webpage]; Retrieved from http://ardupilot.org/planner/docs/common-planning-a-mission-with-waypoints-and-events.html; Retrieved Dec. 15, 2016.
Australian Government IP Australia, Examination Report No. 1 regarding Australian Patent Application No. 2017206097, dated Jun. 30, 2020.
Brown et al.; "Unmanned Drones—Technical Elegance vs. Political Consequences;" TheSciTechLawyer; vol. 7, No. 1, Summer 2010, American Bar Association.
Calvo, Kike "So You Want to Shoot Aerial Photography Using Drones?"; Mar. 5, 2014; The National Geographic Society; Retrieved from http://voices.nationalgeographic.com/2014/03/05/soyouwant-toshootaerialphotographyusingdrones/, Retrieved on May 5, 2015.
Chesebro, Jonathan; "Unmanned Aircraft Systems (UAS)" [online website article] Retrieved from http://www.trade.gov/static/ aero_rpt_flight_plan_2011_uas.pdf, [Retrieved May 19, 2015].
Cloar et al.; "Unmanned Aerial Systems: Mobility on the Edge;" TheSciTechLawyer; vol. 9, Nos. 3 & 4, Winter Spring 2013, American Bar Association; Retrieved from http://www.americanbar.org/.
Curran, Oisin; "How Drone Cinematography Works"; [Online Article] Retrieved from http://entertainment.howstuffworks.com/dronecinematography5.htm/printable [Retrieved May 5, 2015].
Drone Technology; "RPAS MCFLY-IR;" [Website] Retrieved from http://www.dronetechnology.eu/rpasmcflyir/, Retrieved on Jun. 15, 2015.
Dulo, Donna A.; "Unmanned Aircraft Classifications;" TheSciTechLawyer; vol. 11, No. 4, Summer 2015, American Bar Association.
European Patent Office, Extended European Search Report regarding application EP15734836.8, Jun. 7, 2017.
European Patent Office, Extended European Search Report regarding application EP3391164, Jul. 31, 2019.
Fathi, Habib; "Videogrammetric Roof Surveying Using a Hybrid Structure from Motion Approach"; Georgia Institute of Technology; Dec. 1, 2013; Retrieved from https://smartech.gatech.edu/handle/1853/52972, Retrieved on Dec. 1, 2017.
flylatas.com, Latas Website; Retrieved from http://flylatas.com/ Retrieved on Jun. 2, 2015.
Hanlon, Mike; "Yamaha's RMAX—the worlds most advanced non-military UAV"; Jun. 4, 2004 updated Nov. 19, 2004; Gizmag; Retrieved from http://www.gizmag.com/go/2440/, Retrieved on May 19, 2015.
Johnson, Ted; "Filmmakers Get Permission to Use Drones in the U.S."; Variety; Sep. 25, 2014.
kespry.com, Kespry Aerial Data System [online webpage]; Retrieved from https://web.archive.org/web/20141118185641/http://kespry.com/; Retrieved Dec. 15, 2016.
King, Rachael; "Yamaha Waits for FAA Approval on Agricultural Drone"; CIO Journal; Oct. 16, 2014; Retrieved from http://blogs.wsj.com/cio/2014/10/16/yamahawaitsforfaaap-provalonagriculturaldrone/, Retrieved on May 19, 2015.
knowbeforeyoufly.org, "Know Before You Fly" Brochure; Retrieved from http://knowbeforeyoufly.org/wp-content/uploads/2015/12/KBYF_Brochure_WEB.pdf, Retrieved on May 5, 2015.

(56) References Cited

OTHER PUBLICATIONS knowbeforeyoufly.org, "Know Before You Fly" Website; Retrieved from http://knowbeforeyoufly.org/about-us/, Retrieved onMay 5, 2015.
Korean Intellectual Property Office, International Search Report and Written Opinion of PCT/US2015/010496, Mail date Apr. 20, 2015.
McKeever et al.; "Report of the Governor's Oklahoma Unmanned Aerial Systems Council: A Strategic Plan for the Development of an Unmanned Aerial Systems Enterprise in the State of Oklahoma"; Office of the Governor—State of Oklahoma; Spring 2012.
Tomkins, Richard; "Drone Aviation receives order for aerostats"; UPI; May 6, 2015.
USPTO, Office Action regarding U.S. Appl. No. 16/049,253, dated Sep. 28, 2018.
Whitlock, Craig; "Close Encounters on Rise as Small Drones Gain in Popularity;" Jun. 23, 2014; The Washington Post; Retrieved from http://www.washingtonpost.com/sf/investigative/2014/06/23/close-encounters-with-small-drones-on-rise/ [Retrieved May 18, 2015].
Whitlock, Craig; "Crashes Mount as Military Flies More Drones in U.S.;" Jun. 22, 2014; The Washington Post; Retrieved from http://www.washingtonpost.com/sf/investigative/2014/06/22/crashes-mount-as-military-flies-more-drones-in-u-s/ [Retrieved May 18, 2015].
Whitlock, Craig; "When Drones Fall from the Sky;" Jun. 20, 2014; The Washington Post; Retrieved from http://www.washingtonpost.com/sf/investigative/ 2014/06/20/when-drones-fall-from-the-sky/, Retrieved on May 18, 2015.
WIPO, International Search Report and Written Opinion regarding PCT App. No. PCT/US17/12696 mailed May 26, 2017.
WIPO, International Search Report and Written Opinion regarding PCT App. No. PCT/US19/062660 mailed Apr. 29, 2020.
European Patent Office, Examination Report regarding European Patent Application No. 19849057.5, dated Jul. 5, 2022.
Eagle View Technologies, Inc., Response to Jul. 5, 2022 Examination Report regarding European Patent Application No. 19849057.5, dated Jan. 11, 2023.
Eagle View Technologies, Inc., Response to Feb. 13, 2023 Notice of Grant with Examiner Amendment regarding European Patent Application No. 19849057.5, dated May 3, 2023.
European Patent Office, Examination Report regarding European Patent Application No. 23202279.8, dated Jan. 4, 2024.
IP Australia; Examination Report No. 1 regarding Australian Patent Application No. 2019384167, dated Jul. 19, 2024.
Eagle View Technologies, Inc., Response to Apr. 1, 2024 European Patent Office Extended Search Report regarding European Patent Application No. 23202279.8, dated Jul. 24, 2024.
European Patent Office, Communication pursuant to Article 94(3) EPC regarding European Patent Application No. 23202279.8, dated Nov. 20, 2024.

* cited by examiner

NAVIGATING UNMANNED AIRCRAFT USING PITCH

CROSS-REFERENCE TO RELATED APPLICATIONS

The present patent application claims priority to provisional patent application No. 62/770,570, filed on Nov. 21, 2018, titled "Navigating Unmanned Aircraft Using Pitch", the entire contents of which are hereby incorporated herein in their entirety. The present patent application incorporates herein by reference the entire contents of the following: the provisional patent application identified by U.S. Ser. No. 61/926,137, filed on Jan. 10, 2014, titled "Unmanned Aircraft Structure Evaluation System and Method"; the non-provisional patent application identified by U.S. Ser. No. 14/591,556, filed on Jan. 7, 2015, titled "Unmanned Aircraft Structure Evaluation System and Method", now U.S. Pat. No. 9,612,598, issued on Apr. 4, 2017; and the nonprovisional patent application identified by U.S. Ser. No. 15/401,999, filed Jan. 9, 2017, titled "Systems and Methods for Taking, Processing, Retrieving, and Displaying Images from Unmanned Aerial Vehicles."

BACKGROUND

Unmanned aerial vehicles (UAVs), commonly known as drones, are aircraft without a human pilot on board. Flight may be controlled by on-board computer processors and/or by remote control of a pilot located on the ground.

Within the insurance industry, use of UAVs may aid in obtaining evaluation estimates for structures or parts of structures, such as roofs, that may be difficult to access. For example, a camera or other sensors may be placed on the UAV so that the roof of a structure may be viewed without having to physically climb onto the roof.

The flight plan of the UAV may be based on evaluation of the geographic area around the structure, and is generally individualized for each structure. The distance from the UAV to the structure in the flight plan is important in order to provide consistent image resolution of images taken from cameras on the UAV and/or to provide a known "sample distance" between the structure and the sensors on the UAV. Images taken without consistent resolutions and/or distances may require additional processing to determine which images are suitable for use and/or to make an image consistent with other images taken.

During the flight of a UAV used to evaluate a structure or parts of a structure, such as the roof, distances from the UAV to areas of interest on the structure may vary. In some cases, the flight of the UAV is manually controlled and the distance from the UAV to the structure is controlled remotely and completely manually by a pilot. Such unregimented manual control results in widely varying distances between the UAV and the areas of interest of the structure. In other cases, the flight of the UAV is set such that the UAV traverses a plane above the structure and/or a set circle around the structure. However, since the majority of structures have portions, such as roofs, that are sloped, and that have different facets, the use of a planar flight path or circular flight path results in variations in the actual distance between the UAV and the surface of the area of interest of the structure.

What is needed are systems and methods that more precisely and accurately control the distance between the UAV and the structure and thereby provide consistent sample distances for images and/or consistent resolution of images.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices.

In the drawings.

DETAILED DESCRIPTION

Figure 1:
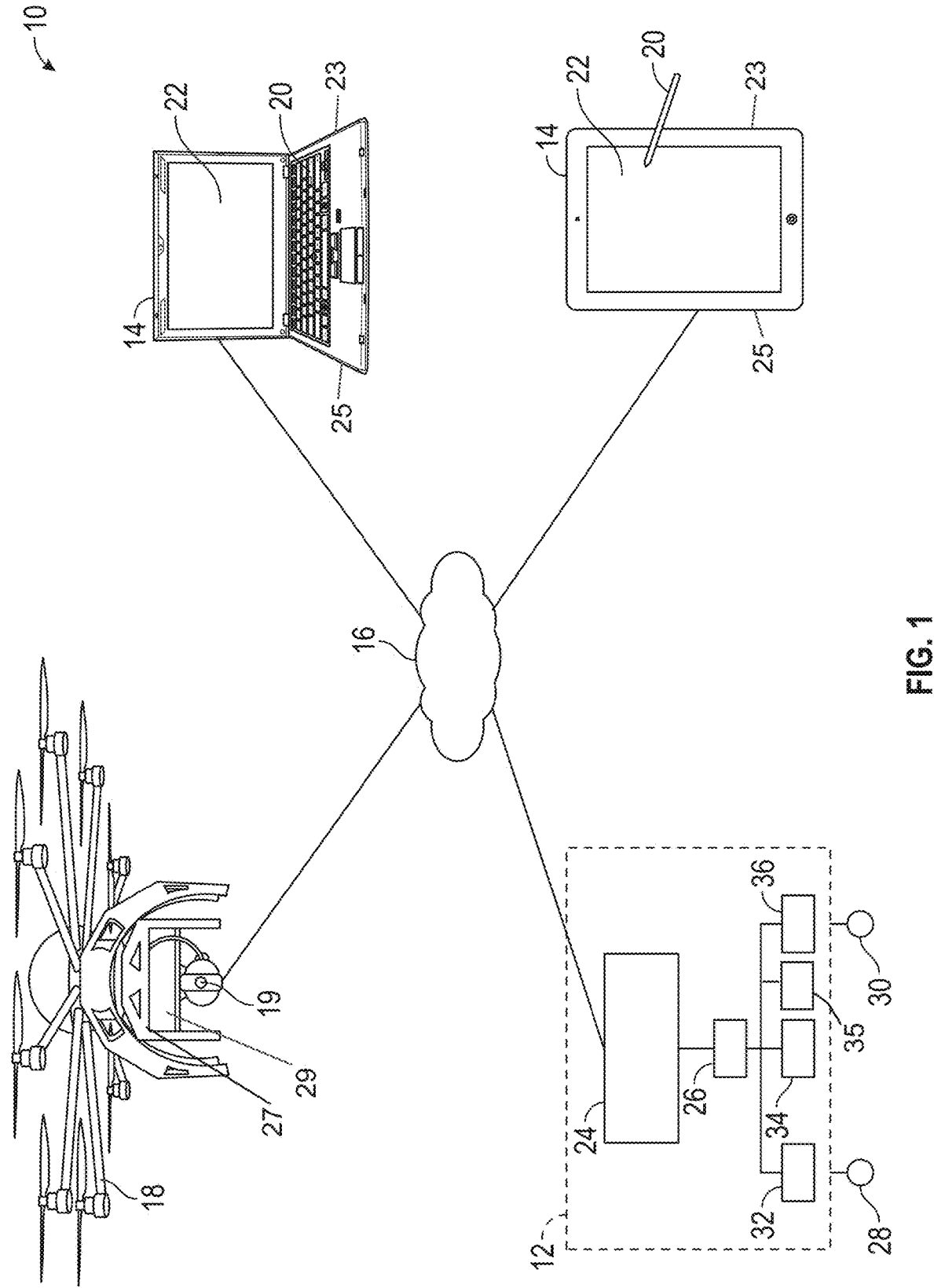
FIG. 1 is a schematic diagram of an embodiment of an unmanned aircraft structure evaluation system according to the instant disclosure.

Before explaining at least one embodiment of the inventive concept disclosed herein in detail, it is to be understood that the inventive concept is not limited in its application to the details of construction and the arrangement of the components or steps or methodologies set forth in the following description or illustrated in the drawings. The inventive concept disclosed herein is capable of other embodiments or of being practiced or carried out in various ways. Also, it is to be understood that the phraseology and terminology employed herein is for the purpose of description and should not be regarded as limiting in any way.

In the following detailed description of embodiments of the inventive concept, numerous specific details are set forth in order to provide a more thorough understanding of the inventive concept. It will be apparent to one of ordinary skill in the art, however, that the inventive concept within the disclosure may be practiced without these specific details. In other instances, well-known features have not been described in detail to avoid unnecessarily complicating the instant disclosure.

As used herein, the terms "network-based", "cloud-based" and any variations thereof, are intended to include the provision of configurable computational resources on demand via interfacing with a computer and/or computer network, with software and/or data at least partially located on the computer and/or computer network, by pooling processing power of two or more networked processors.

As used herein, the terms "comprises", "comprising", "includes", "including", "has", "having", or any other variation thereof, are intended to be non-exclusive inclusions. For example, a process, method, article, or apparatus that comprises a set of elements is not limited to only those elements but may include other elements not expressly listed or even inherent to such process, method, article, or apparatus.

As used in the instant disclosure, the terms "provide", "providing", and variations thereof comprise displaying or providing for display a webpage (e.g., roofing webpage) to one or more user terminals interfacing with a computer and/or computer network(s) and/or allowing the one or more user terminal(s) to participate, such as by interacting with one or more mechanisms on a webpage (e.g., roofing webpage) by sending and/or receiving signals (e.g., digital, optical, and/or the like) via a computer network interface (e.g., Ethernet port, TCP/IP port, optical port, cable modem, and combinations thereof). A user may be provided with a web page in a web browser, or in a software application, for example.

As used herein, the term "structure request", "structure order", "flight plan request", "flight plan order", and any variations thereof may comprise a feature of the graphical user interface or a feature of a software application, allowing a user to indicate to a host system that the user wishes to place an order, such as by interfacing with the host system over a computer network and exchanging signals (e.g., digital, optical, and/or the like), with the host system using a network protocol, for example. Such mechanism may be implemented with computer executable code executed by one or more processors, for example, with a button, a hyperlink, an icon, a clickable symbol, a microphone, and/or combinations thereof, that may be activated by a user terminal interfacing with the at least one processor over a computer network, for example.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, the use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearance of the phrase "in one embodiment" in various places in the specification are not necessarily all referring to the same embodiment.

Figure 2:
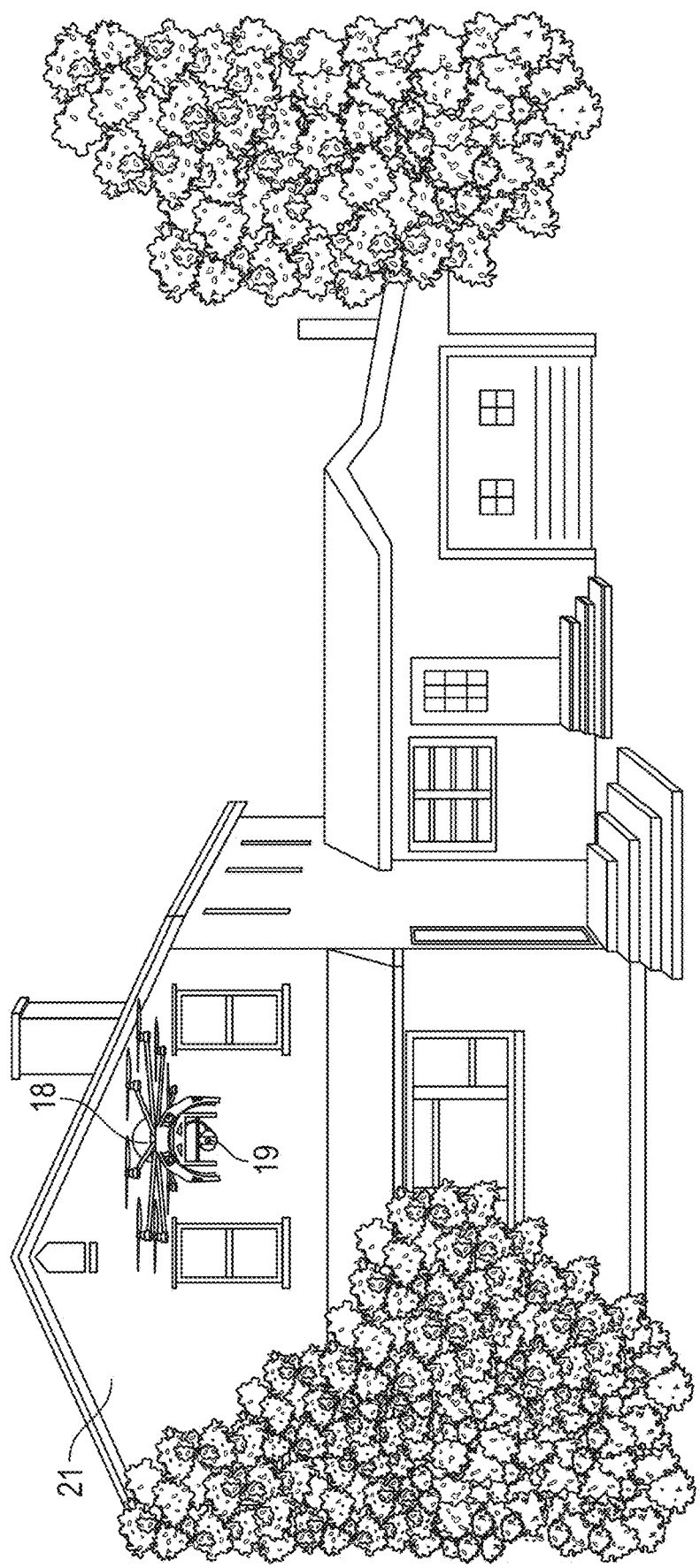
FIG. 2 is an image of an unmanned aircraft with a camera positioned about a structure.

Referring now to FIGS. 1 and 2, shown therein is an exemplary embodiment of an unmanned aircraft structure evaluation system 10 according to the instant disclosure. The unmanned aircraft structure evaluation system 10 may comprise one or more host systems 12 interfacing and/or communicating with one or more user terminals 14 via a network 16.

In some embodiments, the one or more host systems 12 may receive identification information relating to a structure 21 (e.g., building) via the user terminals 14, and/or data indicative of the geographic positions of the structure 21. Using the identification information and the geographic positioning of the structure 21, the one or more host systems 12 may generate unmanned aircraft information including one or more of flight path information, camera control information, and/or gimbal control information. The unmanned aircraft information may be used by an unmanned aircraft 18 to capture one or more aerial images 62 (e.g., nadir images and/or oblique images) of the structure 21. The unmanned aircraft 18 may also be referred to herein as an Unmanned Aerial Vehicle, or UAV.

In some embodiments, the flight path information, camera control information, and/or gimbal control information may be determined automatically and/or semi-automatically by analyzing and using geo-referenced images. In some embodiments, the flight path information, camera control information, and/or gimbal control information may be determined automatically and/or semi-automatically using a combination of sensor information from the unmanned aircraft 18, data indicative of one or more points on the structure 21, and/or data indicative of 2D and/or 3D models of the structure 21. As such, manual manipulation and/or analysis by a user may be minimized and/or eliminated. In other embodiments, the flight path information, camera control information and/or gimbal control information may be determined with the aid of a user who supplies data by interacting with one or more displayed oblique image of the structure 21 and/or otherwise inputs data into one or more of the user terminals 14.

The structure 21 may be a man-made structure, such as a building or infrastructure (e.g., a bridge). In one example shown in FIG. 2, the structure 21 is a residential building. Alternatively, or additionally, the structure 21 may be a naturally occurring structure, such as a tree, for example.

The unmanned aircraft 18 may be any type of unmanned aerial vehicle that can be controlled by using a flight plan. Flight of the unmanned aircraft 18 may be controlled autonomously as described in further detail herein. In some embodiments, flight may be controlled using a flight plan in combination with piloting by a user located externally to the unmanned aircraft 18. Exemplary unmanned aircraft 18 may include the Professional SR100 UAC Camera Drone manufactured and distributed by Cadence Technology located in Singapore. Other exemplary unmanned aircraft 18 may include the Skydio drone, manufactured and distributed by Skydio, located in Redwood City, California, including multiple cameras having overlapping fields of view that collectively cover a 360 degree field of view around the unmanned aircraft 18.

Images from the overlapping fields of view can be used as a part of a collision detection and avoidance system that assists the unmanned aircraft 18 in avoiding obstacles near the structure. Exemplary obstacles include powerlines, trees, antennas, neighboring buildings, birds, other aircraft, or the like. The obstacles (and areas without obstacles) can be detected by using aerial triangulation techniques to interpret the images. Still other exemplary unmanned aircraft may include the DJI drones (non-exclusive examples of which include the Phantom 4 Pro v2, the Mavic Pro, and the Mavic 2), manufactured and distributed by DJI, Nanshan District, Shenzhen, China.

Generally, the unmanned aircraft 18 may comprise an airframe, a controller, a communications system, a power system, a propulsion system, and an avionics system. In some embodiments, the unmanned aircraft 18 may comprise a navigation system, or the navigation system may be partially or completely in the user terminal(s) 14 and/or the host system 12 and/or elsewhere in the network 16. In some embodiments, the unmanned aircraft 18 may comprise one or more Electronic Speed Control (ESC). In some embodiments, the unmanned aircraft 18 may comprise one or more power bus. In some embodiments, the unmanned aircraft 18 may comprise one or more speed reduction device. In some embodiments, the unmanned aircraft 18 may comprise one or more actuator. The propulsion system may include one or more propeller 222 (a hub with a number of rotating air foils or blades) and/or one or more jet. The avionics system may include mechanical and electronic flight control mechanisms such as motor(s), servo(s), fuel control switches, etc., associated with various flight operations.

It will be understood that any type of aircraft airframe may be used as the basis of the airframe of the unmanned aircraft 18. Non-exclusive examples of types of unmanned aircraft 18 having different airframes include a fixed-wing unmanned aircraft 18 having a front or rear propeller, a fixed-wing unmanned aircraft 18 having multiple wing propellers, a helicopter type unmanned aircraft 18, a multi-rotor unmanned aircraft 18, a tilt-rotor unmanned aircraft 18, a jet-type unmanned aircraft 18, and a blimp-type unmanned aircraft 18. In some embodiments, the airframe of the unmanned aircraft 18 may have one or more control surfaces such as elevators, rudders, flaps, slats, and/or ailerons.

The unmanned aircraft 18 may include one or more computer processor 27 capable of executing instructions and one or more non-transitory memory 29. The one or more processor 27 may be capable of reading and/or executing processor executable code and/or of creating, manipulating, altering, and/or storing computer data structures into the one or more non-transitory memory 29 (which may also be referred to herein as non-transitory computer readable medium 29). The one or more computer processor 27 may be part of the controller.

The unmanned aircraft 18 may include one or more sensors 17. The sensors 17 may include one or more location sensors configured to determine distance to, presence of, and/or shape of one or more point on and/or surface of an object. Nonexclusive examples of such objects include the structure 21 and/or obstacles in the path of the unmanned aircraft 18. The sensors 17 may include infrared sensors, radar devices, LiDAR devices, and/or sonar devices. The sensors 17 may include active sensors, passive sensors or a combination of active and passive sensors.

A passive sensor is an instrument designed to receive, capture, and/or to measure emissions, reflections, or refractions, such as light. A passive sensor may measure reflected light, such as reflected sunlight emitted from the sun. An active sensor is an instrument used for measuring signals transmitted by the sensor that were reflected, refracted, or scattered from one or more object. An active sensor has its own source of light or illumination. In particular, an active sensor actively sends a wave/signal and measures that backscatter reflected back to the active sensor.

In one embodiment, the one or more sensors 17 is one sensor 17 configured to obtain multiple distance readings at known angles 39 from one another. One example of such a sensor 17 is described in U.S. Pat. No. 9,244,272, titled "Lidar System Producing Multiple Scan Paths and Method of Making and Using Same", issued on Jan. 26, 2016, the entire contents of which are hereby incorporated herein.

Figure 19:
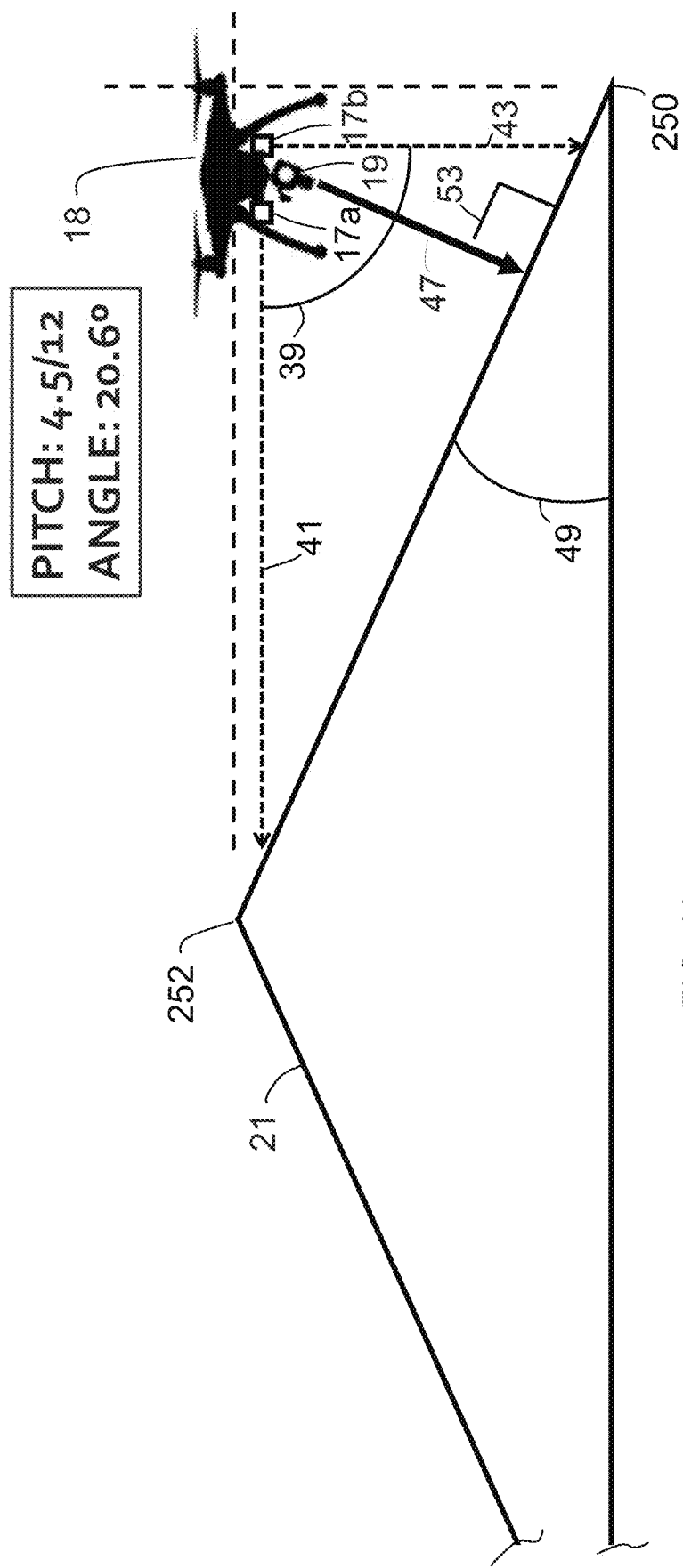
FIG. 19 is an illustration of portions of a method for navigating an unmanned aircraft using pitch of a roof in accordance with the instant disclosure.
Figure 25:
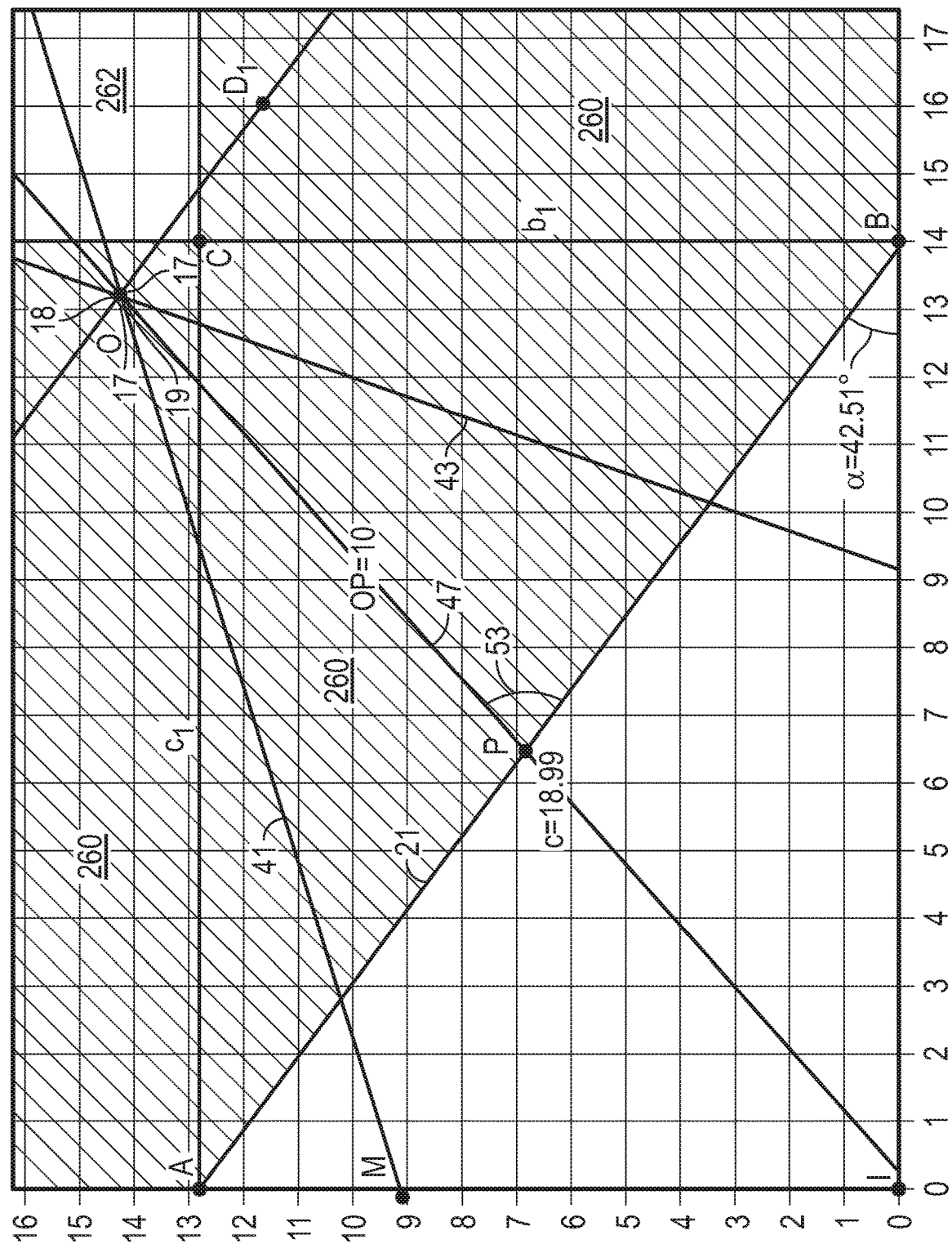
FIG. 25 is a diagram of a method for navigating an unmanned aircraft using pitch of a roof in accordance with the instant disclosure.
Figure 26:
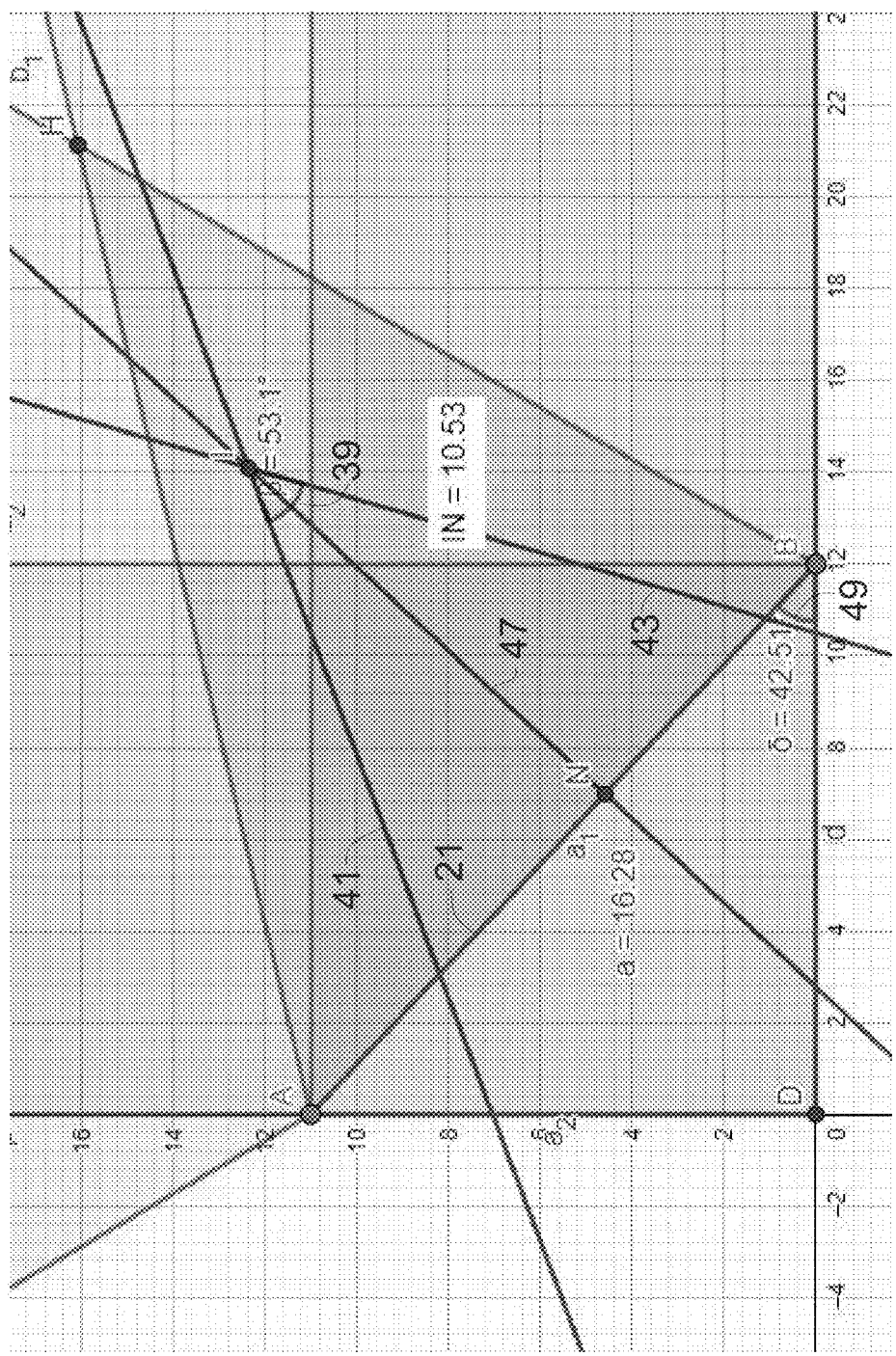
FIG. 26 is a diagram of a method for navigating an unmanned aircraft using pitch of a roof in accordance with the instant disclosure.

In one embodiment, the one or more sensors 17 are two or more sensors 17 positioned at a known angle 39 from one another (see, for example, FIG. 19). In one embodiment, a first sensor 17a may be substantially forward facing in relation to the direction of travel of the unmanned aircraft 18 and a second sensor 17b may downward facing in relation to the unmanned aircraft 18 (see, for example, FIG. 19). In one embodiment, a line along a first distance 41 determined by the first sensor 17 may be approximately ninety degrees from a line along a second distance 43 determined by the second sensor 17 (see, for example, FIGS. 19 and 26). In one embodiment, the known angle 39 between the line along the first distance 41 determined by the first sensor 17 and the line along the second distance determined by the second sensor 17 may be less than or more than ninety degrees (see, for example, FIGS. 25-26).

In one embodiment, sensor readings from the one or more sensors 17 of the unmanned aircraft 18 may be accessed via a component library that allows connection to a specific unmanned aircraft 18 while connected to its physical remote control by a communication cable (or by wireless transmission), and to read its current flight state, as well as the values of the various sensors (when present) of the aircraft itself. One non-exclusive example of such a component library is the software developer's kit ("SDK") from DJI entitled DJI Mobile SDK for iOS. A particular SDK from a manufacturer of unmanned aircraft 18 allows a software application developer to connect to the unmanned aircraft 18 (such as the DJI Phantom or Mavic models), read its current status, get readings from its sensors 17, and create missions that the unmanned aircraft 18 will perform on its own according to a specific set of instructions.

Since the SDK can obtain readings from multiple models of unmanned aircrafts 18, and not all unmanned aircraft 18 have the same set of distance sensors 17 (some unmanned aircraft 18 do not have distance sensors), a software application creator must determine which sensors 17 can be read, as well as determine how many sensors 17 (and which sensors 17) will return the expected results for its software application.

FIGS. 29-34 illustrate non-exclusive examples of unmanned aircraft 18 having one or more sensor 17. The one or more sensor 17 may include ultrasonic distance sensors and/or infrared sensors pointing down at the ground in relation to the unmanned aircraft 18 at a neutral position (see, for example, FIGS. 29-30). The ultrasonic distance sensors 17 operate by sending high frequency signals (higher, at least, than the range for human hearing) in a cone. The width of the cone varies, though may be about seventy degrees wide. Any obstacle/object that reflects those signals will send them back to the ultrasonic distance sensors 17. By measuring the difference from emitted time to received time of the ultrasonic distance signals, a distance can then be calculated between the ultrasonic distance sensor 17 and the obstacle or structure 21. In one embodiment, the ultrasonic distance sensors 17 may have a precision of ten centimeters, and may produce distance calculations that are valid up to five meters. Some unmanned aircraft 17 may use infrared sensors 17 (see FIG. 30), but may report the infrared sensor readings as if they were ultrasonic sensor readings. The SDK may return the output of ultrasonic (or infrared) distance sensors 17 in a single point (for example, the "ultrasonicHeightInMeters" property in DJIFlightControllerState). This value that is returned may be used as the downward distance from the sensor 17 to the structure 21.

The unmanned aircraft 18 may include one or more cameras 19 configured to provide aerial images 62. In some embodiments, the camera 19 may be mounted on a gimbal 220 support (e.g., three-axis gimbal).

Figure 31:
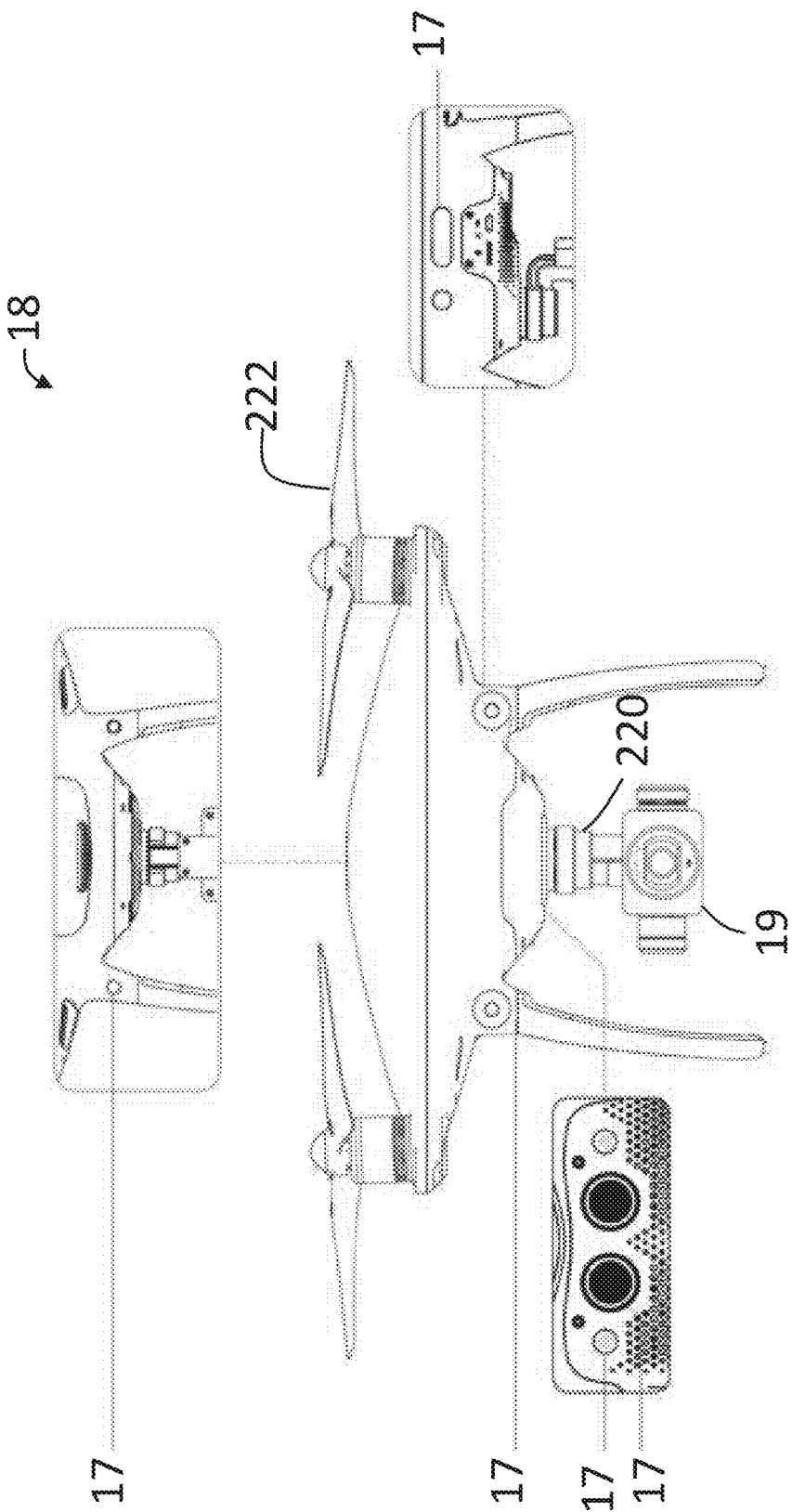
FIG. 31 is an illustration of an exemplary unmanned aircraft in accordance with the instant disclosure.
Figures 32A, 32B:
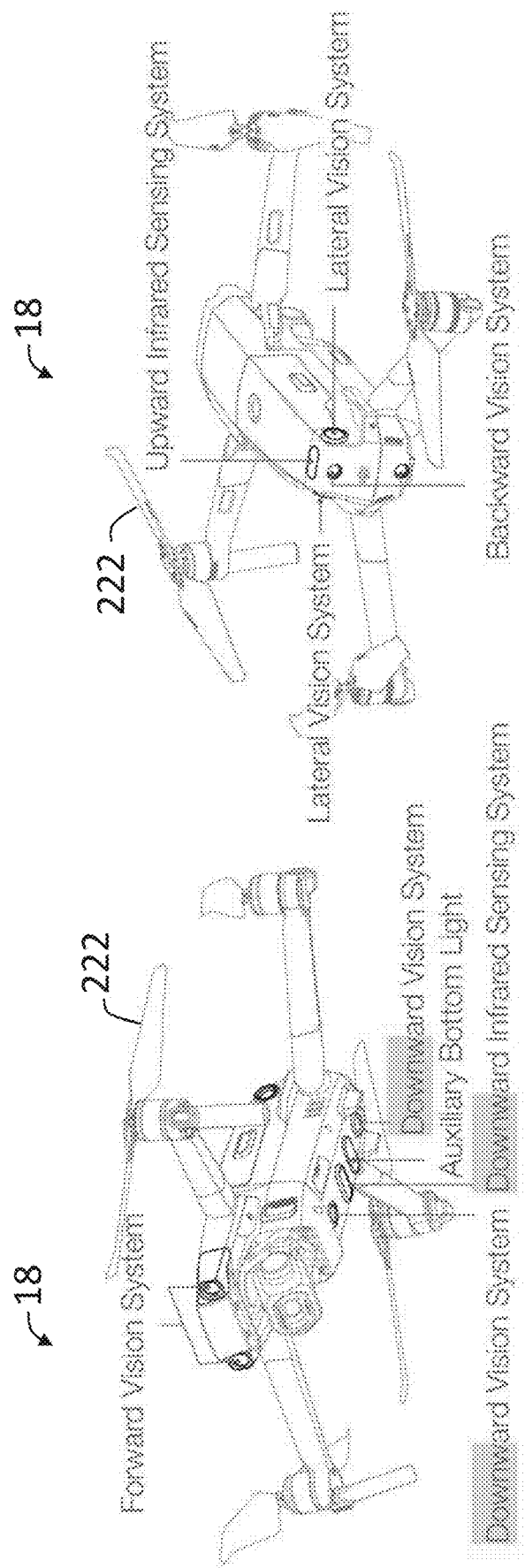
FIG. 32A is an illustration of a perspective view of an exemplary unmanned aircraft in accordance with the instant disclosure.
FIG. 32B is another perspective view of the exemplary unmanned aircraft of FIG. 32A.
Figure 33:
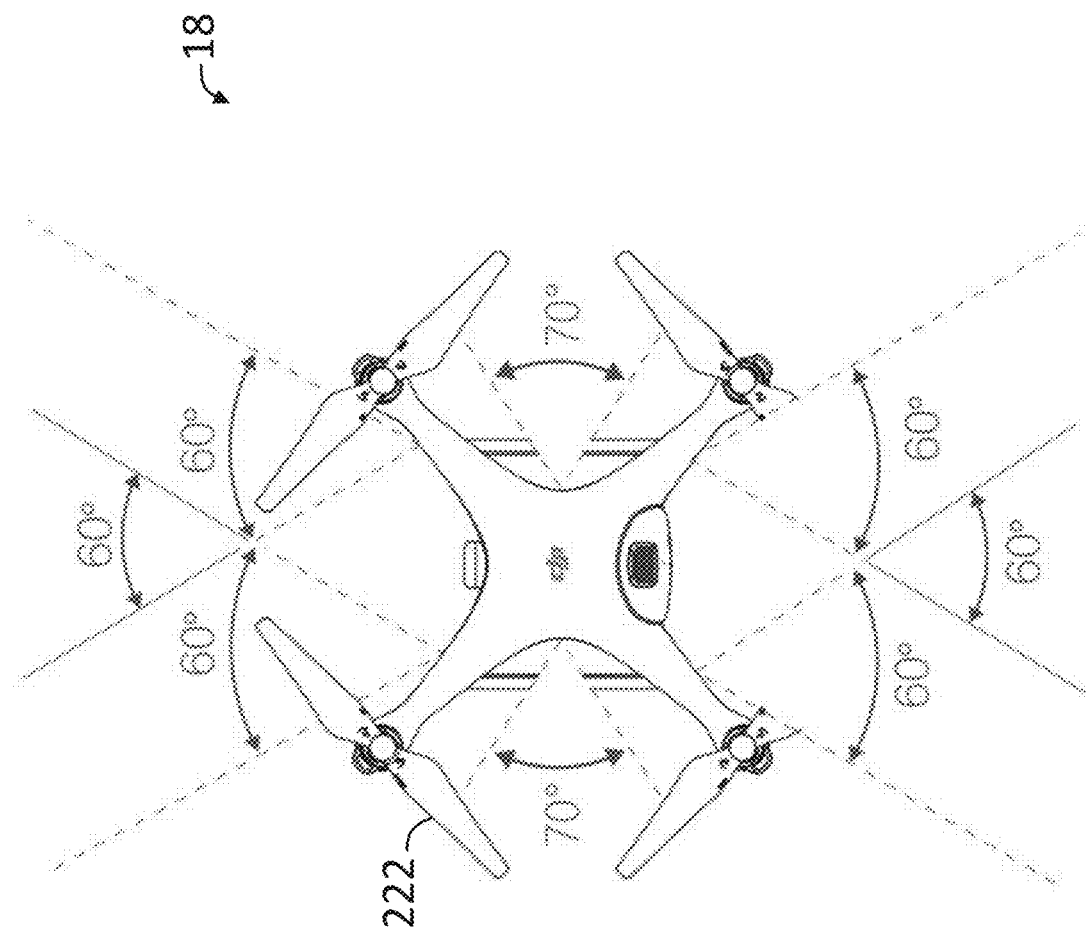
FIG. 33 is an illustration of an exemplary unmanned aircraft in accordance with the instant disclosure.
Figure 34:
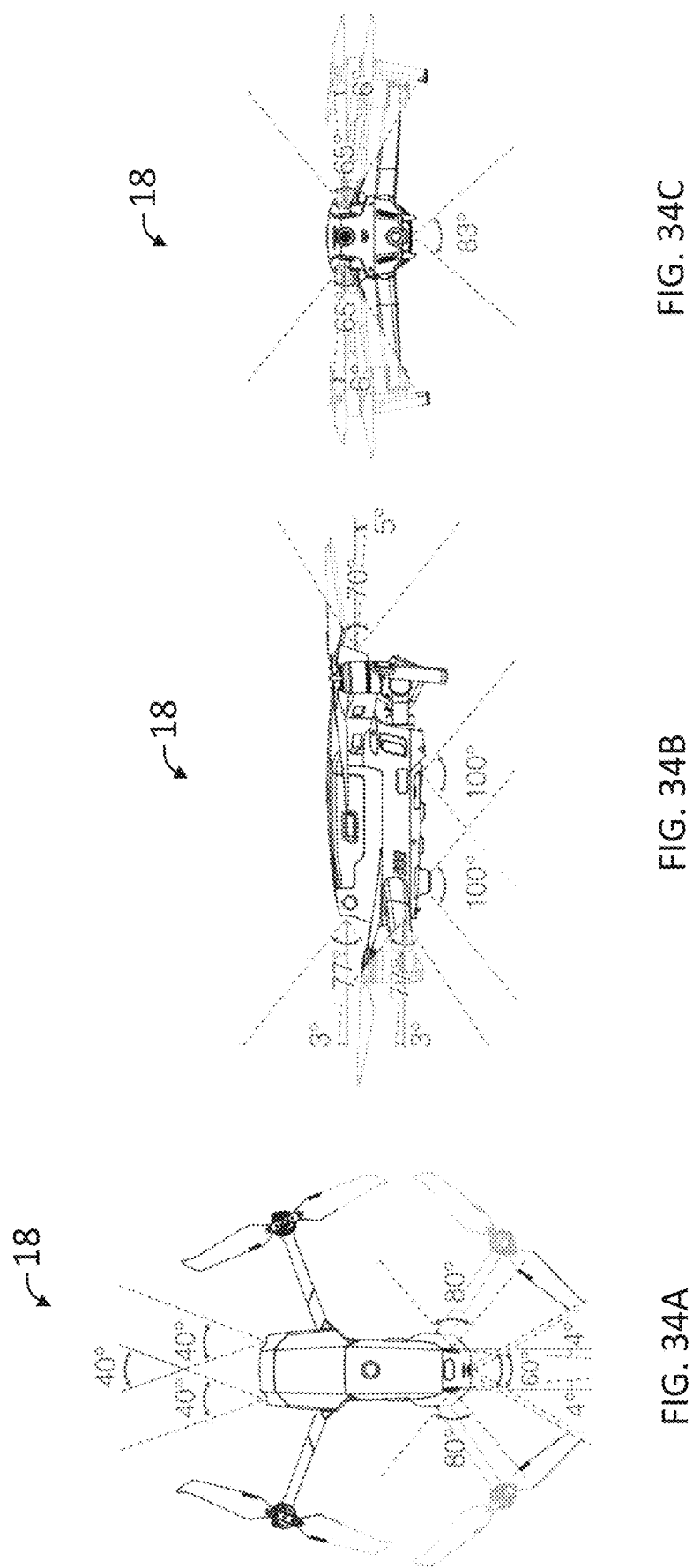
FIG. 34A is an illustration of an exemplary unmanned aircraft in accordance with the instant disclosure.
FIG. 34B is a side view of the exemplary unmanned aircraft of FIG. 34A.
FIG. 34C is an end view of the exemplary unmanned aircraft of FIG. 34A.

The unmanned aircraft 18 may include one or more "Vision" sensors 17, which may combine ultrasonic/infrared sensors 17 and cameras 19 pointing in several directions from the unmanned aircraft 18, to allow the unmanned aircraft 18 to detect more precisely any obstacles/objects in those directions (see FIGS. 31-32). From the perspective of the SDK, the sensors 17 are able to return the distance to the nearest obstacle/object that they detect. The sensors 17 can point forward (following the direction of the main camera 19 in the unmanned aircraft 18), backwards, and/or laterally. Some unmanned aircraft 18 may have one or more sensors 17 pointing upward and downward. The sensors 17 may have a specific range of operation (measured in degrees, where the origin point is the sensor 17 itself), as exemplified in the exemplary unmanned aircraft 18 depicted in FIGS. 33-34.

Additionally, in some embodiments, the unmanned aircraft 18 may include one or more global positioning system (GPS) receivers, one or more inertial navigation units (INU), one or more clocks, one or more gyroscopes, one or more compasses, one or more altimeters, and/or the like so that the position and orientation of the unmanned aircraft 18 at specific instances of time can be monitored, recorded, and/or stored with and/or correlated with particular images 62.

The one or more cameras 19 may be capable of capturing images 62 photographically and/or electronically as well as recording the time at which particular images 62 are captured. In one embodiment, this can be accomplished by sending a signal to a processor (that receives time signals from the GPS) each time an image 62 is captured. The one or more cameras 19 may include, but are not limited to, conventional cameras, digital cameras, digital sensors, charge-coupled devices, and/or the like. In some embodiments, one or more cameras 19 may be ultra-high resolution cameras. The camera 19 may capture digital images and/or the captured images 62 may be transformed into digital images. The digital images comprise pixels.

The one or more cameras 19 may include known or determinable characteristics including, but not limited to, focal length, sensor size, aspect ratio, radial and other distortion terms, principal point offset, pixel pitch, alignment, and/or the like.

Referring to FIG. 1, the unmanned aircraft 18 may communicate with the one or more user terminals 14. The one or more user terminals 14 may be implemented as a personal computer, a handheld computer, a smart phone, a wearable computer, network-capable TV set, TV set-top box, a tablet, an e-book reader, a laptop computer, a desktop computer, a network-capable handheld device, a video game console, a server, a digital video recorder, a DVD-player, a Blu-Ray player and combinations thereof, for example. In an exemplary embodiment, the user terminal 14 may comprise an input unit 20, a display unit 22, a processor 23 capable of interfacing with the network 16, one or more non-transitory memory 25 (which may also be referred to herein as non-transitory computer readable medium 25), processor executable code, and a web browser capable of accessing a website and/or communicating information and/or data over a network, such as the network 16. As will be understood by persons of ordinary skill in the art, the one or more user terminals 14 may comprise one or more non-transitory memories 25 having processor executable code and/or software applications, for example.

The input unit 20 may be capable of receiving information input from a user and/or other processor(s), and transmitting such information to the user terminal 14 and/or to the one or more host systems 12. The input unit 20 may be implemented as a keyboard, a touchscreen, a mouse, a trackball, a microphone, a fingerprint reader, an infrared port, a slide-out keyboard, a flip-out keyboard, a cell phone, a PDA, a video game controller, a remote control, a fax machine, a network interface, and combinations thereof, for example. In some embodiments, the user terminal 14 is loaded with flight management software for controlling the unmanned aircraft 18.

The display unit 22 may output information in a form perceivable by a user and/or other processor(s). For example, the display unit 22 may be a server, a computer monitor, a screen, a touchscreen, a speaker, a website, a TV set, a smart phone, a PDA, a cell phone, a fax machine, a printer, a laptop computer, a wearable display, and/or combinations thereof. It is to be understood that in some exemplary embodiments, the input unit 20 and the display unit 22 may be implemented as a single device, such as, for example, a touchscreen or a tablet. It is to be further understood that as used herein the term user is not limited to a human being, and may comprise a computer, a server, a website, a processor, a network interface, a human, a user terminal, a virtual computer, and combinations thereof, for example.

As discussed above, the system 10 may include one or more host systems 12. The one or more host systems 12 may be partially or completely network-based or cloud based, and not necessarily located in a single physical location. Each of the host systems 12 may further be capable of interfacing and/or communicating with the one or more user terminals 14 via the network 16, such as by exchanging signals (e.g., digital, optical, and/or the like) via one or more ports (e.g., physical or virtual) using a network protocol, for example. Additionally, each host system 12 may be capable of interfacing and/or communicating with other host systems directly and/or via the network 16, such as by exchanging signals (e.g., digital, optical, and/or the like) via one or more ports.

It should be noted that multiple host systems 12 may be independently controlled by separate entities. For example, in some embodiments, system 10 may include two host systems 12 with a first host system controlled by a first company and a second host system controlled by a second company distinct from the first company.

The one or more host systems 12 may comprise one or more processors 24 working together, or independently to, execute processor executable code, one or more memories 26 capable of storing processor executable code, one or more input devices 28, and one or more output devices 30. Each element of the one or more host systems 12 may be partially or completely network-based or cloud-based, and not necessarily located in a single physical location. Additionally, in embodiments having multiple host systems 12, each host system may directly communicate with additional host systems and/or third-party systems via the network 16.

The one or more processors 24 may be implemented as a single or plurality of processors 24 working together, or independently to execute the logic as described herein. Exemplary embodiments of the one or more processors 24 include a digital signal processor (DSP), a central processing unit (CPU), a field programmable gate array (FPGA), a microprocessor, a multi-core processor, and/or combinations thereof. The one or more processors 24 may be capable of communicating with the one or more memories 26 via a path (e.g., data bus). The one or more processors 24 may be capable of communicating with the input devices 28 and the output devices 30.

The one or more processors 24 may be further capable of interfacing and/or communicating with the one or more user terminals 14 and/or unmanned aircraft 18 via the network 16. For example, the one or more processors 24 may be capable of communicating via the network 16 by exchanging signals (e.g., digital, optical, and/or the like) via one or more physical or virtual ports (i.e., communication ports) using a network protocol. It is to be understood that in certain embodiments using more than one processor 24, the one or more processors 24 may be located remotely from one another, located in the same location, or comprising a unitary multi-core processor (not shown). The one or more processors 24 may be capable of reading and/or executing processor executable code and/or of creating, manipulating, altering, and/or storing computer data structures into one or more memories 26, which may also be referred to herein as non-transitory computer readable medium 26.

The one or more memories 26 may be capable of storing processor executable code. Additionally, the one or more memories 26 may be implemented as a conventional non-transitory memory, such as, for example, random access memory (RAM), a CD-ROM, a hard drive, a solid state drive, a flash drive, a memory card, a DVD-ROM, a floppy disk, an optical drive, and/or combinations thereof. It is to be understood that while one or more memories 26 may be located in the same physical location as the host system 12, the one or more memories 26 may be located remotely from the host system 12, and may communicate with the one or more processor 24 via the network 16. Additionally, when more than one memory 26 is used, a first memory may be located in the same physical location as the host system 12, and additional memories 26 may be located in a remote physical location from the host system 12. The physical location(s) of the one or more memories 26 may be varied. Additionally, one or more memories 26 may be implemented as a "cloud memory" (i.e., one or more memory 26 may be partially or completely based on or accessed using the network 16).

The one or more input devices 28 may transmit data to the processors 24, and may be implemented as a keyboard, a mouse, a touchscreen, a camera, a cellular phone, a tablet, a smart phone, a PDA, a microphone, a network adapter, a wearable computer and/or combinations thereof. The input devices 28 may be located in the same physical location as the host system 12, or may be remotely located and/or partially or completely network-based.

The one or more output devices 30 may transmit information from the processor 24 to a user, such that the information may be perceived by the user. For example, the output devices 30 may be implemented as a server, a computer monitor, a cell phone, a tablet, a speaker, a website, a PDA, a fax, a printer, a projector, a laptop monitor, a wearable display and/or combinations thereof. The output device 30 may be physically co-located with the host system 12, or may be located remotely from the host system 12, and may be partially or completely network based (e.g., website). As used herein, the term "user" is not limited to a human, and may comprise a human, a computer, a host system, a smart phone, a tablet, and/or combinations thereof, for example.

The network 16 may permit bi-directional communication of information and/or data between the one or more host systems 12, the user terminals 14 and/or the unmanned aircraft 18. The network 16 may interface with the one or more host systems 12, the user terminals 14, and the unmanned aircraft 18 in a variety of ways. In some embodiments, the one or more host systems 12, the user terminals 14, and/or the unmanned aircraft 18 may communicate via a communication port. For example, the network 16 may interface by optical and/or electronic interfaces, and/or may use a plurality of network topographies and/or protocols including, but not limited to, Ethernet, TCP/IP, circuit switched paths, and/or combinations thereof. For example, the network 16 may be implemented as the World Wide Web (or Internet), a local area network (LAN), a wide area network (WAN), a metropolitan network, a wireless network, a cellular network, a GSM-network, a CDMA network, a 3G network, a 4G network, a satellite network, a radio network, an optical network, a cable network, a public switched telephone network, an Ethernet network, and/or combinations thereof. Additionally, the network 16 may use a variety of network protocols to permit bi-directional interface and/or communication of data and/or information between the one or more host systems 12, the one or more user terminals 14 and/or the unmanned aircraft 18.

In some embodiments, the one or more host systems 12, the user terminals 14, and/or the unmanned aircraft 18 may communicate by using a non-transitory computer readable medium. For example, data obtained from the user terminal 14 may be stored on a USB flash drive. The USB flash drive may be transferred to and received by the unmanned aircraft 18 thereby communicating information, such as the unmanned aircraft information including flight path information, camera control information, and/or gimbal control information from the user terminal 14 to the unmanned aircraft 18. The USB flash drive may also be used to transfer images 62 captured by the camera 19, position, orientation and time date to the user terminal(s) 14.

Referring to FIGS. 1 and 2, the one or more memories 26 may store processor executable code and/or information comprising a structure location database 32, one or more images databases 34, one or more structure shape database 35, and program logic 36. The processor executable code may be stored as a data structure, such as a database and/or a data table, for example. In some embodiments, one or more memories 25 of the user terminal 14 and/or of the unmanned aircraft 18, may include a structure database 32, one or more image databases 34, one or more structure shape database 35, and program logic 36 as described in further detail herein. In some embodiments the structure location database 32, the one or more image databases 34, and/or the one or more structure shape database 35 may be combined.

The structure location database 32 may include geographical information (e.g., location, GIS data) about the structure 21. For example, the structure location database 32 may store identification information about the structure including, but not limited to, address, geographic location, latitude/longitude, and/or the like.

The one or more memories 26 may include one or more image databases 34. The one or more image databases 34 may store digital imagery and/or digital geo-referenced imagery. Such imagery may be represented by a single pixel map, and/or by a series of tiled pixel maps that when aggregated recreate the image pixel map. Geo-referenced imagery may include nadir, ortho-rectified, and/or oblique geo-referenced images.

The one or more processors 24 may provide the images via the image database 34 to users at the one or more user terminals 14. In some embodiments, one or more image databases 34 may be included within the user terminals 14. Geo-referenced imagery may have geographic location information for the pixels of the images 62. For example, the images 62 may be processed as described in U.S. Pat. No. 7,424,133, issued Sep. 9, 2008, titled "Method and Apparatus for Capturing, Geolocating and Measuring Oblique Images;" and/or U.S. Patent Publication US20150221079A1, published Aug. 6, 2015, titled "Augmented Three Dimensional Point Collection of Vertical Structures;" all of which are hereby incorporated by reference in their entirety herein. The geographic location information may include geographic coordinates for the ground as well as structures and objects located above the ground in the image. The geographic location information for the pixels of the image may be a part of the metadata associated with the image.

Georeferencing the images may be based at least in part on one or more known ground points and/or surface points. Nonexclusive examples of known ground points and/or surface points include digital elevation models (DEMs), point clouds, three-dimensional models, individually plotted/mapped points, and tessellated ground planes.

In one embodiment, the images may be georeferenced based at least in part on searching for and locating one or more surface model or point cloud having locations within a predetermined proximity of the location of the unmanned aircraft 18 and/or in the direction of orientation of the unmanned aircraft 18. In one embodiment, the images may be georeferenced based at least in part on searching for and locating one or more ground point or ground plane having ground locations within a predetermined proximity of the unmanned aircraft 18.

In one embodiment, the images 62 may be geo-located. Geolocating the image 62 may comprise associating the image 62 with a location or structure in a location. One example of use for geolocation of the image 62 is for images depicting objects above the ground without depicting the ground, or without ground location information, or without access to surface location information for the objects depicted. For example, an image 62 may depict a chimney on a roof without depicting the ground location. Metadata can be used to associate the image with a particular location or structure. For example, metadata can be used that is associated with the one or more image capture device at the time the aerial images 62 were captured, such as latitude and longitude of the one or more image capture device and/or one or more of altitude, orientation, attitude, and bearing of the one or more image capture device. The metadata can be correlated to the location or structure thereby associating the image 62 with the location or structure 21.

The one or more structure shape database 35 may include geo-spatial and/or relational information about the structure 21. Non-exclusive examples of such information within the structure shape database 35 include two-dimensional model information, three-dimensional model information, point cloud data, data points indicative of a geometric configuration of the structure 21, feature data (regarding portions of the structure 21), relational data (for example, the relationship between points of the structure 21), and combinations thereof.

The one or more memories 26 may further store processor executable code and/or instructions, which may comprise the program logic 36. The program logic 36 may comprise processor executable instructions and/or code, which when executed by the processor 24, may cause the processor 24 to execute image display and analysis software to generate, maintain, provide, and/or host a website providing one or more structure evaluation requests, for example. The program logic 36 may further cause the processor 24 to collect identification information about the structure 21 (e.g., address), allow one or more users to validate a location of the structure, obtain geographical positions of the structure, and the like, as described herein.

Figure 3:
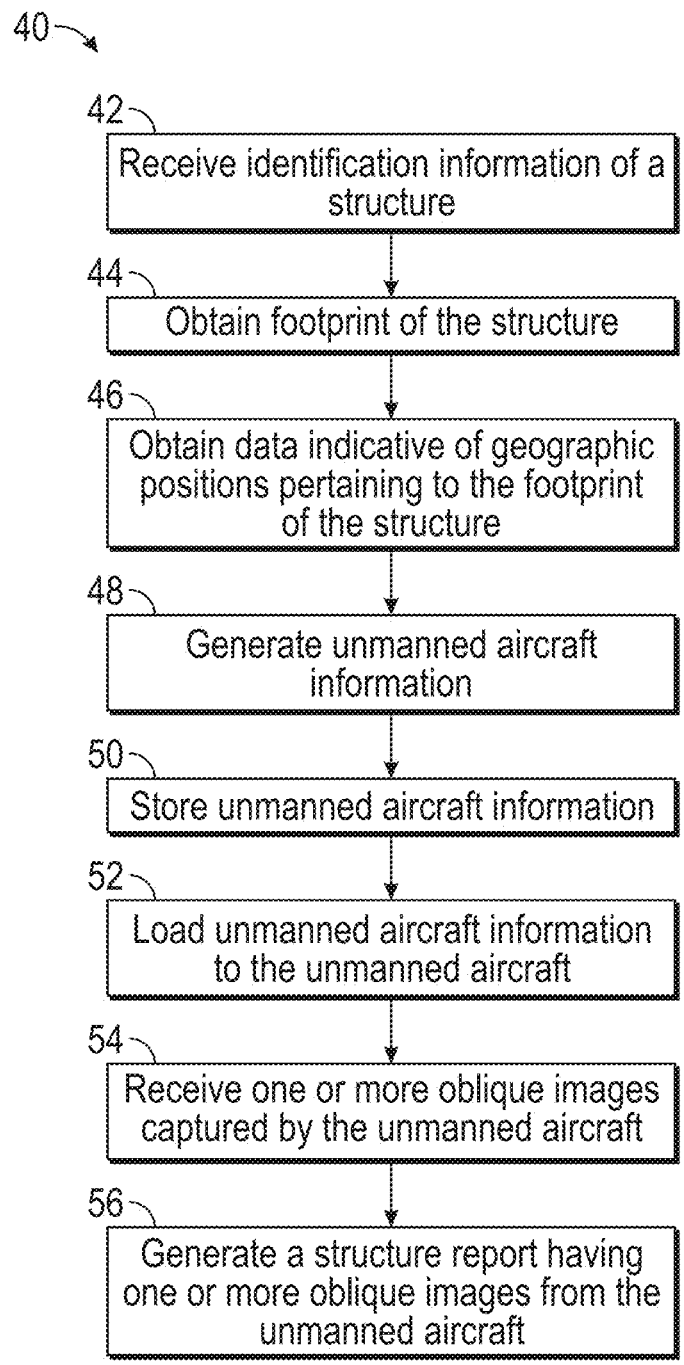
FIG. 3 is a flow chart of an exemplary embodiment of a program logic according to the instant disclosure.

Referring to FIG. 3, shown therein is an exemplary flow chart 40 of program logic 36 for creating a structure evaluation report according to the instant disclosure. Program logic 36 may comprise executable code, which when executed by the one or more processors 24 may cause the one or more processors 24 to execute one or more of the following steps.

In a step 42, the one or more host systems 12 may receive identification information of the structure from the user terminal 14. For example, the one or more host systems 12 may receive the address of the structure, geographic location of the structure (e.g., X, Y, Z coordinates, latitude/longitude coordinates), a location of the user terminal 14 determined by a Geographic Position System (GPS), and/or the like.

Figure 4:
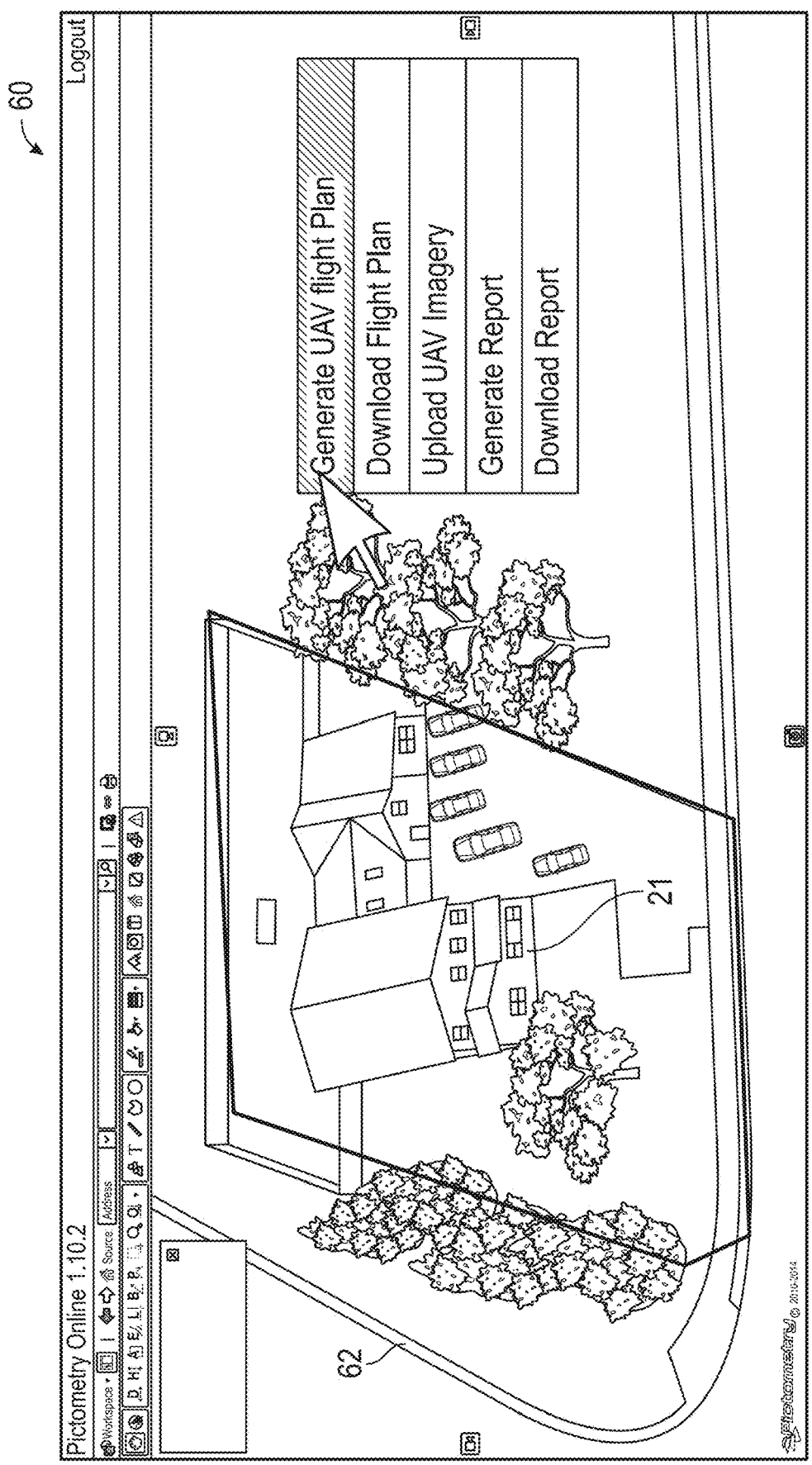
FIG. 4 is an exemplary screen shot of an oblique image of the structure shown in FIG. 2.

In some embodiments, the user may validate the location of the structure 21. One or more processor 24 may provide one or more images 62 via the image database 34 to the display unit 22 of the user terminal 14. For example, FIG. 4 illustrates an exemplary screen shot 60 of an oblique image 62 of the structure 21 that may be displayed on the display unit 22 of the user terminal 14, shown in the block diagram of FIG. 1. The one or more images 62 may be geo-referenced images illustrating portions or all of the structure 21. Referring to FIGS. 1 and 4, the program logic 36 may cause the processor 24 to provide users the one or more geo-referenced images 62 (e.g., via the display unit 22), and allow the user to validate the location of the structure 21 (e.g., via the input unit 20). For example, the user may be able to use a drag-and-drop element provided by the program logic 36 via user terminal 14 to select the structure 21 within the one or more geo-referenced images 62. Selection of the structure 21 within the one or more geo-referenced images 62 may provide one or more validated images and a validated location of the structure 21. It should be noted, that in some embodiments, the program logic of the user terminal 14, with or in lieu of the program logic 36 of the processor 24, may provide users the one or more geo-referenced images 62 to allow for validation of the location of the structure 21.

In some embodiments, validation of the geo-referenced images 62 may be provided by one or more additional host systems via the one or more processors 24 in lieu of, or in combination with host system 12. For example, the host system 12 may direct the user to a second host system wherein one or more processors of the second host system may provide geo-referenced images 62 from image database to the user for validation of one or more structures 21.

In some embodiments, the geographic location may include coordinates, and validation of the geographic location may be provided by the user by altering one or more coordinates of the geographic location. Users may alter the one or more coordinates by methods including, but not limited to, manual manipulation, drag-and-drop elements, and the like.

In some embodiments, location of the structure 21 may be automatically determined by location of the user terminal 14. For example, a user may be physically present at the structure 21, and the user may be holding the user terminal 14 which determines its location using any suitable technology, such as a Global Positioning System or location triangulation using wireless signals. Using location coordinates of the user terminal 14, the location of the structure 21 may be determined.

In a step 44, a footprint and/or a three-dimensional model of the structure 21 may be determined. The footprint and/or three-dimensional model may provide one or more two-dimensional boundaries (e.g., sides) and/or outlines of the structure 21. For example, the footprint and/or the three-dimensional model of the structure 21 may be determined using systems and methods including, but not limited to, those described in U.S. Pat. No. 8,145,578, titled "Aerial Roof Estimation System and Method"; U.S. Pat. No. 8,170,840, titled "Pitch Determination Systems and Methods for Aerial Roof Estimation"; U.S. Pat. No. 8,209,152, titled "Concurrent Display Systems and Methods for Aerial Roof Estimation"; U.S. Pat. No. 9,911,228, titled "Geometric Correction of Rough Wireframe Models Derived from Photographs"; U.S. Pat. No. 8,078,436, titled "Aerial Roof Estimation Systems and Methods"; and U.S. Pat. No. 8,977,520, titled "Computer System for Automatically Classifying Roof Elements"; all of which are hereby incorporated by reference herein in their entirety. In some embodiments, the footprint and/or the three-dimensional model of the structure 21 may be provided to the user via the display unit 22. For example, in some embodiments, the footprint and/or the three-dimensional model of the structure 21 may be displayed as a layer on one or more images (e.g., nadir image) via the display unit 22.

In some embodiments, the one or more processors 24 may provide, via the display unit 22, one or more websites to the user for evaluation of multiple oblique images to provide the footprint and/or the three-dimensional model of the structure 21. For example, the user and/or the processors 24 may identify edges of the structure 21. Two-dimensional and/or three-dimensional information regarding the edges (e.g., position, orientation, and/or length) may be obtained from the images by, for example, using user selection of points within the images and/or the techniques taught in U.S. Pat. No. 7,424,133, and/or stereo-photogrammetry. Using the two-dimensional and/or three-dimensional information (e.g., position orientation, and/or length), line segments may be determined with multiple line segments forming at least a portion of the footprint and/or the three-dimensional model of the structure 21.

In an optional step 46, data indicative of geographic positions pertaining to the footprint of the structure 21 and/or structure height information may be obtained. For example, in some embodiments, the height of structure 21 above the ground may be determined. The height of the structure 21 above the ground may aid in determining altitude for the flight plan of the unmanned aircraft 18 as discussed in further detail herein. In some embodiments, more than one height may be used. For example, if the structure 21 is a split-level building having a single-story part and a two-story part, a first height may be determined for the first story and a second height may be determined for the second story. Altitude for the flight path of the unmanned aircraft 18 may vary based on the differing heights of the structure 21 or objects in close proximity to the structure 21.

Measurements of the geographic positions of the structure 21, such as a vertical structure, may include techniques as described in U.S. Pat. No. 7,424,133, which is hereby incorporated herein by reference in its entirety. The term "vertical structures", as used herein includes structures that have at least one portion of one surface that is not fully horizontal. For example, "vertical structures" as described herein includes structures that are fully vertical and structures that are not fully vertical, such as structures that are pitched at an angle and/or that drop into the ground. The side of a structure is not limited to only one or more walls of the structure 21, but may include all visible parts of the structure 21 from one viewpoint. For instance, when the present disclosure is discussing a structure 21, such as a house, a "side" or "vertical side" includes the wall of the house and the roof above the wall up to the highest point on the house.

In some embodiments, using the input unit 20 and/or the display unit 22, the user may optionally give additional details regarding geographic positions pertaining to the structure 21. For example, if the structure 21 is a roof of a building, the user may include identification of areas such as eaves, drip edges, ridges, and/or the like. Additionally, the user may manually give values for pitch, distance, angle, and/or the like. Additionally, or alternatively, the one or more processors 24 may evaluate imagery and/or other data and determine areas including eaves, drip edges, ridges and/or the like without manual input of the user.

In a step 48, using the footprint, height, data points indicative of a geometric configuration of the structure 21, three-dimensional model information of the structure 21, and/or possibly additional geographic positions or information pertaining to the structure 21 and/or data points indicative of the geographic location of obstructions in potential flight paths such as trees and utility wires, unmanned aircraft information may be generated by the one or more host systems 12 and/or the user terminal 14. The unmanned aircraft information may include flight path information, camera control information, and/or gimbal control information.

Figure 6:
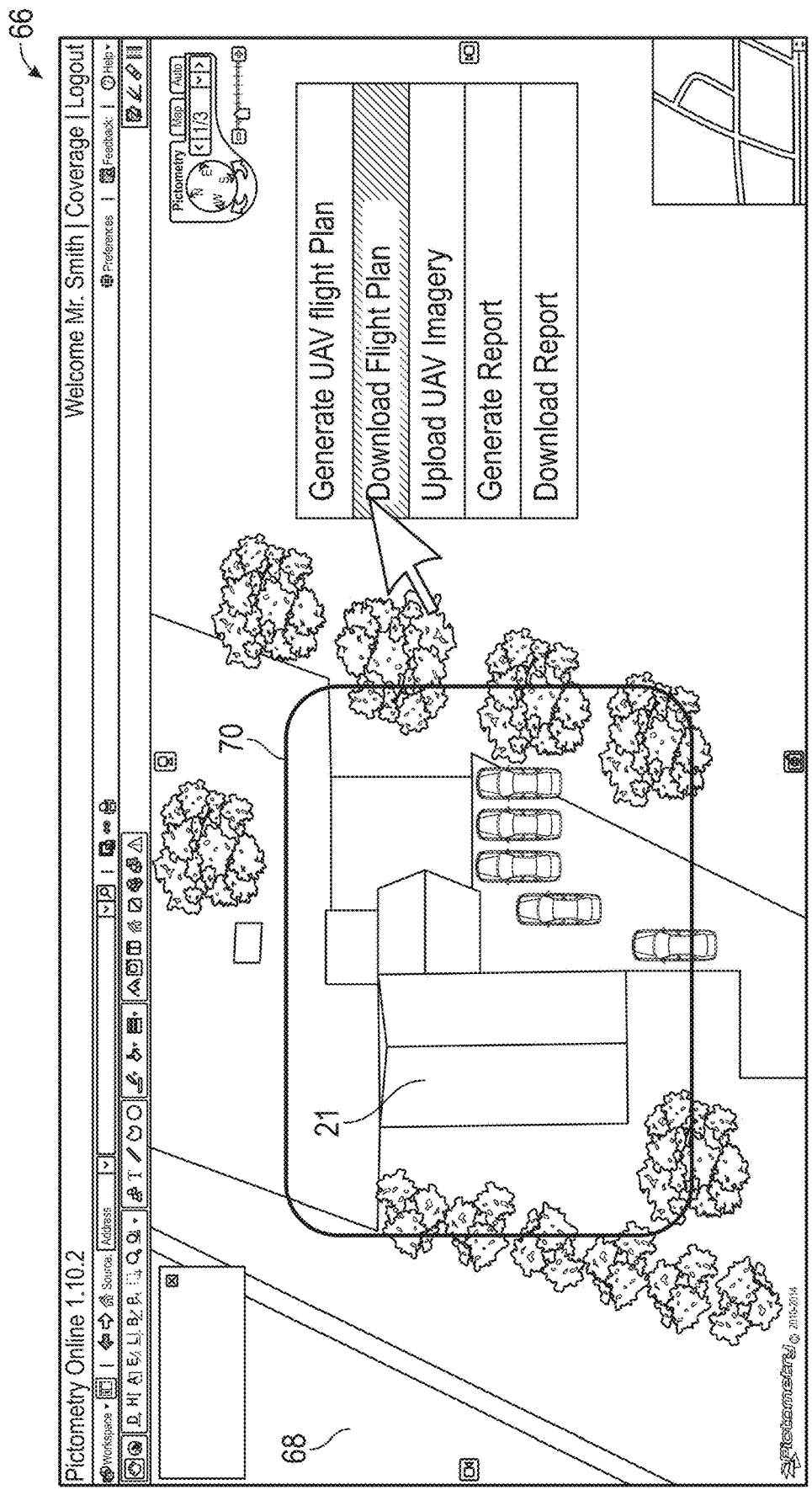
FIG. 6 is an exemplary screen shot of a nadir image of the structure shown in FIG. 4, the screen shot illustrating an exemplary flight plan for an unmanned aircraft.

Flight path information may be configured to direct the unmanned aircraft 18 to fly a flight path in relation to the structure 21. The flight path may be configured to allow the unmanned aircraft 18 to take sensor readings and/or aerial images of the structure 21. In some embodiments, a flight path may be displayed to the user on one or more images (e.g., nadir, oblique) via the display unit 22. For example, FIG. 6 illustrates an exemplary screen shot 66 of a nadir image 68 showing a flight path 70 about the structure 21. In some embodiments, the flight path 70 may be displayed as a layer overlapping the nadir image 68 of the structure 21 on the display unit 22 of FIG. 1.

Figure 5:
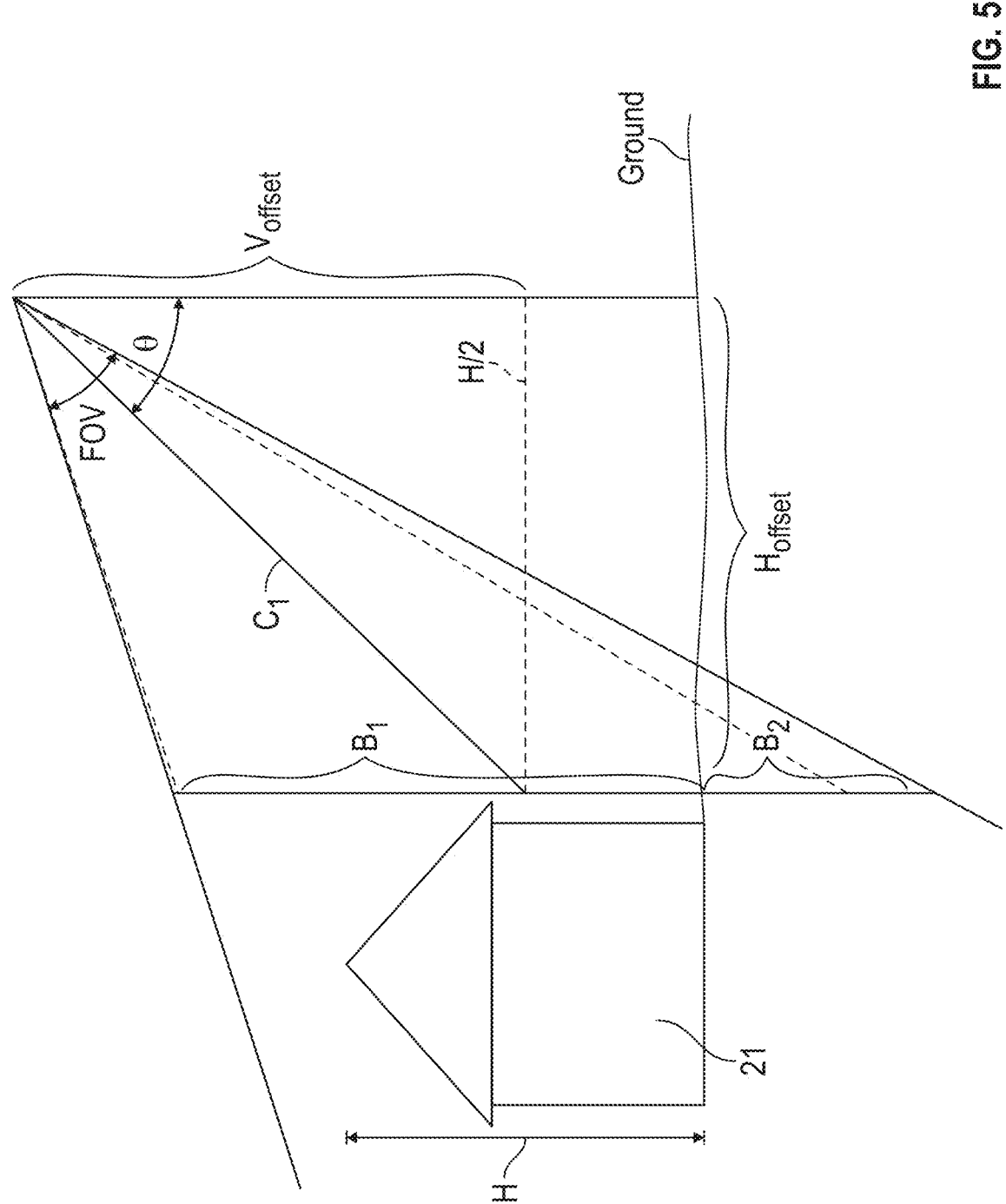
FIG. 5 is an exemplary diagram illustrating lateral and vertical offset of an unmanned aircraft in relation to a structure in accordance with the present disclosure.

Generally, the flight path information directs the unmanned aircraft 18 in three dimensions. Referring to FIGS. 5 and 6, in one embodiment the flight path information may be determined such that the flight path 70 around the structure 21 is laterally and/or vertically offset from the geographic positions of the outline of the structure 21. In particular, lateral offset $L_{OFFSET}$ and vertical offset $V_{OFFSET}$ may be dependent upon the height H of the structure 21, orientation of the camera relative to the unmanned aircraft 18, and characteristics of the camera 19.

Referring to FIG. 5, generally in determining offset from the structure 21, the field of view (FOV) of the camera 19 may be positioned such that a center $C_1$ is at one half the height H of the structure 21, for example. Additionally, one or more buffer regions B may be added to the FOV. Buffer regions B may increase the angle of the FOV by a percentage. For example, buffer regions $B_1$ and $B_2$ illustrated in FIG. 5 may increase the angle of the FOV by 20-50%. To determine the lateral offset $L_{OFFSET}$ and the vertical offset $V_{OFFSET}$ of the camera 19 from the structure 21, a predetermined angle $\Theta$ within a range of approximately 25 degrees to approximately 75 degrees may be set. Once the angle $\Theta$ is set, the lateral offset $L_{OFFSET}$ and the vertical offset $V_{OFFSET}$ of the camera 19 relative to the structure 21 may be determined using trigonometric principles, for example. For example, lateral offset $L_{OFFSET}$ may be determined based on the following equation:

$$L_{OFFSET}=C_1*\mathrm{Sin}(\Theta) \qquad (\mathrm{EQ.~1})$$

wherein $C_1$ is the centerline of the field of view FOV. The vertical offset $V_{OFFSET}$ may be determined based on the following equation:

$$V_{OFFSET}=C_1*\mathrm{Cos}(\Theta) \qquad (\mathrm{EQ.~2})$$

wherein $C_1$ is the centerline of the field of view FOV.

The flight path information may optionally direct the roll, pitch and yaw of the unmanned aircraft 18. For example, some versions of the unmanned aircraft 18 may not have a multi-axis gimbal and as such, can be directed to aim the camera 19 by changing the yaw, pitch or roll of the unmanned aircraft 18. The current yaw, pitch and roll of the unmanned aircraft 18 may be measured using a position and orientation system that is a part of the unmanned aircraft 18. In some embodiments, the position and orientation system may be implemented using microelectromechanical based accelerometers and/or microelectromechanical based pyrometers.

Figure 7:
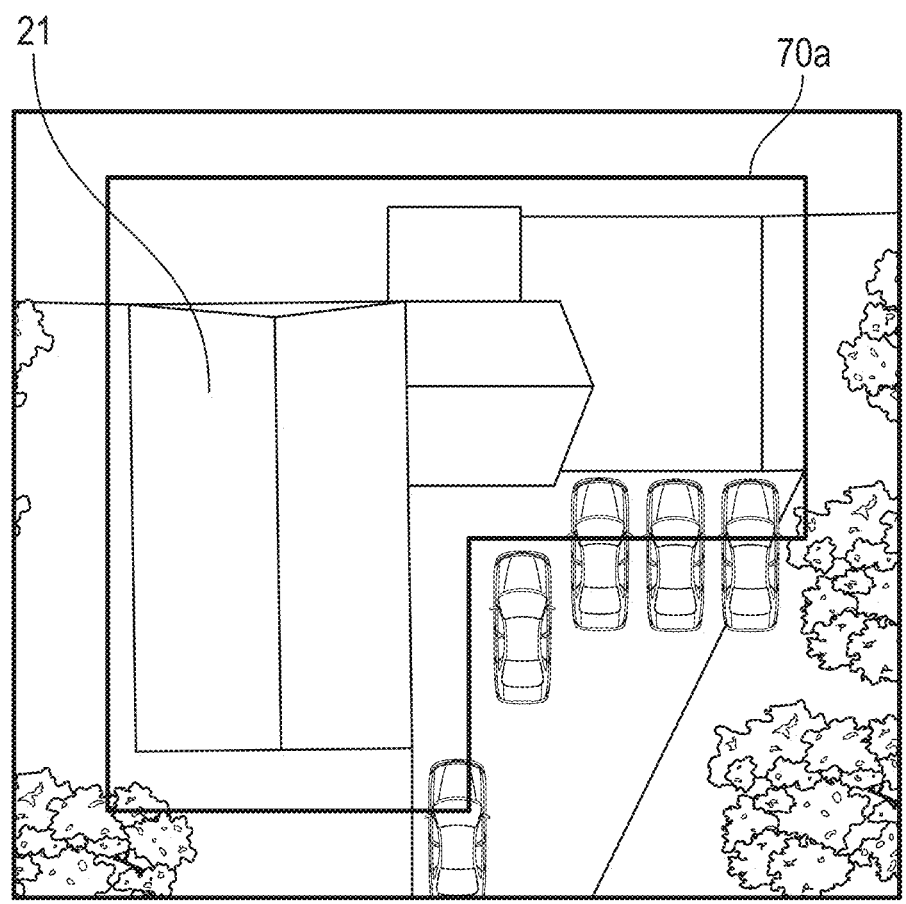
FIG. 7 is another exemplary screen shot of nadir image of the structure shown in FIG. 6, the screen shot illustrating another exemplary flight plan for an unmanned aircraft.

In many cases, there may be obstacles that lie along the flight path 70. Some of those obstacles may be able to be detected by the system through use of the imagery. In some embodiments, the flight path 70 may be determined such that interference with outside elements (e.g., trees and telephone wires) may be minimized. For example, FIG. 7 illustrates a variation of the flight path 70 determined in FIG. 4 wherein the flight path 70a of FIG. 7 minimizes interference by following the outline of the structure 21.

A ground confidence map, as described in U.S. Pat. No. 8,588,547, which disclosure is hereby incorporated herein by reference, could be used to identify objects for which there is a high degree of confidence that the object lies elevated off of the ground. Auto-correlation and auto-aerial triangulation methods could then be used to determine the heights of these potential obstructions. If the flight path 70 would go through one of these obstructions, the flight path 70 may be flagged and the algorithm may then attempt to find the best solution for getting past the obstructions. For example, the flight path 70 may be altered such that the unmanned aircraft 18 may fly closer to the structure 21 as shown in FIG. 7, which might necessitate additional passes due to a finer resolution of images taken at those locations and therefore smaller path width. In another example, the flight path 70 may be altered such that the unmanned aircraft 18 may fly over the obstruction and aim the camera 19 at a steeper oblique angle, which again may require an adjustment to the flight path 70 to ensure full coverage. In one embodiment, for any flight paths 70 that are flagged for possible obstructions, a system operator may validate the corrective route chosen and alter it as necessary.

In addition to those obstacles that are identified within the image, there may also be obstacles that cannot be identified in the image. These could be newer trees or structures that were not in the original images used for flight planning, wires or other objects that may not show up in the images in enough detail to be able to determine their location, or other unexpected obstacles. As such, the unmanned aircraft 18 may also incorporate a collision detection and avoidance system in some embodiments. For example, the collision detection and avoidance system may be imaging based and/or sensor based. When an obstacle lies along the Flight Path, the software guiding the unmanned aircraft 18 may first attempt to move closer to the structure 21 along the path from the Flight Path 70 to a Target Path. If, after a suitable threshold of movement, the unmanned aircraft 18 is unable to bypass the obstacle, the collision detection and avoidance system may steer the unmanned aircraft 18 back to its original point of collision detection and/or may attempt to fly above the obstacle. In one example, the suitable threshold of movement may be set at approximately 10% of the distance between the unmanned aircraft 18 and the structure 21. For example, if the distance is 104' in the above examples, the threshold may be 10% of 104', that is, 10.4', so that an approximately 20% overlap still ensures complete coverage of images/scans of the structure 21.

Since the software controlling the unmanned aircraft 18 keeps the camera 19 aimed at the Target Path, flying the unmanned aircraft 18 higher may still allow capture by the camera 19 of images of desired portions of the structure 21; but the oblique down-look angle may change and the resolution of the images taken may become coarser.

In some circumstances, an operator may intervene to negotiate the unmanned aircraft 18 around the obstacle. In these cases, the software running on a processor 27 of the unmanned aircraft 18 may transmit a signal to the operator for example, in the form of an audible alarm, and allow the operator to steer the unmanned aircraft 18 around the obstacle.

Figure 8:
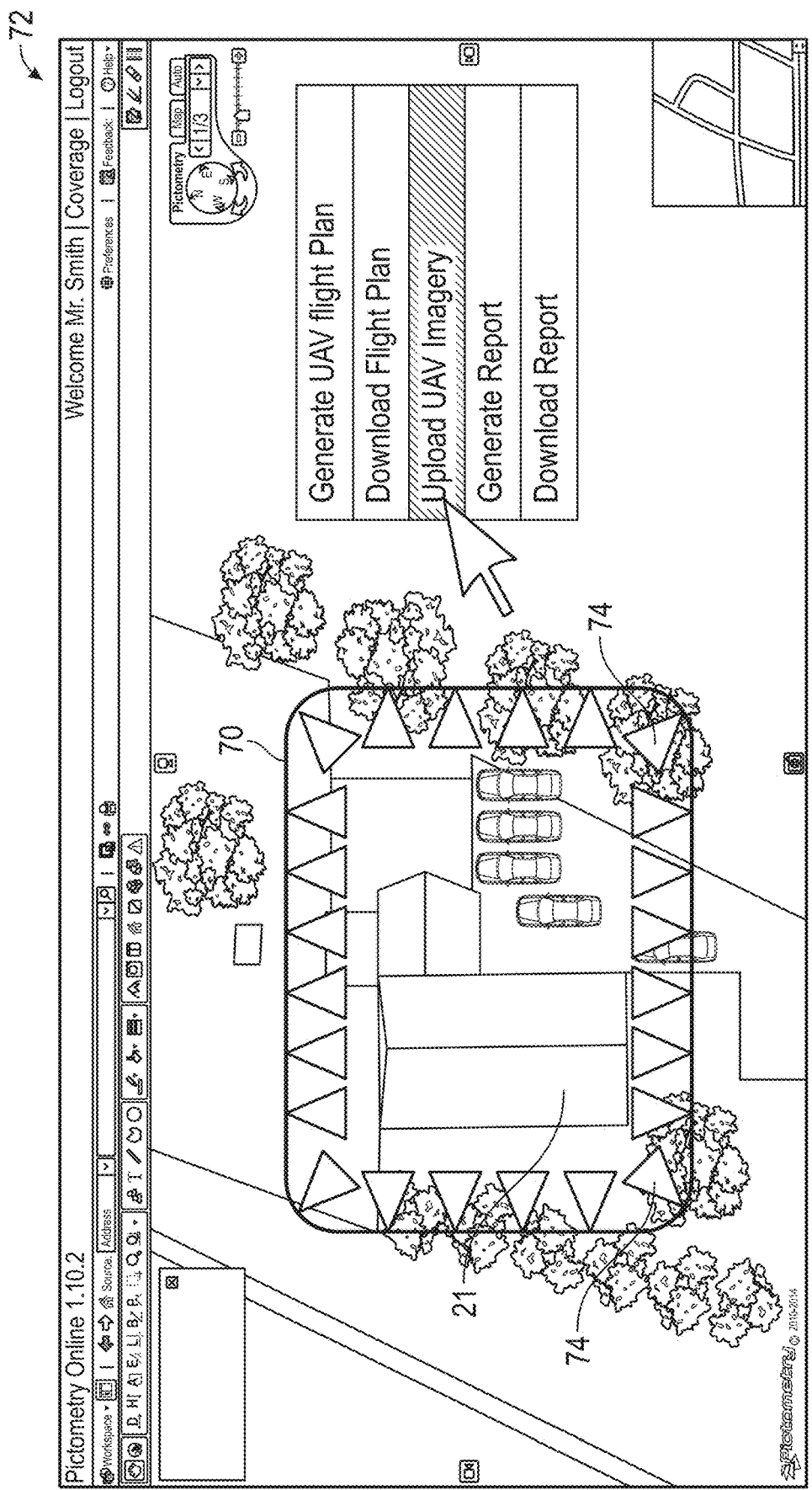
FIG. 8 is an exemplary screen shot of a nadir image of the structure shown in FIG. 4, the screen shot illustrating a camera path of an unmanned aircraft.

The camera control information may be loaded into the software running on the processor 27 of the unmanned aircraft 18 to control actuation of the camera 19 of the unmanned aircraft 18. For example, the camera control information may direct the camera 19 to capture images (e.g., oblique images) at one or more predefined geographic locations 74 (which are referred to herein below as Flight Capture Points), as illustrated in screen shot 72 of FIG. 8. In some embodiments, the camera control information may direct the camera 19 to capture images on a schedule (e.g., periodic, random). Further, the camera control information may control camera parameters including, but not limited to zoom, focal length, exposure control and/or the like.

In one embodiment, as the unmanned aircraft 18 passes the Flight Capture Points, the camera(s) 19 may be triggered to capture images. To ensure that images are captured desired locations, the Flight Capture Points may not just be points, but may be vertical planes that are perpendicular to the Flight Path 70 and that pass through the Flight Capture Points. Thus, even if the unmanned aircraft 18 is above or away from the Flight Path at the time, as it passes through that plane, and thus over or to the side of the Flight Capture Point, the software controlling the unmanned aircraft 18 may cause the camera 19 to fire to capture image(s).

Gimbal control information may be loaded into the software running on the processor 27 of the unmanned aircraft 18 to control the direction of the camera 19 relative to the structure 21. For example, the gimbal control information may control the orientation of the camera 19 in three dimensions such that during capture of an image, the camera 19 is aligned with a pre-determined location on the structure 21 that may be referred to herein as Target Capture Points.

In a step 50, the unmanned aircraft information may be stored on one or more non-transitory computer readable medium of the host system 12 and/or user terminal 14. For example, in some embodiments, the host system 12 may determine the unmanned aircraft information, communicate the unmanned aircraft information to the user terminal 14 via the network 16, such that the unmanned aircraft information may be stored on one or more non-transitory computer readable medium. Additionally, or alternatively, the user terminal 14 may determine the unmanned aircraft information and store the unmanned aircraft information on one or more non-transitory computer readable medium. In some embodiments, the one or more non-transitory computer readable medium may include a USB flash drive or other similar data storage device.

In a step 52, the unmanned aircraft information may be loaded onto the unmanned aircraft 18. For example, the unmanned aircraft information may then be loaded onto the unmanned aircraft 18 via transfer of the non-transitory computer readable medium (e.g., USB flash drive) or wirelessly transmitted from the user terminal 14. It should be noted that the unmanned aircraft information may be loaded and/or stored onto the unmanned aircraft 18 by any communication, including communication via the network 16.

The unmanned aircraft 18 may use the unmanned aircraft information to capture one or more images of the structure 21, such as oblique images. Generally, the unmanned aircraft 18 may follow the flight path 70 within the unmanned aircraft information obtaining one or more oblique images 62 as set out within the camera control information and gimbal control information. In some embodiments, a user may manually manipulate the flight path 70 of the unmanned aircraft information during flight of the unmanned aircraft 18. For example, the user may request the unmanned aircraft 18 to add an additional flight path 70 or repeat the same flight path 70 to obtain additional images 62.

In a step 54, the one or more processors 24 may receive one or more images 62, such as oblique images, captured by the unmanned aircraft 18. The flight path information, camera control information, and gimbal control information may direct the unmanned aircraft 18 to capture one or more oblique images 62 at predetermined locations and times as described herein. The one or more oblique images 62 may be communicated to the one or more processors 24 via the network and/or stored one or more non-transitory computer readable medium. The one or more oblique images 62 may be stored in one or more image database 34. In some embodiments, the one or more oblique images 62 may be communicated to the user terminal 14, and the user terminal 14 may communicate the images 62 to the one or more processors 24.

In a step 56, the one or more processors 24 may generate a structure report. The program logic 36 may provide for one or more user terminals 14 interfacing with the processor 24 over the network 16 to provide one or more structure report website pages allowing users to view the structure report.

Figure 9:
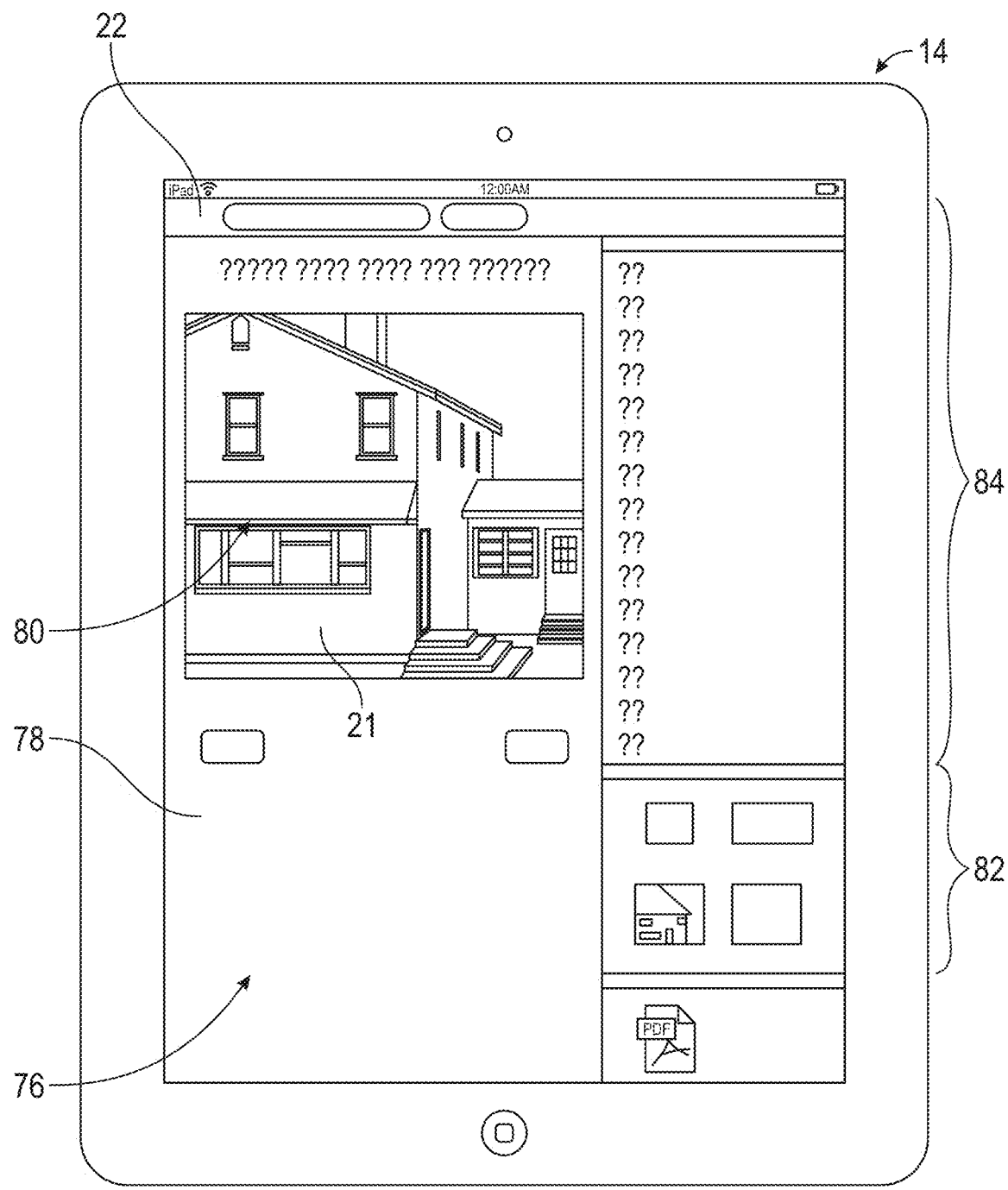
FIG. 9 is an exemplary screen shot of a structure report displayed on a display unit of a user terminal.

For example, FIG. 9 illustrates an exemplary screen shot 76 of a structure report 78 on the display unit 22 of a user terminal 14.

One or more images 62 obtained from the camera 19 of the unmanned aircraft 18 may be used for evaluation of the structure 21 for the structure report 78. For example, if the structure 21 is a building, the images 62 obtained from the camera 19 may be used in an insurance evaluation (e.g., flood damage, hail damage, tornado damage).

One or more images 62 obtained from the camera may be provided in the structure report 78. For example, the structure report 78 in FIG. 9 includes an image data set 82. The image data set 82 may include nadir and/or oblique images 62 of the structure 21. Additionally, the image data set 82 may include one or more images 62 of objects of interest on and/or within the structure 21. For example, if the structure report 78 details damage to a roof of the structure 21, one or more images 62 of damage to the roof may be included within the image data set 82. In some embodiments, third party images of the structure 21 may be included within the structure report 78.

Structural details may be provided in the structure report 78 within a structure data set 84 as illustrated in FIG. 9. The structure data set 84 may include information related to structure 21 including, but not limited to, area of the structure 21 (e.g., square feet), roof details (e.g., pitch, ridge length, valley length, eave length, rake length), height of the structure 21, and/or the like. Additionally, the structure data set 84 may include order information for the structure report 78. For example, the structure data set 84 may include information regarding the time an order for the structure report 78 was placed, the time the order for the structure report 78 was completed, the delivery mechanism for the structure report 78, the price of the order for the structure report 78, and/or the like, for example.

Based on the flight path information, camera control information, and gimbal control information during image capture, the location of the camera 19 relative to the structure 21 for images captured may also be known. For example, in some embodiments, the X, Y, Z location (e.g., latitude, longitude, and altitude) of a location seen within each image 62 may be determined. The information may be used to further evaluate objects on and/or within the structure 21. In some embodiments, images 62 captured by the unmanned aircraft 18 may be used to generate a two or three-dimensional model of the structure 21.

In use, some embodiments of the unmanned aircraft structure evaluation system 10 may be used as follows. In on example, an insurance adjustor or other field operator may arrive at the structure 21 to assess the structure 21 for damage or for underwriting. The operator may utilize an online application on a portable networked computer device (e.g., user terminal 14), such as a tablet, smart phone, or laptop, and select the property and structure 21. This selection may be done with identification information, for example, with a GPS determining the current location of the operator, through entering a street address into the search bar, through entering the geographic location into the user terminal 14, through scrolling on a map or aerial image displayed on the user terminal 14 of the current location, or through a preselected target property made by virtually any method that results in finding the property and storing it for later retrieval.

Once the location is found, an image or three-dimensional model for that property and structure 21 may be displayed on the display unit 22 of the user terminal 14. In one embodiment, the image may be an oblique image, and/or a street side image, which may provide more information to the operator for property verification than traditional orthogonal images, as traditional orthogonal images do not include any portion of the side of the image. Additionally, or alternately, a 3D model (which may be textured with an oblique or street side image) may be used. The operator may verify that the property and structure 21 on the display unit 22 matches the property and structure 21 to be evaluated, to ensure that the operator generates the proper report.

The operator may then select the structure 21 (for example, by clicking on the structure 21 depicted in the image) and may request a flight plan 70 for that structure 21. Software, running on either or both of the user terminal 14 and the host system 12 may then isolate the structure 21 and generate an outline as described above. The software may also cause the user terminal 14 system to determine the height ("H") of the structure 21, either by using an automated method, or by having the operator use a height tool on the oblique image, such as through the method described in U.S. Pat. No. 7,424,133. This height H may then be used to automatically determine the proper flying height, lateral offset $L_{OFFSET}$, and vertical offset $V_{OFFSET}$ offset for the flight path 70 for the unmanned aircraft 18 (which may be an unmanned aerial system). The height H may also be used to aim the steerable camera 19 carried by the unmanned aircraft 18.

In one embodiment, a "Target Path" may be generated that follows the path of the perimeter of the structure 21 and that is at a height over ground such that a center $C_1$ of the field of view may be located at one-half the height of the structure 21 as illustrated in FIG. 5. For example, if the structure 21 is a two-and-a-half story structure of 28' height, the Target Path would be generated such that the center $C_1$ of the field of view may be at 14' height over ground. Although, it should be understood that the height over ground does not have to place the center $C_1$ of the field of view to be one-half the height of the structure 21 and may vary.

Characteristics of the camera 19 may be used, such as, for example, the desired effective resolution of the image as well as the overall sensor size of the camera 19 onboard the unmanned aircraft 18, to determine the maximum vertical swath width that may be captured on a single pass. For instance, if the desired effective image resolution is ¼" GSD, and the sensor has 4,000 pixels in the vertical orientation, then the maximum vertical swath width would be 1,000" or 125'. A significant buffer B may be subtracted out to allow for position and orientation errors when flying, for buffeting due to wind, and for absolute position errors in the reference imagery. The size of the buffer B may vary, but may be approximately a 20% buffer on all sides of the imagery. As such, in this example, the maximum vertical swath width would be 75'. If the structure 21 has a greater height H than this, then the structure 21 may need to be captured in multiple passes of the unmanned aircraft 18. If so, using the same example numbers above, the first pass would be captured at 37.5' above ground, the second at 112.5' above ground, the third at 187.5' above ground, and so on until the desired images of the structure 21 are captured.

If the structure 21 is smaller than the maximum vertical swath width, then the resolution may be increased beyond the desired effective image resolution. In the above example of the two-and-a-half story house, the resolution may be switched to ⅛", which would yield a maximum swath width of 37.5', which is more than sufficient to cover the 28' of structure height while still including the 20% buffer B on all sides.

Once the effective image resolution has been determined, the lateral offset $L_{OFFSET}$ and vertical offset $V_{OFFSET}$ may then be determined. In one embodiment, the vertical offset $V_{OFFSET}$ may then be determined by calculating the path length that achieves the determined resolution. For instance, with a 5-micron sensor pitch size and a 50-mm lens, the path length would be 104'. If the desired imagery is to be captured at an angle Θ of 40-degrees (an angle from approximately 40-degrees to approximately 50-degrees down from horizontal is typically optimal for oblique aerial imagery), then that translates to a lateral offset $L_{OFFSET}$ of 79.6' stand-off distance (cosine of 40×104') and a vertical offset $V_{OFFSET}$ of 66.8' vertical height adjustment (sine of 40×104').

Using the Target Path as a starting point, the path would now be grown by the requisite lateral offset $L_{OFFSET}$ and vertical offset $V_{OFFSET}$ distance using standard geometry or morphological operators to create the Flight Path 70. For instance, if the Target Path were a perfect circle, the radius would be extended by the 79.6' lateral offset $L_{OFFSET}$ distance. If the target path were a rectangle, each side would be extended outward by the 79.6' lateral offset $L_{OFFSET}$ distance. The flying altitude for the Flight Path 70 may be determined by adding the vertical offset $V_{OFFSET}$ distance to the height of the Target Path and then adding that to the ground elevation for the starting point of the flight path 70. In the example of the 28' house, the flight altitude would be the sum of the 14' Target Path height over ground, the 66.8' vertical offset $V_{OFFSET}$ for the desired resolution, and the base elevation at the start, which for this example will be 280' above ellipsoid. Thus, the resulting flight height would be 360.8' above ellipsoid.

Ellipsoidal heights are used by GPS-based systems. If the elevation data available, such as an industry standard Digital Elevation Model or as the Tessellated Ground Plane information contained in the oblique images, as described in U.S. Pat. No. 7,424,133, is defined in mean sea level, the geoidal separation value for that area can be backed out to determine an ellipsoidal height, as is a well-known photogrammetric practice. From a software stand-point, a software library such as is available from Blue Marble Geo can be used to perform this conversion automatically.

Next, the software may determine Target Capture Points of the camera control information. The Target Capture Points may be spaced along the Target Path in such a manner as to ensure full coverage of the vertical structure 21. This may be determined using a similar method as was done with the maximum vertical swath width. Once the desired resolution is known, it is multiplied by the number of pixels in the horizontal orientation of the sensor of the camera 19, and then sufficient overlap is subtracted.

Using the above example, if there are 3,000 pixels in the sensor of the camera 19 in the horizontal orientation and the software uses the same 20% overlap and ⅛" GSD effective image resolution that is discussed above, then a suitable spacing distance for the Target Capture Points would be 18.75'. Thus, an arbitrary start point would be selected (typically a corner along the front wall is used) and then, going in an arbitrary direction, a Target Capture Point would be placed on the Target Path every 18.75' as well as one at the next corner if it occurs before a full increment. A Target Capture Point may then be placed on the start of the next segment along the Target Path and this pattern may be repeated until all the segments have Target Capture Points.

Once all the Target Capture Points have been determined, the Target Capture Points can be projected onto the Flight Path 70 to create Flight Capture Points. This projection may be accomplished by extending a line outward from the Target Path that is perpendicular to the Target Path and finding where the line intersects the Flight Path 70. This has the effect of applying the lateral offset $L_{OFFSET}$ distance and vertical offset $V_{OFFSET}$ calculated earlier. These Flight Capture Points may then be used to fire the camera 19 as the unmanned aircraft 18 passes by the Flight Capture Points. When doing so, the unmanned aircraft 18 may keep the camera aimed at the respective Target Capture Point. This aiming can be accomplished by a number of methods, such as an unmanned aircraft 18 that can turn, but is best accomplished with a computer-controlled gimbal mount 220 for the camera 19.

Additionally, or alternatively, the camera 19 on the unmanned aircraft 18 may be implemented with "full motion video mode", whereby continuous images are captured at a high rate of speed (typically greater than 1 frame per second up to and even beyond 30 frames per second). Capturing at high frame rates ensures sufficient overlap of the images. However, capturing at high frame rates also results in a much greater amount of image data, which requires longer upload times than smaller amounts of image data. In addition, many cameras 19 are capable of capturing higher resolution imagery in "still frame video" mode as well as "full motion video" mode. While still frame video mode is preferred from a resolution and data transfer standpoint, if the camera 19 has a full motion video mode, then the full motion video mode may also be used. When in full motion video mode, the unmanned aircraft 18 may follow the Flight Path 70 keeping the camera 19 aimed towards the Target Path while capturing full motion video.

The unmanned aircraft 18 may follow the indicated Flight Path 70 through autonomous flight. There are numerous computer systems that can be configured as a flight management system to achieve this available on the market today. The flight management system, either onboard, or on the ground and communicating to the unmanned aircraft 18 through remote communication, may then track the progress of the unmanned aircraft 18 along the Flight Path 70. When the unmanned aircraft 18 passes a Flight Capture Point, the camera 19 may be triggered to capture a frame. Or in the event that full motion video was selected, the camera 19 may be continually firing as the unmanned aircraft 18 flies along the Flight Path 70. The position and orientation of the unmanned aircraft 18 may be monitored and the camera 19 aimed towards the corresponding Target Capture Point, or in the event that full motion video was selected, the flight management system may keep the camera aimed towards the nearest point on the Target Path. This may be accomplished by calculating the relative directional offset between the line moving forward on the Flight Path and the line from the Flight Capture Point to the Target Capture Point (or nearest point on the Flight Path 70 for full motion video). This then results in a yaw and declination offset for the camera gimbal. Typically, these offsets are a relative yaw of 90-degrees and a relative declination equal to the oblique down-look angle selected above (in the example, 40-degrees). However, since airborne systems are continually moved around by the air, offsets for a shift in position, a shift due to crabbing, or a shift in the yaw, pitch, or roll of the unmanned aircraft 18 may need to be accounted for. Again, this may be done by using the forward path along the Flight Path 70 that the unmanned aircraft 18 is currently on, and offsetting it by the relative yaw, pitch, and roll offsets of the unmanned aircraft 18 as measured by the position and orientation system, and then further adjusted by the relative yaw and declination as described above.

In one embodiment, a computerized system for an unmanned aircraft 18 may comprise a computer system having one or more processors 23, 24, 27 and one or more non-transitory computer readable medium 25, 26, 29. The computer system may comprise one or more of the processor 23 of the unmanned aircraft 18, the processor 24 of the host system 12, the processor 27 of the user terminal 14, and combinations thereof. The computer system may comprise one or more non-transitory computer readable medium 29 of the unmanned aircraft 18, the non-transitory computer readable medium 26 of the host system 12, the non-transitory computer readable medium 25 of the user terminal 14, and combinations thereof.

The one or more processors 23, 24, 27 may execute image display and analysis software to cause the one or more processors 23, 24, 27 to generate unmanned aircraft information including flight path information for capturing images 62 of a section of a roof having a plane. As used herein, the term "roof plane" is a surface on which a straight line joining any two points on the surface would wholly lie. The flight path information may be configured to direct the unmanned aircraft 18 to fly a flight path 70 based at least in part on a pitch 49 of the section of the roof and information from one or more sensor 17 indicative of a location of the section of the roof. The flight path 70 may be configured include waypoints at which the unmanned aircraft 18 may capture images 62 at a consistent image-capture distance 47 from the roof plane of the section of the roof. The image-capture distance 47, which may be referred to as a "sample distance", from the roof to the camera 19 may determine the resolution of the images 62 of the roof captured by the camera 19 when other parameters of the camera remain the same.

The flight path 70 may be parallel to the roof plane of the roof of the structure 21, based on the pitch 49 of the surface of the structure 21 and on maintaining a substantially consistent image-capture distance 47 between the roof of the structure 21 and the unmanned aircraft 18. The flight path 70 may be substantially within, and/or adjusted to be substantially within a predetermined range 51 of image-capture distances 47 from the roof.

Figure 11:
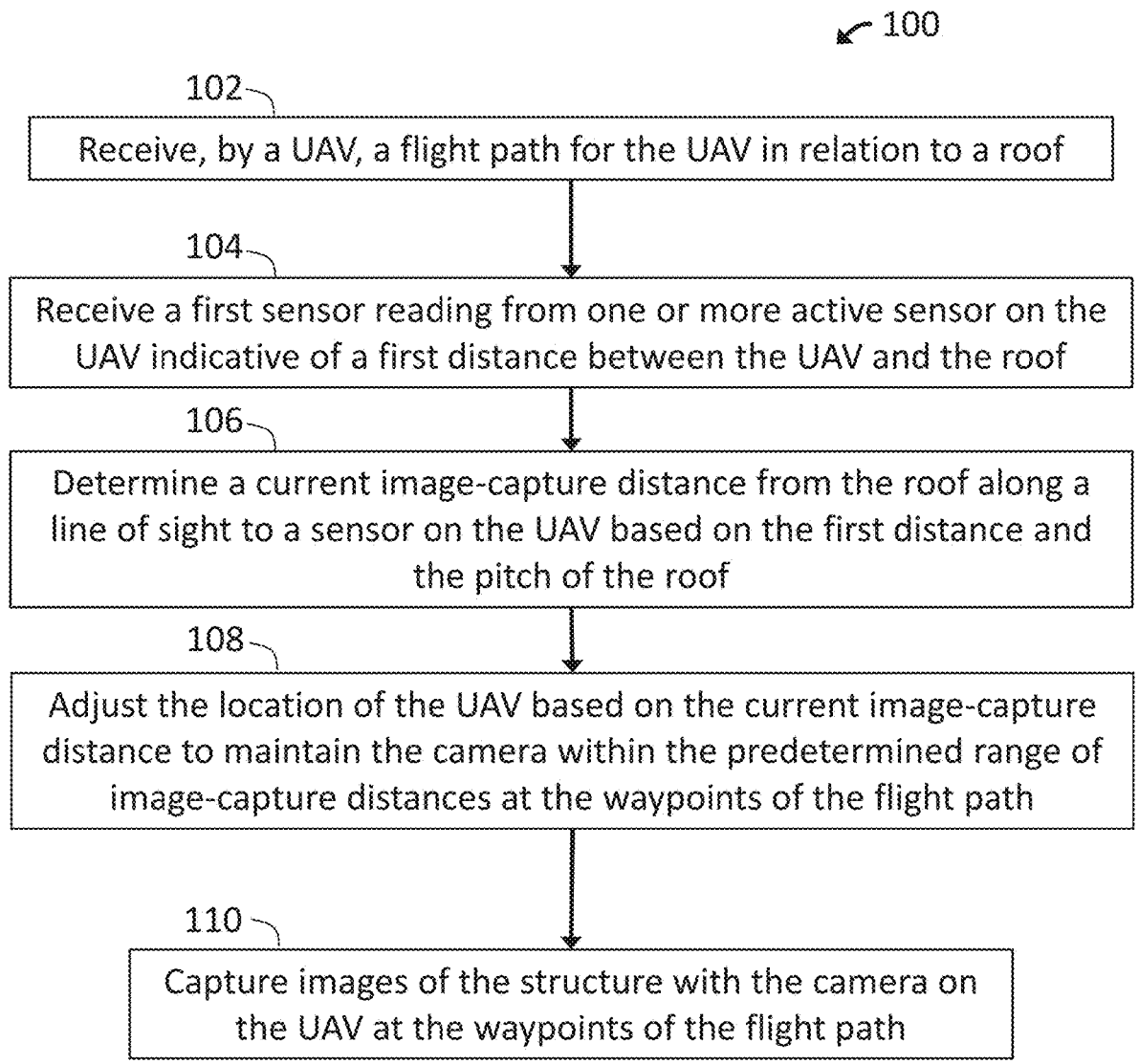
FIG. 11 is a flow chart of another exemplary embodiment of a program logic according to the instant disclosure.

Referring now to FIG. 11, in one embodiment, a method 100 of navigating an unmanned aircraft 18 capturing images 62 of a roof using pitch 49 may comprise a step 102 of receiving, by the unmanned aircraft 18, a flight path 70 for the unmanned aircraft 18 in relation to a roof of a structure 21. The roof may have a plurality of sections. The flight path 70 may have waypoints for capturing one or more images 62 of the roof based on a three-dimensional model of the roof including a pitch 49 and/or direction of slope for each section of the roof. Pitch 49 may be expressed as "rise over run" (a ratio, expressed as a fraction, with the numerator being the rise in vertical distance and the denominator being the run in horizontal distance) and/or as an angle. Two or more waypoints of the flightpath 70 are within a predetermined range of image-capture distances from the roof.

In a step 104, the method 100 may comprise receiving, by the one or more computer processor 23, 24, 27, a first sensor reading from one or more sensor 17 on the unmanned aircraft 18. The first sensor reading may be indicative of a first distance 41 between the unmanned aircraft 18 and the roof of the structure 21.

In a step 106, the method 100 may comprise determining, with the one or more computer processor 23, 24, 27, a current image-capture distance 47 from the roof along a line of sight to a sensor 17, such as a camera 19, on the unmanned aircraft 18. The determination of the image-capture distance 47 may be based on the first distance 41 and the pitch 49 of the roof.

In a step 108, the method 100 may comprise adjusting the location of the unmanned aircraft 18 based on the current image-capture distance 47 to maintain the camera 19 within the predetermined range 51 of image-capture distances 47 at the waypoints of the flight path 70 and/or throughout the flight path 70.

In a step 110, the method 100 may comprise capturing images of the roof of the structure 21 with the camera 19 on the unmanned aircraft 18 at the waypoints of the flight path 70 within the predetermined range 51 of image-capture distances.

Figure 12:
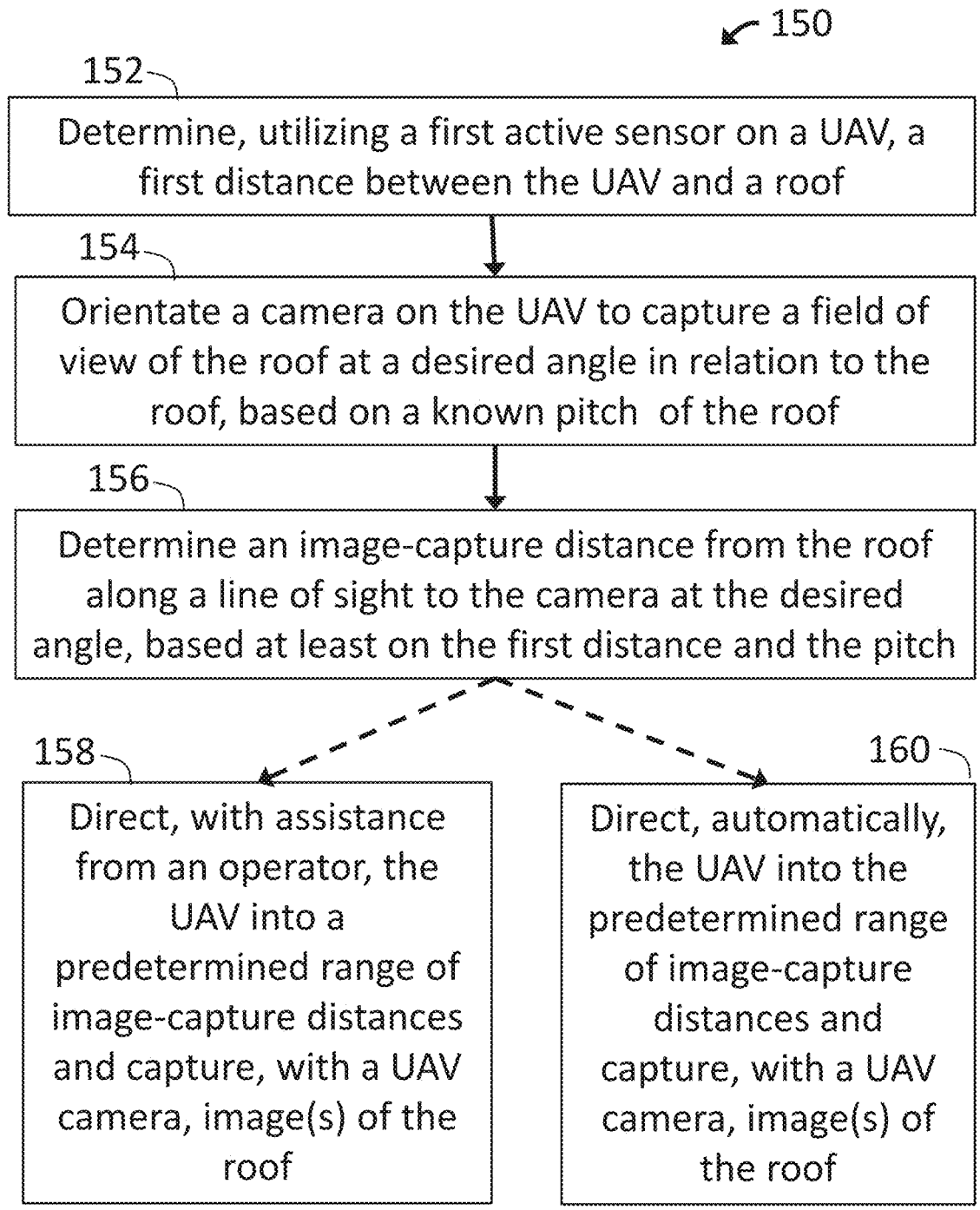
FIG. 12 is a flow chart of yet another exemplary embodiment of a program logic according to the instant disclosure.

Referring now to FIG. 12, in one embodiment, a method 150 for navigating an unmanned aircraft 18 using pitch may comprise a step 152 of determining, utilizing a first sensor 17 on the unmanned aircraft 18, a first distance 41 or 43 between the unmanned aircraft 18 and a roof of the structure 21. In a step 154, the method 150 may comprise orientating the camera 19 on the unmanned aircraft 18 to capture a field of view of the roof at a desired angle 53 in relation to the roof, based on a known pitch 49 of the roof. In a step 156, the method 150 may comprise determining an image-capture distance 47 from the roof along a line of sight to the camera 19 at the desired angle 53, based at least on the first distance 41 or 43 and the pitch 49.

The unmanned aircraft 18 may be moved into a predetermined range 51 of image-capture distances 47 from the roof of the structure 21. In one embodiment, moving the unmanned aircraft 18 into the predetermined range 51 of image-capture distances 47 may be accomplished by displaying a message on the operator's terminal 14 to prompt the operator to navigate the unmanned aircraft 18 into the predetermined range 51 of image-capture distances 47. Additionally, or alternatively, an autonomous flight management system within the unmanned aircraft 18 may receive instructions to navigate the unmanned aircraft 18 into the predetermined range 51 of image-capture distances 47.

Figure 28:
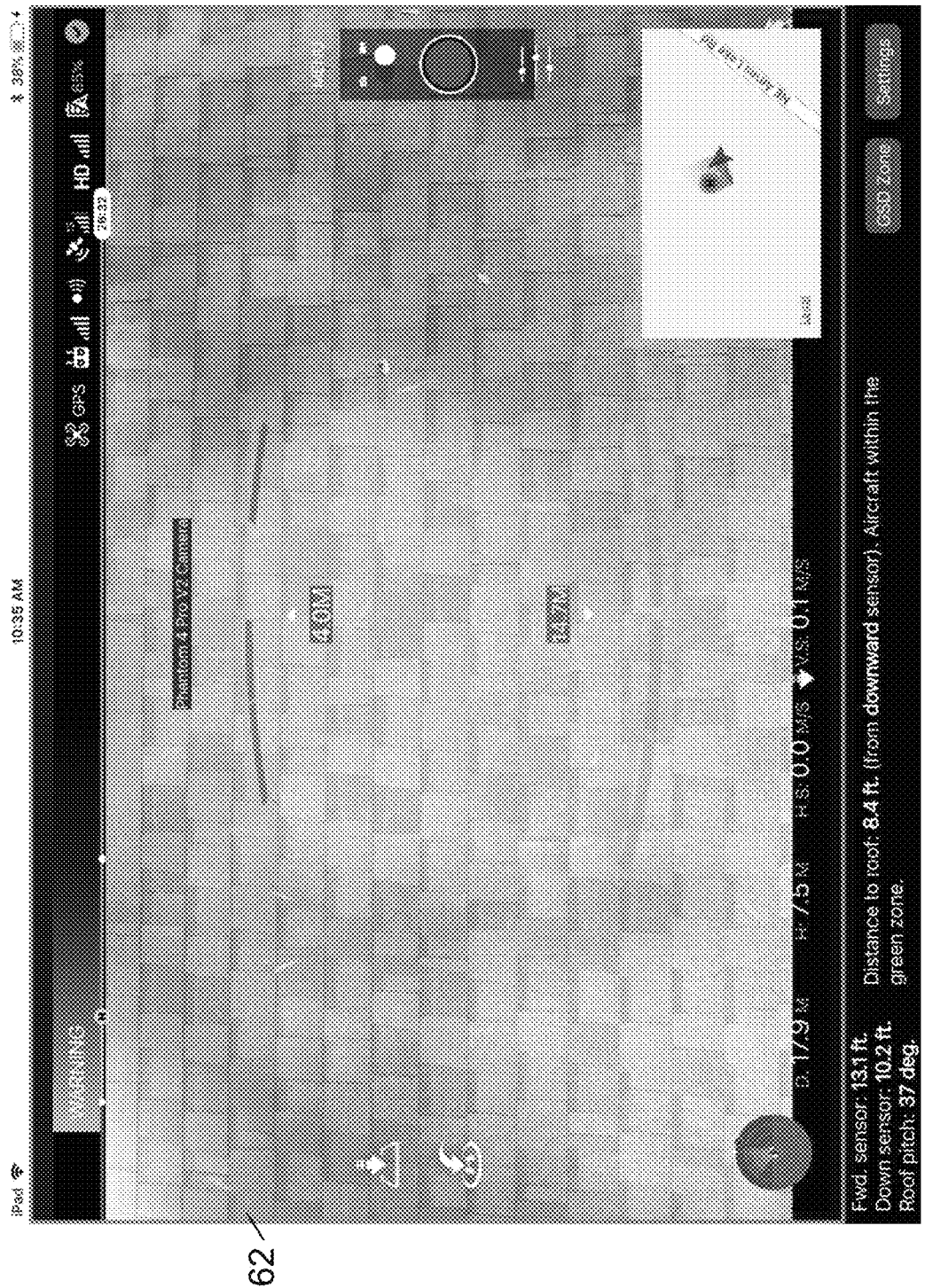
FIG. 28 is an exemplary screen shot of a display in a system for navigating an unmanned aircraft using pitch of a roof in accordance with the instant disclosure.
Figure 29:
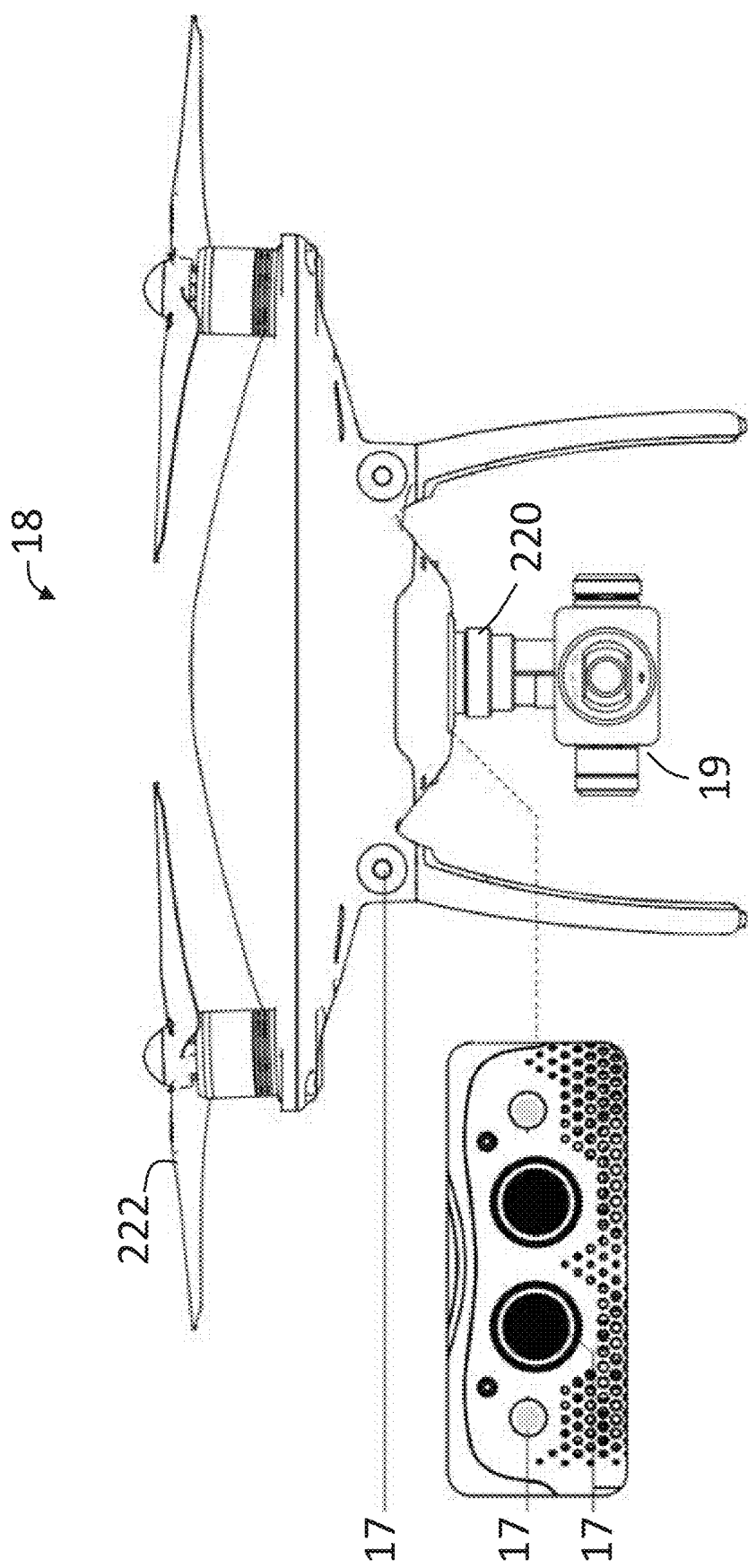
FIG. 29 is an illustration of an exemplary unmanned aircraft in accordance with the instant disclosure.
Figure 30:
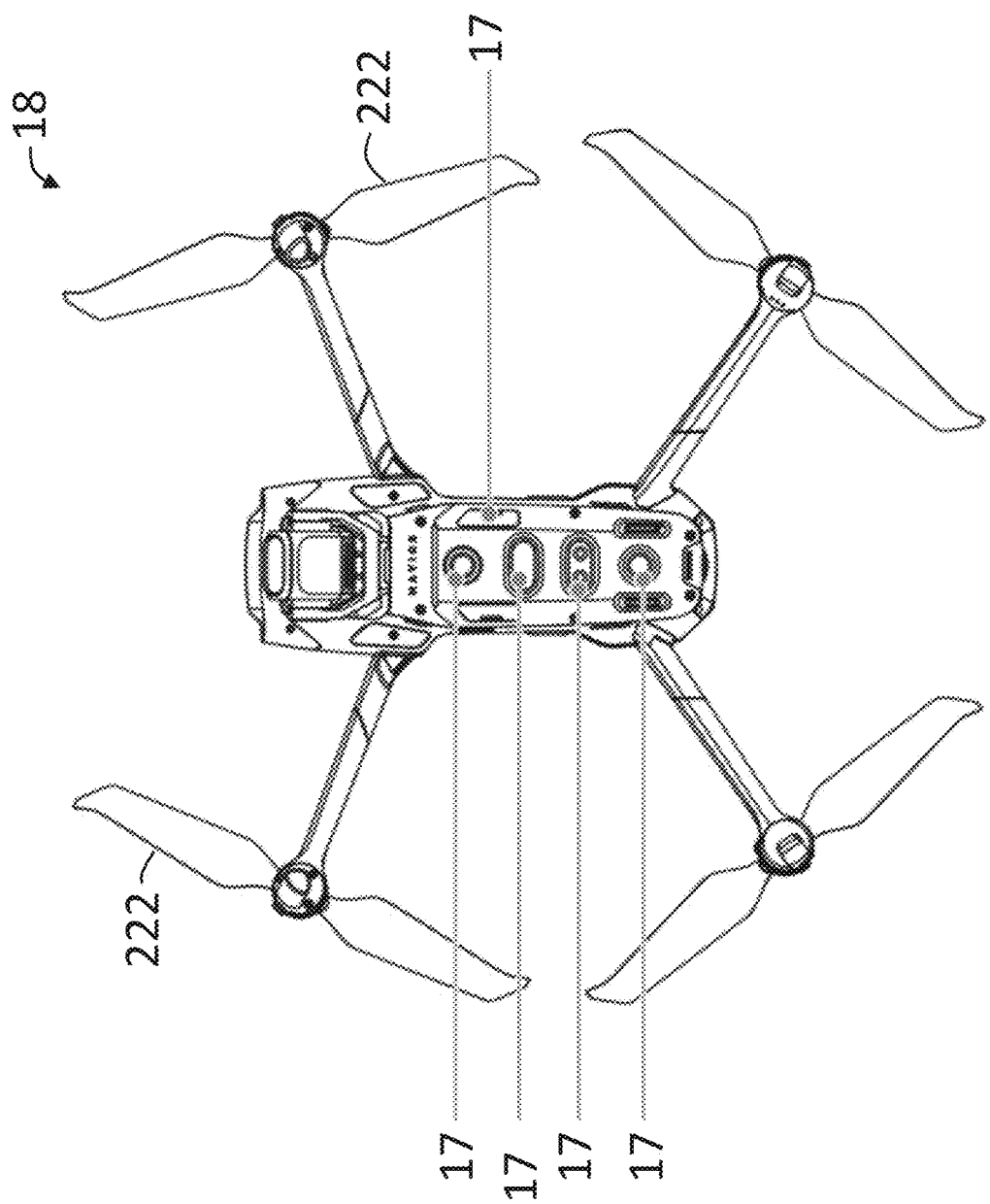
FIG. 30 is an illustration of an exemplary unmanned aircraft in accordance with the instant disclosure.

In one embodiment, optionally, the method 150 may further comprise step 158, which comprises displaying the determined image-capture distance 47 to an operator of the unmanned aircraft 18 (for example, as shown in FIG. 28, and such as on the display unit 22 of the user terminal 14); receiving, by the unmanned aircraft 18, a command with instructions to move the unmanned aircraft 18 into a predetermined range 51 of image-capture distances 47 from the roof of the structure 21; navigating the unmanned aircraft 18 into the predetermined range 51; and capturing, with the camera 19 on the unmanned aircraft 18, one or more images 62 of the roof of the structure 21 from the predetermined range 51 of image-capture distances 47.

Additionally, or alternately, to step 158, in one embodiment, the method 150 may optionally further comprise a step 160 which comprises determining, with the one or more computer processor 23, 24, 27, that the determined image-capture distance 47 is outside of a predetermined range 51 of image-capture distances 47 from the roof of the structure 21; moving the unmanned aircraft 18 into the predetermined range 51 of image-capture distances 47; and capturing, with the camera 19 on the unmanned aircraft 18, one or more images 62 of the roof of the structure 21 from the predetermined range 51 of image-capture distances 47.

In one embodiment, steps 156 and 158 and/or 160 may be repeated at a plurality of waypoints in the flightpath of the unmanned aircraft 18 and/or at other points in the flightpath of the unmanned aircraft 18.

Figure 13:
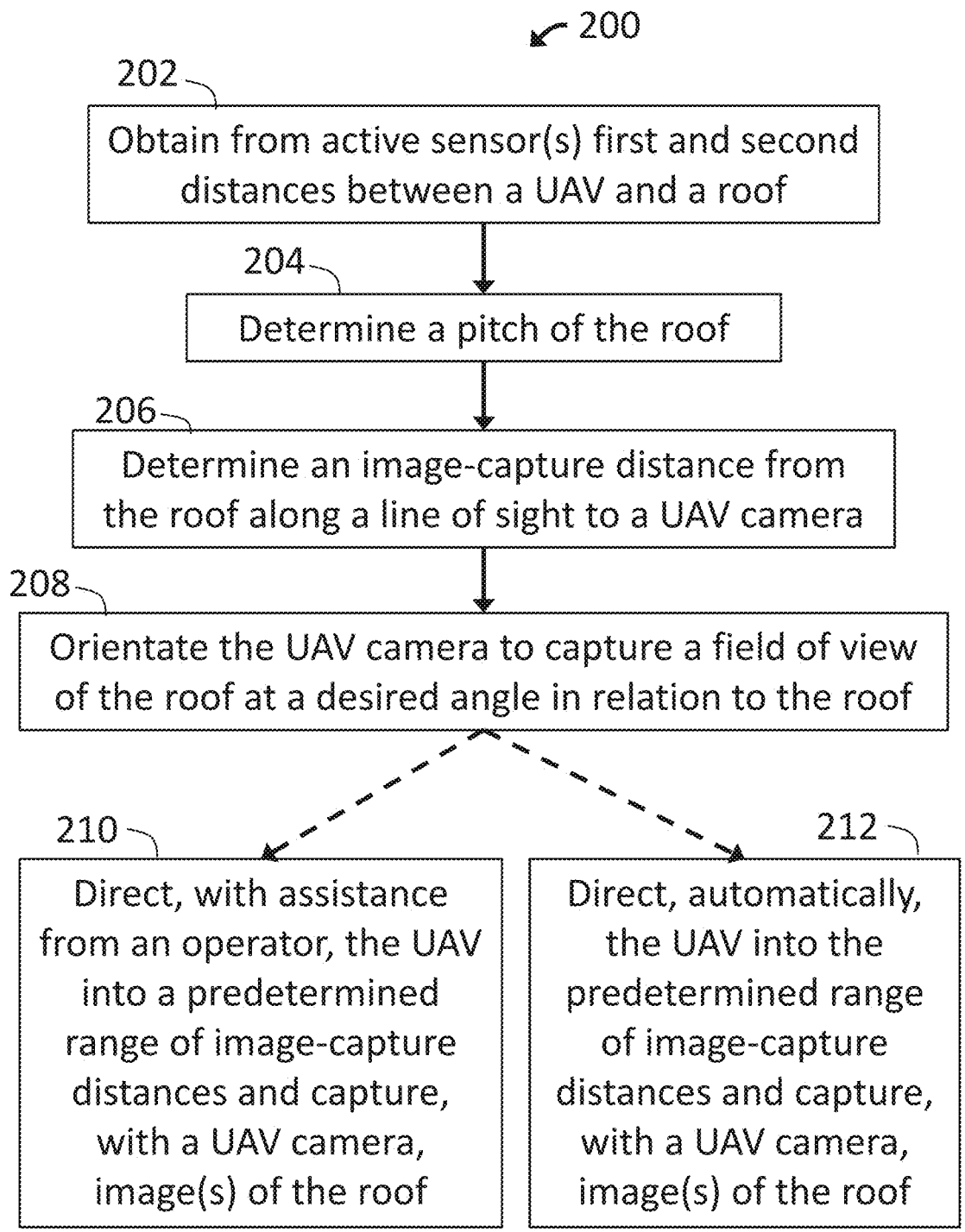
FIG. 13 is a flow chart of yet another exemplary embodiment of a program logic according to the instant disclosure.

Referring now to FIG. 13, in one embodiment, a method 200 for navigating an unmanned aircraft 18 using pitch may comprise a step 202 which may comprise receiving, by one or more computer processor 23, 24, 27, a first sensor reading from one or more sensor 17 on the unmanned aircraft 18 at a first position indicative of a first distance 41 between the unmanned aircraft and a roof of a structure 21. The step 202 may further comprise receiving, by the computer processor 23, 24, 27, a second sensor reading from the one or more sensor 17 on the unmanned aircraft 18 at the first position indicative of a second distance 43 between the unmanned aircraft 18 and the roof of the structure 21. The angle 39 between the line of sight of the second sensor reading and the line of sight of the first sensor reading may be known (which may also be referred to as the known angle 39 between the capture point of the first distance 41 and the capture point of the second distance 43), for example, based on known locations and/or orientations of the one or more sensor 17 on the unmanned aircraft 18.

The method 200 may further comprise a step 204 comprising determining, with the computer processor 23, 24, 27, a pitch 49 of the roof using the first distance 41, the second distance 43, and the known angle 39. In one embodiment, determining the pitch 49 may comprise determining the pitch 49 when the known angle 39 is approximately ninety degrees, and the first distance 41 is a "forward distance" in relation to the unmanned aircraft 18, and the second distance 43 is a non-zero "downward distance" from the unmanned aircraft 18. In such an example, the pitch 49 of the roof may be determined using the following formula:

$$\text{Roof pitch} = \tan^{-1}\left(\frac{\text{Forward distance}}{\text{Downward distance}}\right)$$

Figure 35:
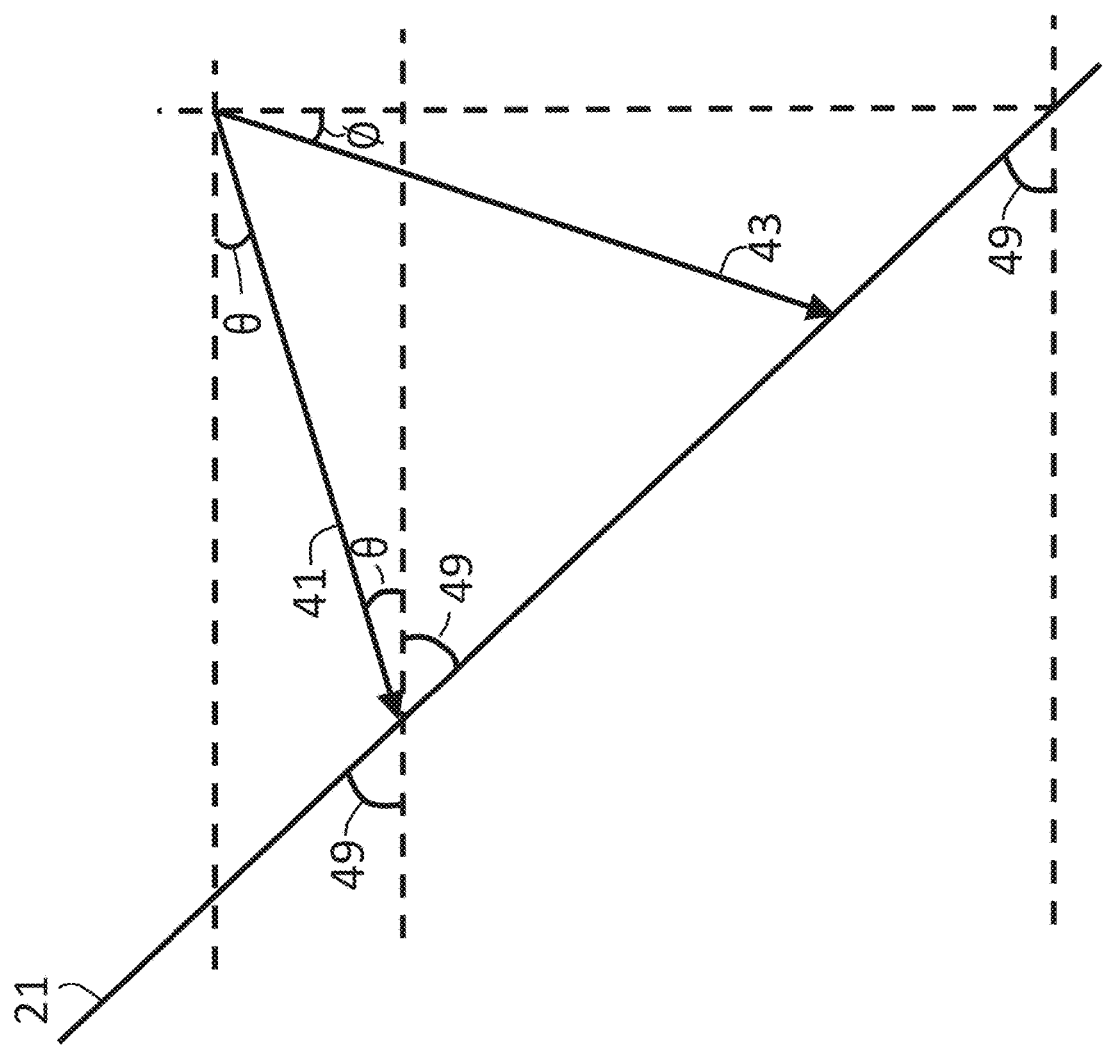
FIG. 35 is a diagram of a method for navigating an unmanned aircraft using pitch of a roof in accordance with the instant disclosure.

As shown in FIG. 35, in one embodiment, determining the pitch 49 may comprise determining the pitch 49 when the known angle 39 is less than or greater than approximately ninety degrees, and the first distance 41 is a "forward distance" in relation to the unmanned aircraft 18 that is greater than the second distance 43, where the second distance 43 is a non-zero "downward distance" from the unmanned aircraft 18. In such an example, the pitch 49 of the roof may be determined using the following formula (where "a" is the first distance 41, where "b" is the second distance 43, and as shown in FIG. 35):

$$\text{Roof pitch} = \sin^{-1}\left(\frac{b \sin(90 - \theta - \emptyset)}{\sqrt{a^2 + b^2 - 2ab \cos(90 - \theta - \emptyset)}}\right) - \theta$$

In one embodiment, determining the pitch 49 may comprise determining the pitch 49 when the known angle 39 is less than or greater than approximately ninety degrees, and the first distance 41 is a "forward distance" in relation to the unmanned aircraft 18 that is less than the second distance 43, where the second distance 43 is a non-zero "downward distance" from the unmanned aircraft 18. In such an example, the pitch 49 of the roof may be determined using the following formula (where "a" is the first distance 41, where "b" is the second distance 43, and as shown in FIG. 35):

$$\text{Roof pitch} = 180 - \sin^{-1}\left(\frac{a \sin(90 - \theta - \emptyset)}{\sqrt{a^2 + b^2 - 2ab \cos(90 - \theta - \emptyset)}}\right) - 90 + \emptyset$$

Further, the image-capture distance 47 to the roof from the camera 19 may be determined utilizing one or both of the following formulas when the known angle 39 is approximately ninety degrees (where "a" is the first distance 41, where "b" is the second distance 43):

Image-capture distance=$a$*sin(Roof pitch)

Image-capture distance=$b$*cos(Roof pitch)

Figure 36:
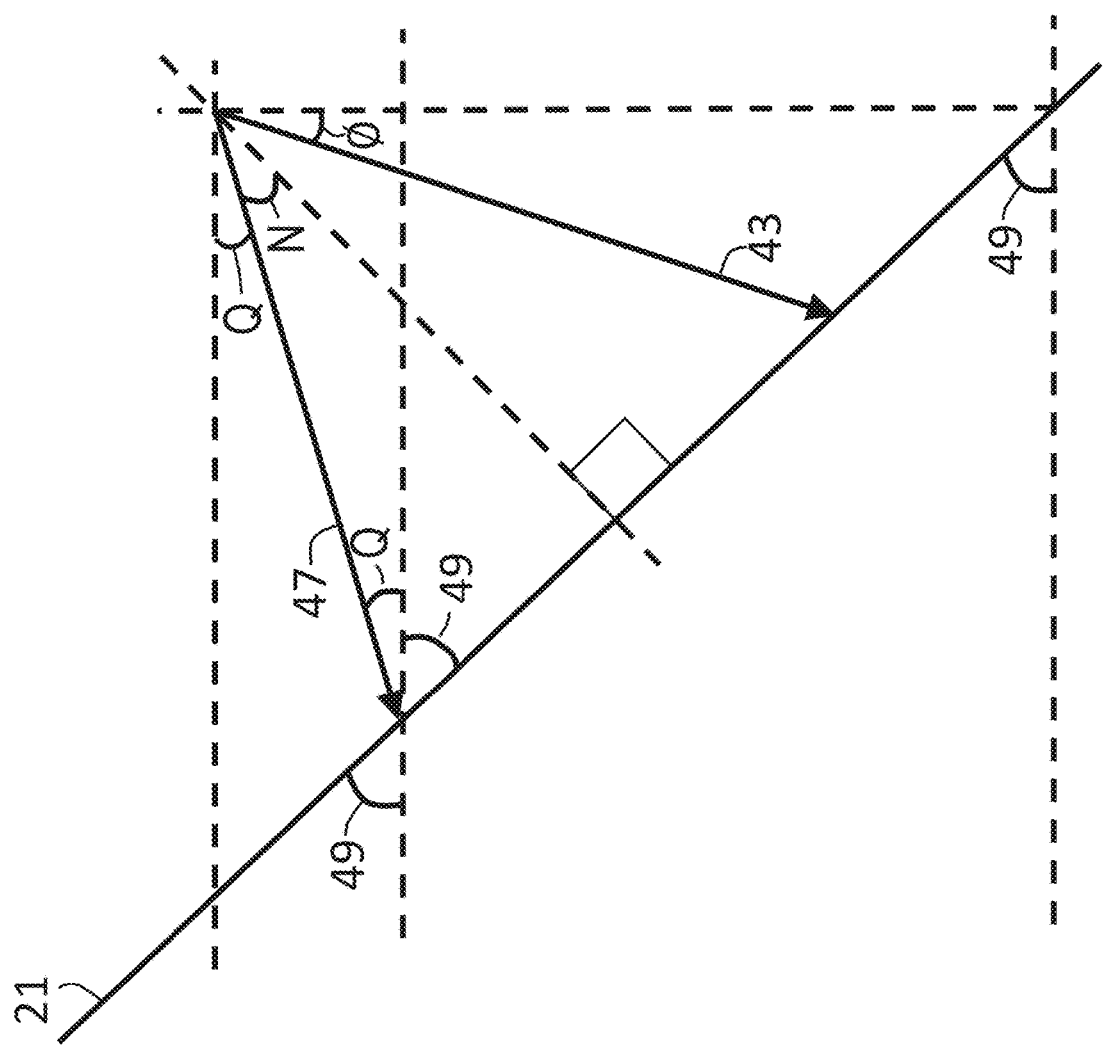
FIG. 36 is a diagram of a method for navigating an unmanned aircraft using pitch of a roof in accordance with the instant disclosure.

Additionally, as shown in FIG. 36, the image-capture distance 47 to the roof from the camera 19 may be determined utilizing the following formulas when the known angle 39 is not ninety degrees (where "a" is the first distance 41, where "b" is the second distance 43):

Image-capture distance=($b$ sin(90−Roof pitch+∅))/ (sin(Q+Roof pitch))

where the angle N=90−Q+Roof pitch.

In one embodiment, the unmanned aircraft 18 may have two or more forward-facing sensors 17 and/or two or more downward-facing sensors 18 in relation to the unmanned aircraft 18. In such a case, the computer processor 23, 24, 27 may receive two or more sensor readings from the two or more forward-facing sensors 17 indicative of two or more first distances 41, and may utilize the smallest non-zero value of the two or more first distances 41 as the "forward distance" in the determination of roof pitch 49. Likewise, the computer processor 23, 24, 27 may receive two or more sensor readings from the two or more downward-facing sensors 17 indicative of two or more second distances 43, and may utilize the smallest non-zero value of the two or more second distances 43 as the "downward distance" in the determination of roof pitch 49.

The computer processor 23, 24, 27 may use the sensor readings specifically from the forward pointing Vision sensors 17 to determine the first distance 41 (the forward distance). Unlike what happens with the ultrasonic/infrared downward sensors, the SDK may obtain the readings from each individual Vision sensor 17. In order to determine the first distance 41 (the forward distance), the computer processor 23, 24, 27 may scan all forward pointing sensors 17 in the unmanned aircraft 18 (for example, four sensors in the Phantom 4. Pro series, two sensors in the Mavic 2 series), and may return the smallest reading among them as long as that reading is not zero.

The method 200 may further comprise a step 206 comprising determining, with the one or more computer processor 23, 24, 27, an image-capture distance 47 from the roof along a line of sight to the camera 19 on the unmanned aircraft 18 at a desired camera angle 53 in relation to the roof, based on the pitch 49, the desired angle 53, and one or more of the first distance 41 and the second distance 43. In one embodiment, determining the image-capture distance may comprise using the pitch 49 combined with one or more of the first distance 41 and the second distance 43.

For example, the image-capture distance 47 may be determined using one or both of the following formulas:

$$\text{image-capture distance} = \text{SIN}(\text{roof pitch angle}) \times (\text{first distance}) \quad (1)$$

$$\text{image-capture distance} = \text{COS}(\text{roof pitch angle}) \times (\text{second distance}) \quad (2)$$

In one embodiment of any one of the methods described herein, including but not limited to methods 100, 150, 200, the image-capture distance 47 may be determined using the following steps:

(1) Receive, obtain, or determine the first distance 41 (for example, a "forward distance") and the second distance 43 (for example, a "downward distance").

(2) If both the first distance 41 and the second distance 43 are well defined (the term "well defined" as used herein means the sensor 17 is detecting an object and the sensor reading value is not zero), then:
  a. If the first distance 41 (forward distance) is smaller than the second distance 43 (downward distance), then:
   i. Set "distance to use" to the first distance 41 (forward distance);
   ii. Set "distance source" to "Forward".
  b. Else:
   i. Set "distance to use" to the second distance 43 (downward distance);
   ii. Set "distance source" to "Downward".

(3) Else, if only the first distance 41 (forward distance) is well defined:
  a. Set "distance to use" to the first distance 41 (forward distance)
  b. Set "distance source" to "Forward";

(4) Else, if only the second distance 43 (downward distance) is well defined:
  a. Set "distance to use" to the second distance 43 (downward distance);
  b. Set "distance source" as "Downward".

(5) If both "distance to use" and "distance source" are well defined:
  a. If "distance source" is "Forward":
   i. Determine the linear distance to the roof (the image-capture distance 47) using the following formula:

Distance to roof=Distance to use×sin(Roof pitch)

b. Else:
   i. Determine the linear distance to the roof (the image-capture distance 47) using the following formula:

Distance to roof=Distance to use×cos(Roof pitch)

Additionally, the method 200 may comprise a step 208 which may comprise orientating the camera 19 on the unmanned aircraft 18 to capture a field of view of the roof at a desired angle 53 in relation to the roof plane of the roof, based on the pitch 49 of the roof.

In one embodiment, optionally the method may further comprise a step 210, which may comprise displaying the determined image-capture distance 47, to an operator of the unmanned aircraft 18 (see, for example, FIG. 28); receiving, by the unmanned aircraft 18, a command with instructions to move the unmanned aircraft 18 into a predetermined range 51 of image-capture distances 47 from the roof of the structure 21; navigating the unmanned aircraft 18 into the predetermined range 51; and capturing, with a camera 19 on the unmanned aircraft 18, one or more images 62 of the roof of the structure 21 from the predetermined range 51 of image-capture distances 47.

In one embodiment, additionally or alternately to step 210, optionally the method 200 may further comprise a step 212 which may comprise determining, with the computer processor 23, 24, 27, that the determined image-capture distance 47 is outside of a predetermined range 51 of image-capture distances 47 from the roof of the structure 21; moving the unmanned aircraft 18 into the predetermined range 51 of image-capture distances 47; and capturing, with the camera 19 on the unmanned aircraft 18, one or more images 62 of the roof of the structure 21 from the predetermined range 51 of image-capture distances 47.

In one embodiment, steps 206 and 208 and/or 210 may be repeated at a plurality of waypoints in the flightpath of the unmanned aircraft 18 and/or at other points in the flightpath of the unmanned aircraft 18.

Referring to any one or more of the methods described herein, in one embodiment, the methods 100, 150, 200 may further comprise receiving GPS location information regarding the geographic location of the unmanned aircraft 18 based on a Global Positioning System (GPS). However, the GPS location information may be inaccurate, as GPS location information for unmanned aircraft 18 may have an error of plus or minus five feet from the actual location of the unmanned aircraft 18. In one embodiment, The GPS location information may be used as a starting point for the unmanned aircraft 18 in relation to the location of the structure 21. The method 100 may then use the first sensor reading and/or the second sensor reading indicative of first and/or second distance to the roof and real world coordinates of the roof (which can be obtained from a three dimensional model having real world coordinates of portions of the roof) to adjust the GPS location information to obtain the actual location of the unmanned aircraft 18. The adjusted GPS location information can then be used to navigate the unmanned aircraft 18.

The desired angle 53 of the line of sight (also referred to as the field of view) from the camera 19 in relation to the plane of the roof may be any angle that produces images 62 of the roof (see FIG. 19). In one embodiment, the desired angle 53 is substantially perpendicular to the surface to capture images 62 substantially perpendicular to the surface. The term "substantially perpendicular" as used herein means within the tolerances of the unmanned aircraft 18, gimbal (where used), and camera 19, and is preferably within the range of approximately eighty-seven to approximately ninety-three degrees as measured from a line or plane defined on the surface. In one embodiment, the desired angle 53 may be based on a type of condition of the roof to be assessed. For example, if the condition of the roof to be assessed is the amount and/or nature of hail damage, then the desired angle 53 may be in a range less than or more than ninety degrees. Such an oblique angle in relation to the roof may allow the images 62 to capture the hail damage more precisely, due to the nature of shadows interacting with the indentations in the roof caused by the hail.

In one embodiment, the methods 100, 150, 200 may further comprise associating the determined image-capture distance 47 with the one or more images 62, such as image metadata.

Additionally, in one embodiment, the predetermined image-capture distance range may be between approximately four feet and approximately fifteen feet. In one embodiment, the predetermined image-capture distance range may be within a range from two to twenty feet, and more preferably from eight to twelve feet. In one embodiment, the predetermined image-capture distance range may be within a range from five to twelve feet. The desired image-capture distance 47 may depend upon a variety of factors including a desired resolution of the roof, and a sensor size of the camera 19.

In one embodiment, the one or more sensor 17 may comprise two or more sensors 17.

In one embodiment, one or more of the methods 100, 150, 200 may further comprise receiving, by the computer processor 23, 24, 27, one or more additional sensor reading from the one or more sensor 17 on the unmanned aircraft 18 at one or more additional positions of the unmanned aircraft 18, indicative of additional distances between the unmanned aircraft 18 and the roof of the structure 21. In one embodiment, the computer processor 23, 24, 27 may determine the location of one or more of the ridge of the roof, the eaves of the roof, and the gutter of the roof by comparing the first distance 41 or the second distance 43 to the additional distances based on the magnitude of change between the first or second distance 41, 43 and the next one of the additional distances.

For example, if the first distance 41 when the unmanned aircraft is at a first position is determined to be five feet from the sensor 17 to the roof, but the next additional distance when the unmanned aircraft is at a second position is determined to be twenty feet from the sensor, then the computer processor 23, 24, 27 may determine that the sensor 17 is no longer reading the distance to the roof, but rather to some location beyond the ridge or eave of the roof. The computer processor 23, 24, 27 may thereby determine the location of the ridge or the eave based on the position of the sensor reading and the first and/or second position of the unmanned aircraft 18. Additional sensor readings may be taken to improve the accuracy of the location.

Figure 14:
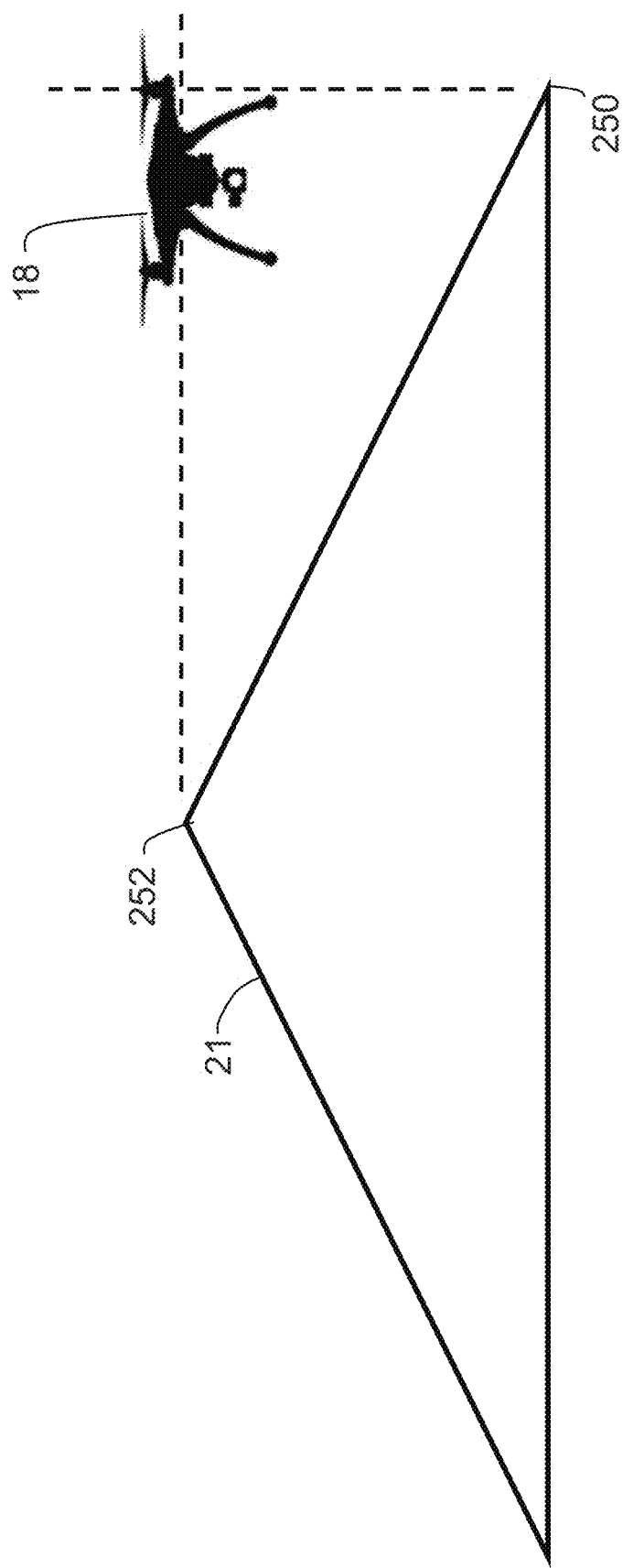
FIG. 14 is an illustration of portions of a method for navigating an unmanned aircraft using pitch of a roof in accordance with the instant disclosure.

For exemplary purposes, the methods 150, 200 for navigating the unmanned aircraft 18 using pitch will now be described. Referring now to FIG. 14, in one embodiment, an operator may instruct the unmanned aircraft 18 to move to a position in relation to the roof of the structure 21 above and ahead of a gutter or eave 250 of the roof and below a ridgeline 252 of the roof, such that the one or more of the sensor(s) 17 of the unmanned aircraft 18 are aligned to detect the roof.

Figure 15:
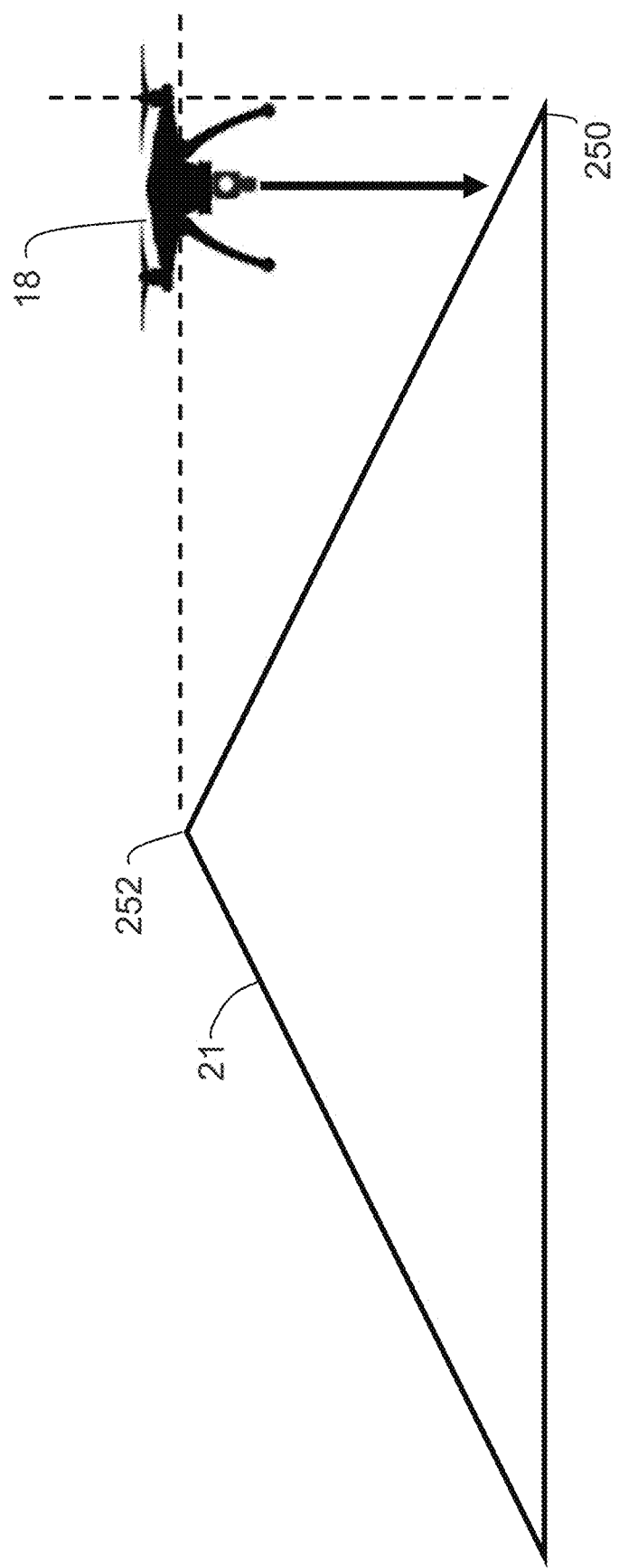
FIG. 15 is an illustration of portions of a method for navigating an unmanned aircraft using pitch of a roof in accordance with the instant disclosure.
Figure 16:
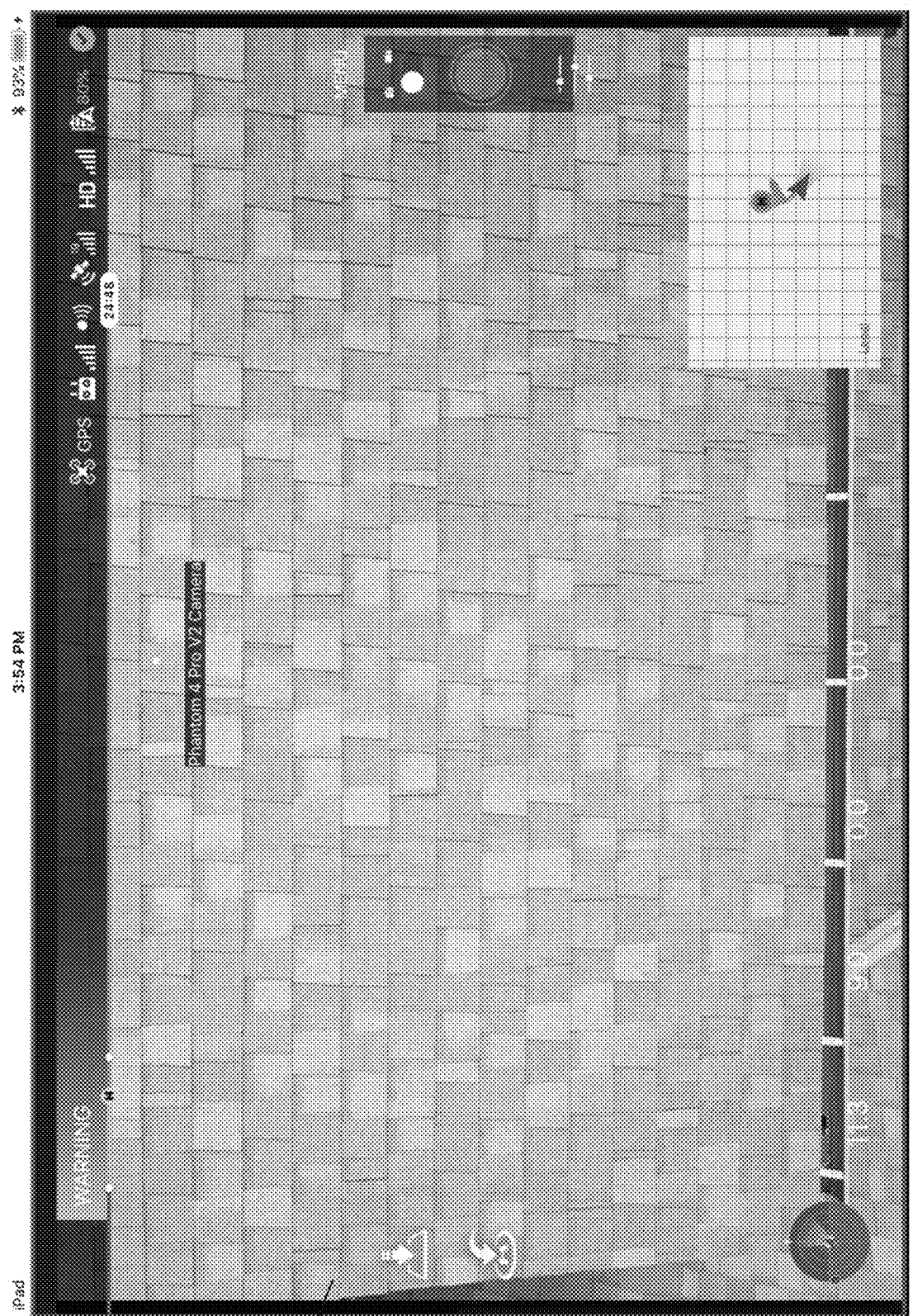
FIG. 16 is an exemplary screen shot of a display in a system for navigating an unmanned aircraft using pitch of a roof in accordance with the instant disclosure.

In one embodiment, optionally, the operator may calibrate the unmanned aircraft 18 to confirm the correct position in relation to the roof. For example, as shown in FIG. 15, the unmanned aircraft 18 may point the camera 19 downward in relation to the unmanned aircraft 18 (for example, by activating a gimbal attached to the camera 19) and activate the camera 19 (or activate a downwards-facing camera 19). The image captured by the camera 19 may be used to confirm that the unmanned aircraft 18 is positioned above the roof and at or past the eave 250 toward the ridgeline 252. FIG. 16 illustrates an exemplary image 62 of the roof captured from a downward facing camera 19 in such a position.

Figure 17:
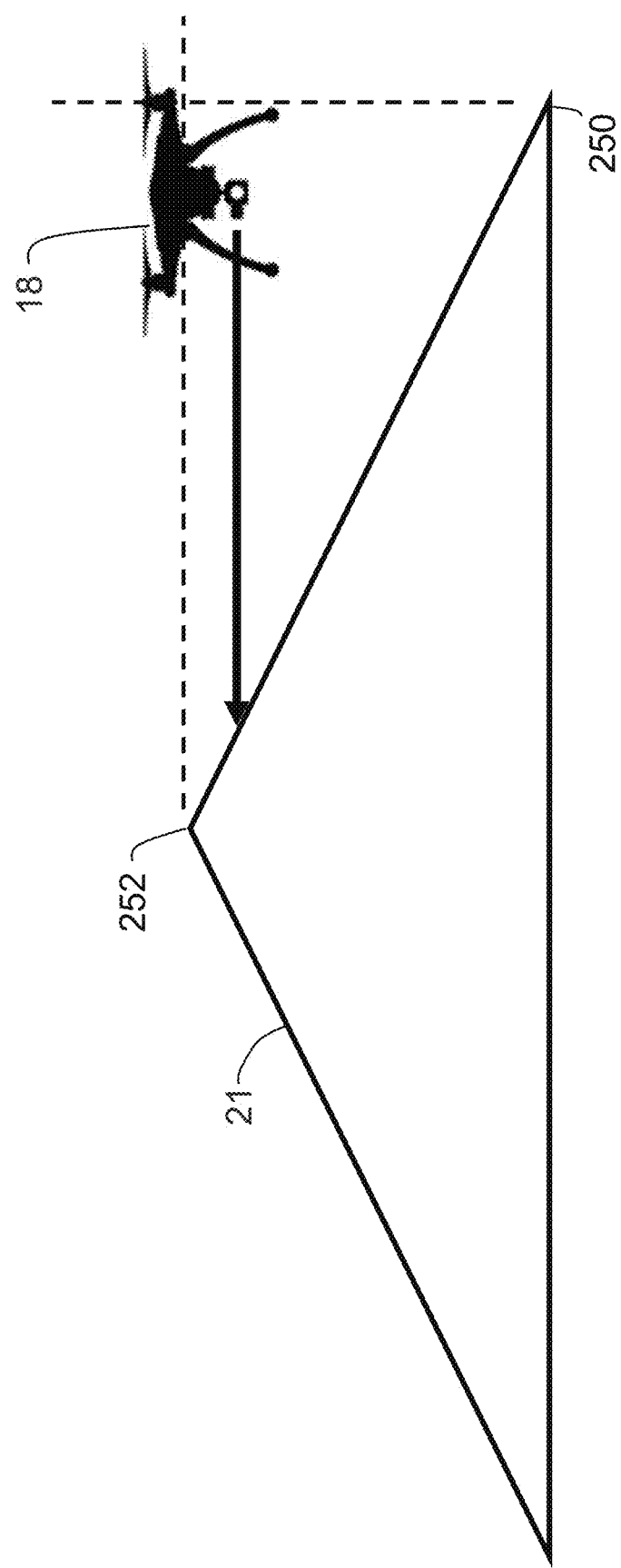
FIG. 17 is an illustration of portions of a method for navigating an unmanned aircraft using pitch of a roof in accordance with the instant disclosure.
Figure 18:
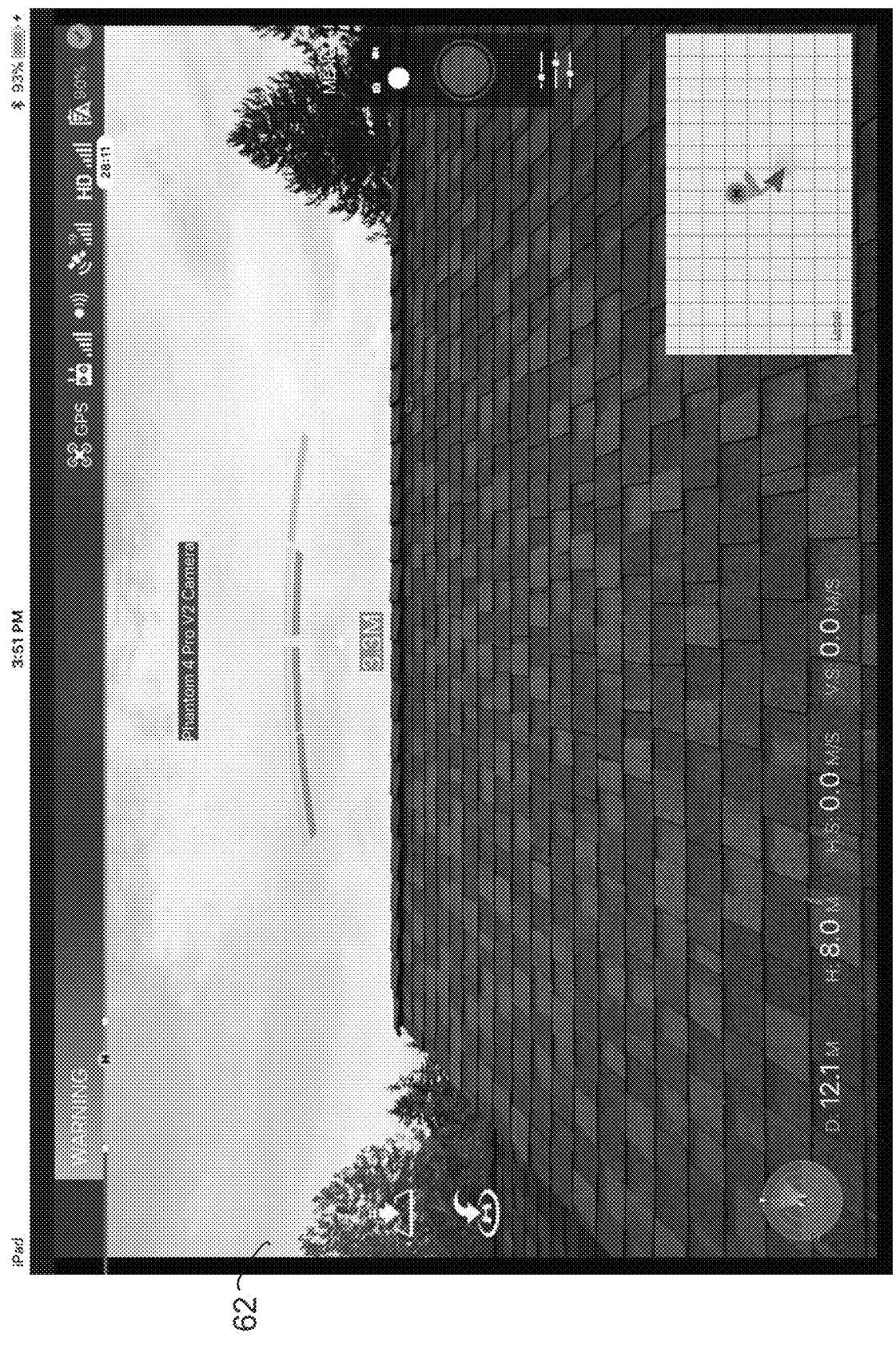
FIG. 18 is an exemplary screen shot of a display in a system for navigating an unmanned aircraft using pitch of a roof in accordance with the instant disclosure

Additionally, or alternatively, as shown in FIG. 17, the unmanned aircraft 18 may point the camera 19 forward (toward the roof) in relation to the unmanned aircraft 18 (for example, by activating a gimbal attached to the camera 19) and activate the camera 19 (or activate a forwards-facing camera 19). The image captured by the camera 19 may be used to confirm that the unmanned aircraft 18 (or at least the camera 19) is positioned at least partially below the ridgeline 252 of the roof. FIG. 18 illustrates an exemplary image 62 of the roof captured from a forwards-facing camera 19 in such a position.

In one embodiment, as illustrated in FIG. 19, the unmanned aircraft 18 may utilize a first sensor 17a or a first sensor direction (such as a "forward-facing" sensor in relation to the direction of flight of the unmanned aircraft 18) to detect a first distance 41 from the unmanned aircraft 18 to the roof of the structure 21. Optionally, in one embodiment, as illustrated in FIGS. 15-16, an image 62 of the roof may be displayed to the operator to confirm that the first sensor 17a is aligned to detect the roof.

In one embodiment, as illustrated in FIG. 19, the unmanned aircraft 18 may utilize a second sensor 17b or a second sensor direction (such as a "downward-facing" sensor in relation to the direction of flight of the unmanned aircraft 18) to detect a second distance 43 from the unmanned aircraft 18 to the roof of the structure 21. Optionally, in one embodiment, as illustrated in FIGS. 17-18, an image 62 of the roof may be displayed to the operator to confirm that the second sensor 17 is aligned to detect the roof.

In one embodiment, the unmanned aircraft 18 and/or the host system 12 may use the first distance 41 and the second distance 43 from the unmanned aircraft 18 to the roof, along with a known angle 39 between the first sensor 17 and the line of sight of the second sensor 17, to determine a pitch 49 of the roof, such as in FIG. 19. In one embodiment, the pitch 49 may be known or provided from previous calculations, model(s), or other data sources as discussed herein. Optionally, in one embodiment, the pitch 49 of the roof may be displayed to the operator. In the example shown in FIG. 19, the pitch 49 has a value of 4.5/12 (or 20.6 degrees).

In one embodiment, the angle 53 of the line of sight of the camera 19 may be adjusted to (or verified to be orientated to) a desired angle 53 based on the pitch 49 of the roof. For example, as shown in FIG. 19, the camera angle 53 may be adjusted to be substantially perpendicular to the roof to capture images 62 substantially perpendicular to the plane of the roof. The angle 53 of the line of sight of the camera 19 may be adjusted to more or less than ninety degrees in relation to the plane of the roof. The angle 53 of the line of sight of the camera 19 may be adjusted by adjusting a gimbal to which the camera 19 may be mounted on the unmanned aircraft 18 and/or by changing a yaw, pitch and/or roll of the unmanned aircraft 18.

The waypoints of the flight path 70 of the unmanned aircraft 18 at which the camera 19 captures images 62 (and/or the flight path 70 itself) may be determined and/or adjusted based on the pitch 49 of the roof. The waypoints of the flight path 70 and/or the flight path 70 may be determined and/or adjusted such that the unmanned aircraft 18 captures images 62 at the waypoints at a consistent image-capture distance from the roof, which produces images 62 of consistent resolution when the other parameters of the camera 19 remain the same. The consistent resolution across images 62 taken at multiple waypoints may be utilized in comparison and/or measurement and/or assessment of the contents of the images 62, such as when assessing condition of and/or damage to the roof.

The image-capture distance 47 to the roof from the camera 19 on the unmanned aircraft 18 may be determined, as previously described in relation to the methods 100, 150, 200.

Figure 20:
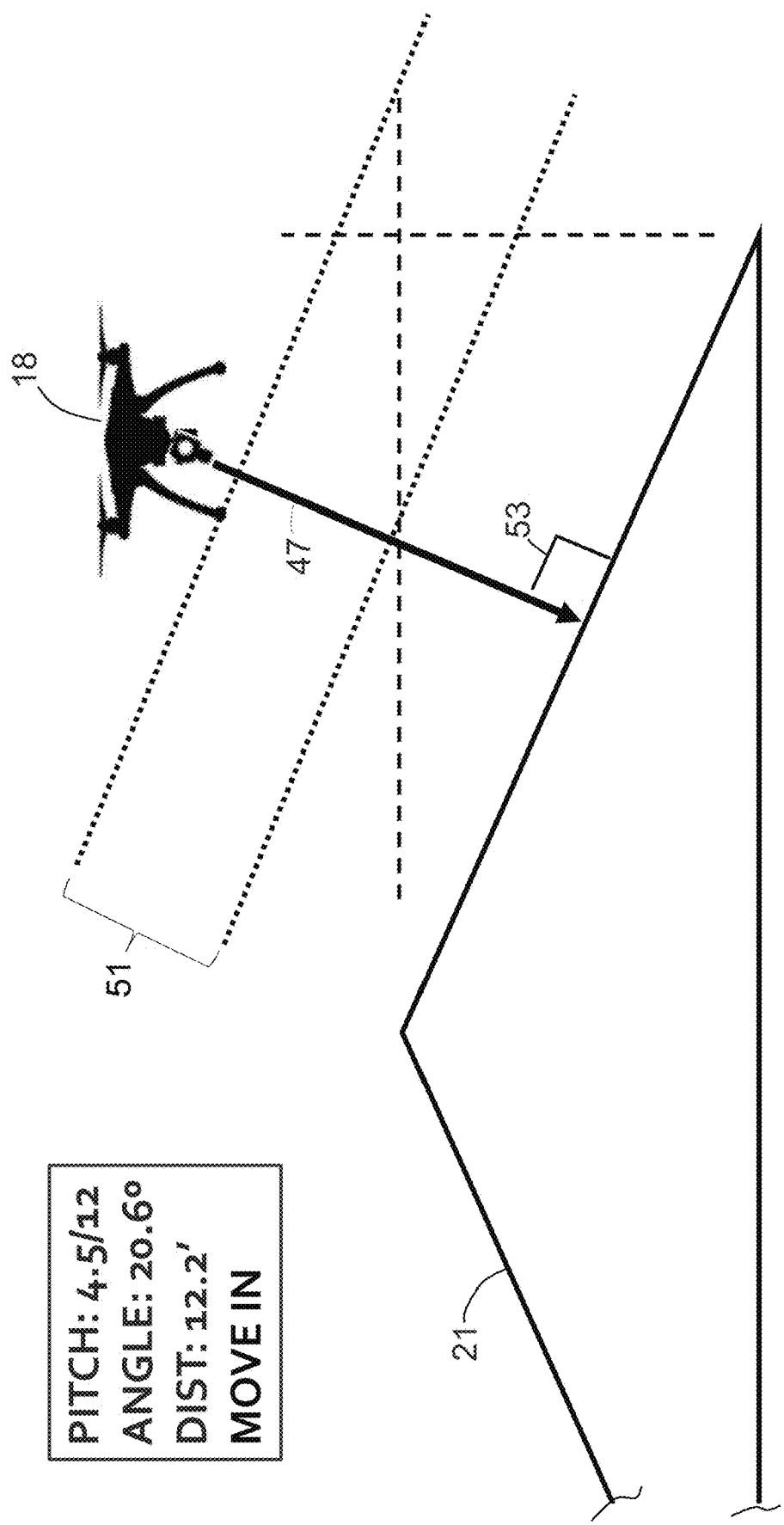
FIG. 20 is an illustration of portions of a method for navigating an unmanned aircraft using pitch of a roof in accordance with the instant disclosure.
Figure 21:
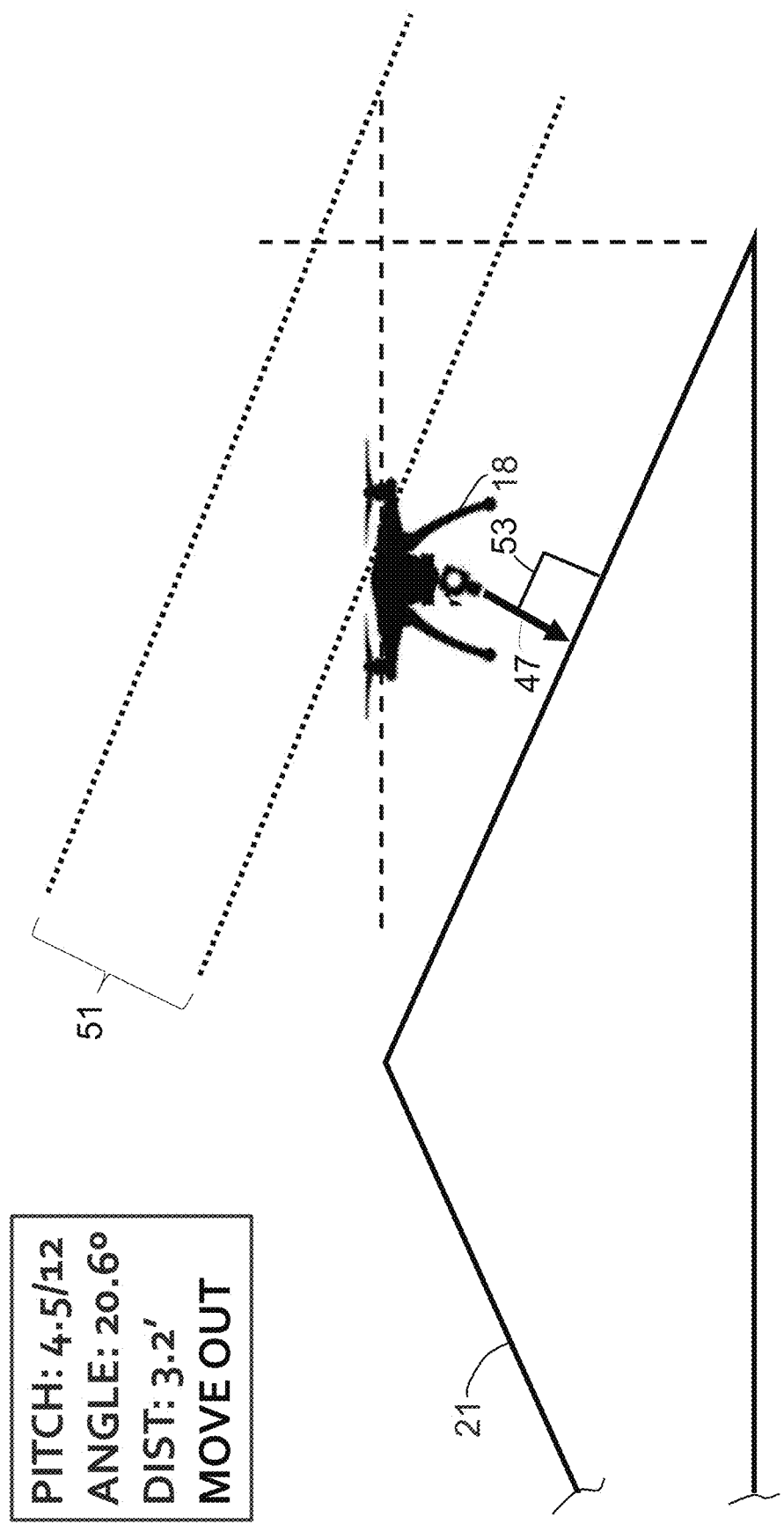
FIG. 21 is an illustration of portions of a method for navigating an unmanned aircraft using pitch of a roof in accordance with the instant disclosure.

In one embodiment, as shown in FIGS. 20, 21, and 28, the image-capture distance 47 to the roof may be displayed to the operator, such as on the user terminal 14. In one embodiment, the image-capture distance 47 may be shown in visual graphics in relation to a graphical indication of the desired image-capture distance range 51. For example, parallel lines that are parallel to a roof plane may be displayed on the user terminal 14 to indicate the desired image-capture distance range 51 and/or the location of the unmanned aircraft 18 in relation to the image-capture distance range 51 and/or the roof. Optionally, the operator may be prompted to move the unmanned aircraft 18 into the predetermined desired range 51. In the example shown in FIG. 20, the display may show that the unmanned aircraft 18 is at a distance of 12.2' from the roof and the operator may be prompted to move towards the roof into the predetermined desired range 51. In the example shown in FIG. 22, the display may show that the unmanned aircraft 18 is at a distance of 3.2' from the roof and the operator may be prompted to move away from the roof into the predetermined desired range 51.

Figure 22:
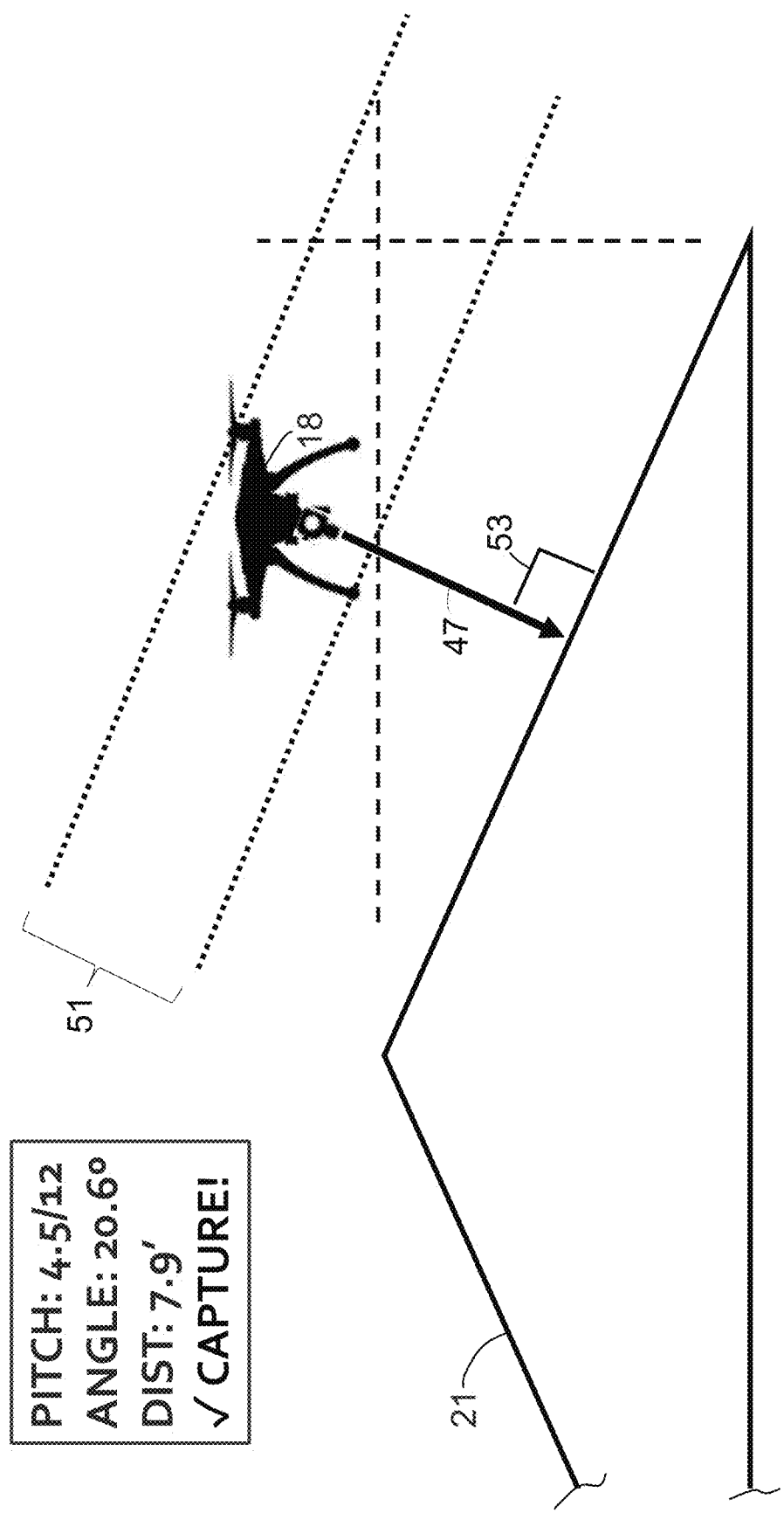
FIG. 22 is an illustration of portions of a method for navigating an unmanned aircraft using pitch of a roof in accordance with the instant disclosure.
Figure 23:
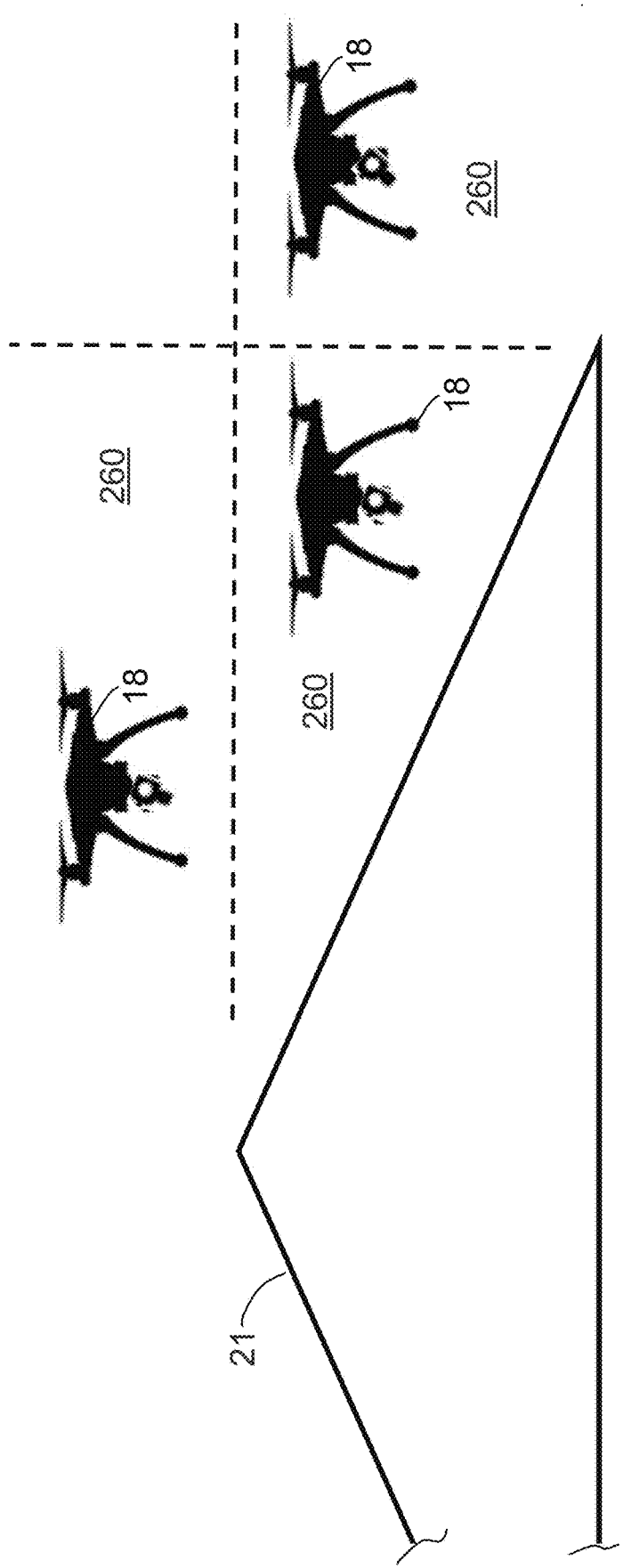
FIG. 23 is an illustration of portions of a method for navigating an unmanned aircraft using pitch of a roof in accordance with the instant disclosure.
Figure 24:
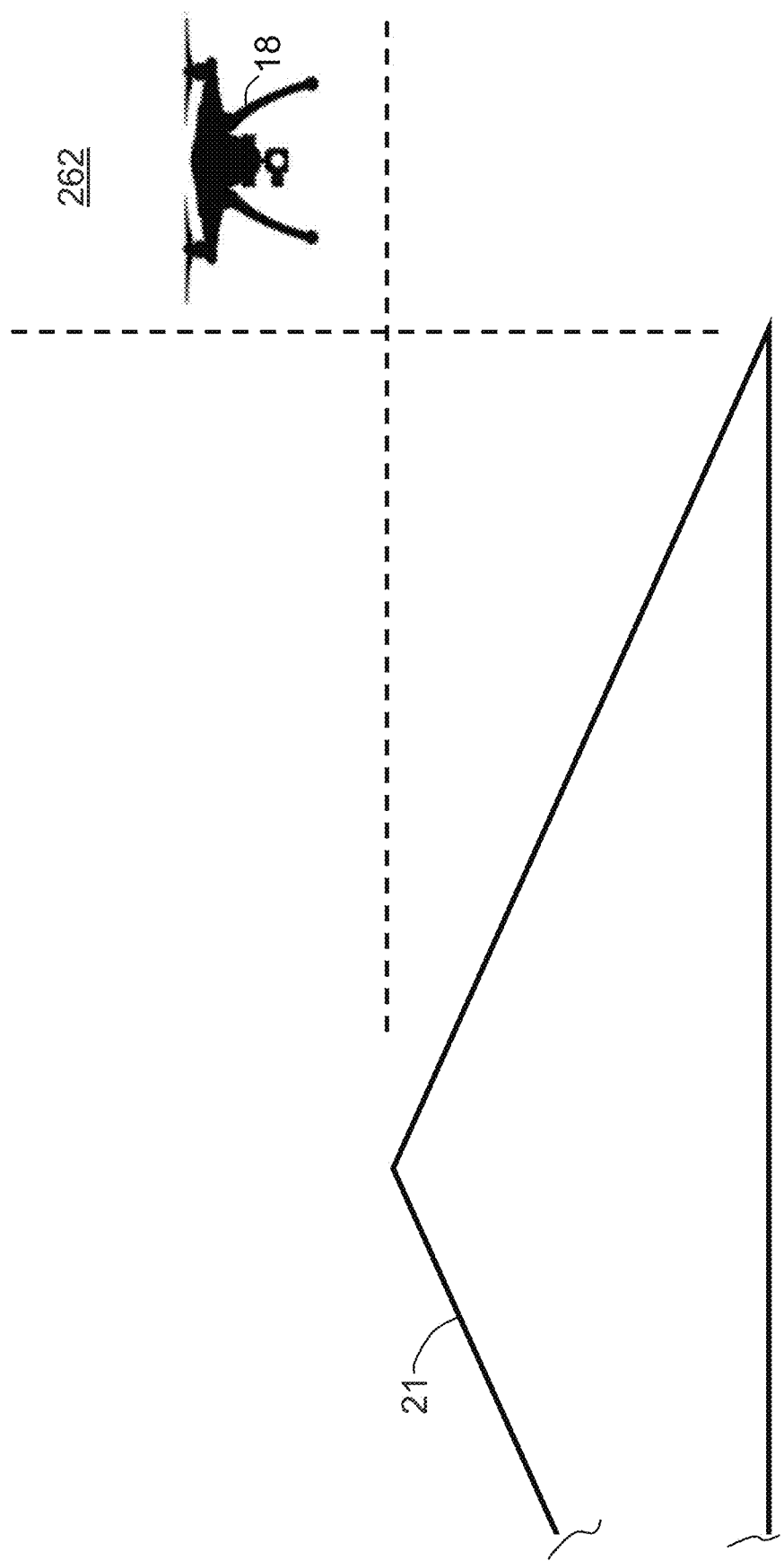
FIG. 24 is an illustration of portions of a method for navigating an unmanned aircraft using pitch of a roof in accordance with the instant disclosure.

In one embodiment, as shown in FIG. 22, the operator may send to, and the unmanned aircraft 18 may receive, a command with instructions to move the unmanned aircraft 18 into the predetermined desired range 51 of image-capture distances 47 from the roof of the structure 21. The operator may navigate the unmanned aircraft 18 into the predetermined desired range 51. The camera 19 on the unmanned aircraft 18, may then capture one or more images 62 of the roof of the structure 21 from the predetermined desired range 51 of image-capture distances 47.

In one embodiment, additionally or alternately, the computer processor 23, 24, 27, may determine that the determined image-capture distance 47 is outside of a predetermined range 51 of image-capture distances 47 from the roof of the structure 21. Then the computer processor 23, 24, 27 may automatically move the unmanned aircraft 18 into the predetermined range 51 of image-capture distances 47, without operator involvement. The unmanned aircraft 18 may then capture, with the camera 19 on the unmanned aircraft 18, one or more images 62 of the roof of the structure 21 from the predetermined range 51 of image-capture distances 47.

In one embodiment, as shown in FIGS. 23-26, the methods 150, 200 may be most effective when the unmanned aircraft 18 is positioned in one or more "working zone" 260 that allows the one or more sensors 17 to obtain the first distance 41 and the second distance 43 to the roof. The location of the working zone 260 may vary depending on the angle of the sensors 17 in relation to the unmanned aircraft 18, one another (i.e., the known angle 39), and/or the roof. The working zone 260 may also be dependent on the type of and/or power of the sensors 17. Correspondingly, the methods 150, 200 may be less effective when the unmanned aircraft 18 is positioned in one or more "dead zone" 262 where it may be more difficult, or less precise, or not viable, for the one or more sensors 17 to obtain the first distance 41 and the second distance 43 to the roof.

The computer processor 23, 24, 27, may receive one or more additional sensor reading from the one or more sensor 17 on the unmanned aircraft 18 at one or more additional positions of the unmanned aircraft 18, indicative of additional distances between the unmanned aircraft 18 and the roof of the structure 21. In one embodiment, the computer processor 23, 24, 27 may determine the location of one or more of the ridge 252 of the roof, the eaves 252 of the roof, and the gutter of the roof by comparing the first distance 41 or the second distance 43 to the additional distances based on the magnitude of change between the first distance 41 or the second distance 43 and the next one of the additional distances.

Figure 27:
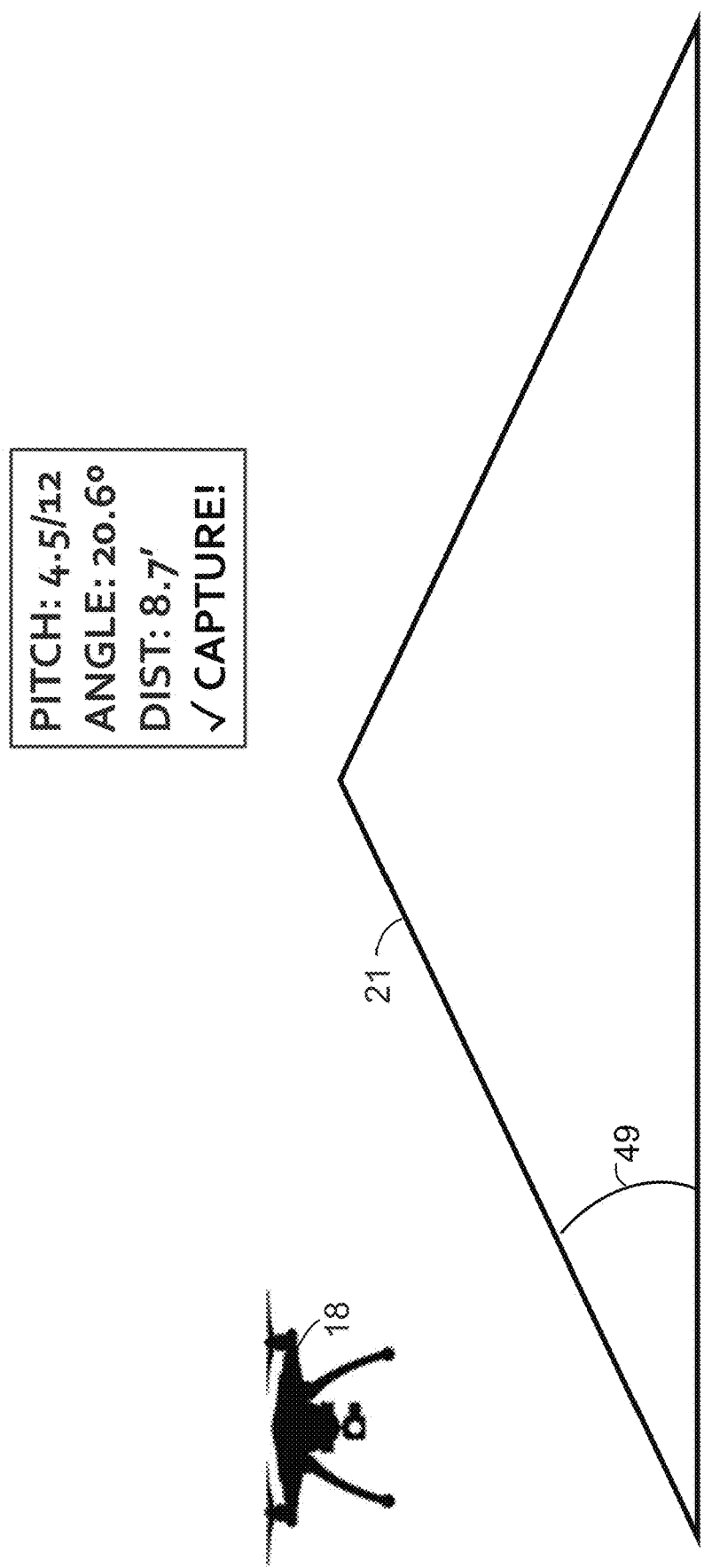
FIG. 27 is an illustration of portions of a method for navigating an unmanned aircraft using pitch of a roof in accordance with the instant disclosure.

In one embodiment, as illustrated in FIG. 27, the methods 150, 200 may be repeated for additional sections of the roof. If the pitch 49 is the same for a first section and a second section of the roof, then pitch 49 may not be determined for the second section. Rather, the known pitch 49 may be used for the second section.

FIG. 28 is an exemplary screen shot 300 of a display resulting from one or more of the methods described herein. The display may include one or more of the following: one or more of the image 62 taken from the camera 19 on the unmanned aircraft 18, the image-capture distance 47 from the camera 19 to the roof, the pitch 49 of the roof, the distance(s) from the sensor(s) 17 to the roof, the location of the unmanned aircraft 18 on a geographical map in relation to the roof and/or the structure 21, visual warning indicators (such as bars, colors, text, graphics, etc.) indicative of the location of the camera 19 in relation to the predetermined image-capture range 51, and navigation control indicators for the unmanned aircraft 18.

In one embodiment, the host system 12 and/or the operator may use the three-dimensional model of the structure 21 from the structure shape database 35 (such as a three-dimensional model created from one or more images) to create all or part of a flight path 70 for the unmanned aircraft 18 and/or waypoints for capturing images 62 of the structure 21 with the camera(s) 19 of the unmanned aircraft 18. In this embodiment, the three-dimensional model may include a pitch value for each facet of a roof. The pitch values may then be used to determine the desired angle 53 of the camera 19 in relation to the plane of the roof, and/or to determine distance from the camera 19 to the roof, to capture images 62 at a consistent distance from the roof (such as within the pre-determined desired image-capture distance range).

In one embodiment, an operator may navigate the unmanned aircraft 18 to a starting point for the flight path based on a detected distance to the structure 21 from the one or more sensors 17 of the unmanned aircraft 18. In one embodiment, the one or more sensors 17 and/or camera(s) 19 of the unmanned aircraft 18 may be used to determine a feature of the structure 21 that may be used to match to the three-dimensional model (or other information from the structure shape database 35) in order to determine a starting point for the flight path 70 of the unmanned aircraft 18. The unmanned aircraft 18 may determine and/or maintain a specific pre-determined image-capture distance 47 from the structure 21 using one or more of the three-dimensional model and information from the one or more sensors 17.

In use, in one embodiment, a method of navigating an unmanned aircraft 18, may comprise a step of receiving, by the unmanned aircraft 18, a flight path 70 for the unmanned aircraft 18 in relation to the structure 21 for capturing one or more images 62 of the structure 21, wherein the flight path 70 may be based on pitch values 49 and real-world coordinates of a three-dimensional model of the structure 21 (such as from the structure shape database 35). In one embodiment, the three-dimensional model of the structure 21 may be based on one or more aerial images 62 of the structure 21 and/or on one or more point clouds comprising data points of the structure 21 (such as from the structure shape database 35). The flight path 70 may include a plurality of waypoints positioned the consistent distance from the surface of the structure 21.

The method may further comprise navigating, by an operator, the unmanned aircraft 18 to a location in relation to an actual point of the structure 21 matching a model point of the three-dimensional model of the structure 21. The method may comprise navigating, by the unmanned aircraft 18, the flight path 70. The method may further comprise capturing images 62 of the structure 21 with one or more cameras 19 on the unmanned aircraft 18 while navigating the flight path 70. In one embodiment, the one or more images 62 of the surface of the structure 21 may be captured at an angle 53 perpendicular to the surface of the structure 21, though other angles 53 may be used.

In one embodiment, the flight path 70 may be parallel to the plane of the roof of the structure 21, based on the three-dimensional model of the structure 21 to maintain a substantially consistent image-capture distance 47 between the roof of the structure 21 and the unmanned aircraft 18. The flight path 70 may be substantially within, and/or adjusted to be substantially within the predetermined range 51 of image-capture distances 47 from the roof.

Once the flight path 70 has been completed, the flight management system may instruct the unmanned aircraft 18 to return to its launch point and land. The operator may remove any detachable storage or otherwise transfer the images 62 from the onboard memory storage to a removable memory storage system or transfer the imagery via some form of network or communications link. The resulting images 62 may then be used by the user terminal 14 and/or the host system 12, such as to produce a structure and damage report. Systems for producing a structure and/or damage report are described in U.S. Pat. Nos. 8,078,436; 8,145,578; 8,170,840; 8,209,152; 8,401,222, and a patent application identified by U.S. Ser. No. 12/909,962, the entire content of all of which are hereby incorporated herein by reference. The completed report may then be provided to the operator and/or other user.

In some embodiments, additional data sets may be included within the structure report 78. For example, data sets may include, but are not limited to, weather data, insurance/valuation data, census data, school district data, real estate data, and the like.

Weather data sets may be provided by one or more databases storing information associated with weather (e.g., inclement weather). A weather data set within the structure report 78 may include, but is not limited to, hail history information and/or location, wind data, severe thunderstorm data, hurricane data, tornado data, and/or the like. In some embodiments, the one or more databases providing weather information may be hosted by a separate system (e.g., LiveHailMap.com) and provide information to the host system 12.

Insurance and/or valuation data sets may be provided by one or more databases storing information associated with housing insurance and/or valuation. An insurance and/or valuation data set may include, but is not limited to, insured value of the home, insurance premium amount, type of residence (e.g., multi-family, single family), number of floors (e.g., multi-floor, single-floor), building type, and/or the like. In some embodiments, the one or more databases may be hosted by a separate system (e.g., Bluebook, MSB, 360Value) and provide information to the host system 12.

The insurance and/or valuation data set may be included within the structure report 78 and provided to the user. For example, during underwriting of a home, an insurance company may be able to request the structure report 78 on a home that is recently purchased. The information within the structure report 78 may be integrated with insurance information provided by an insurance database and used to form a quote report. The quote report may be sent to the user and/or insurance company. Alternatively, the structure report 78 may be solely sent to the insurance company with the insurance company using the information to formulate a quote.

Figure 10:
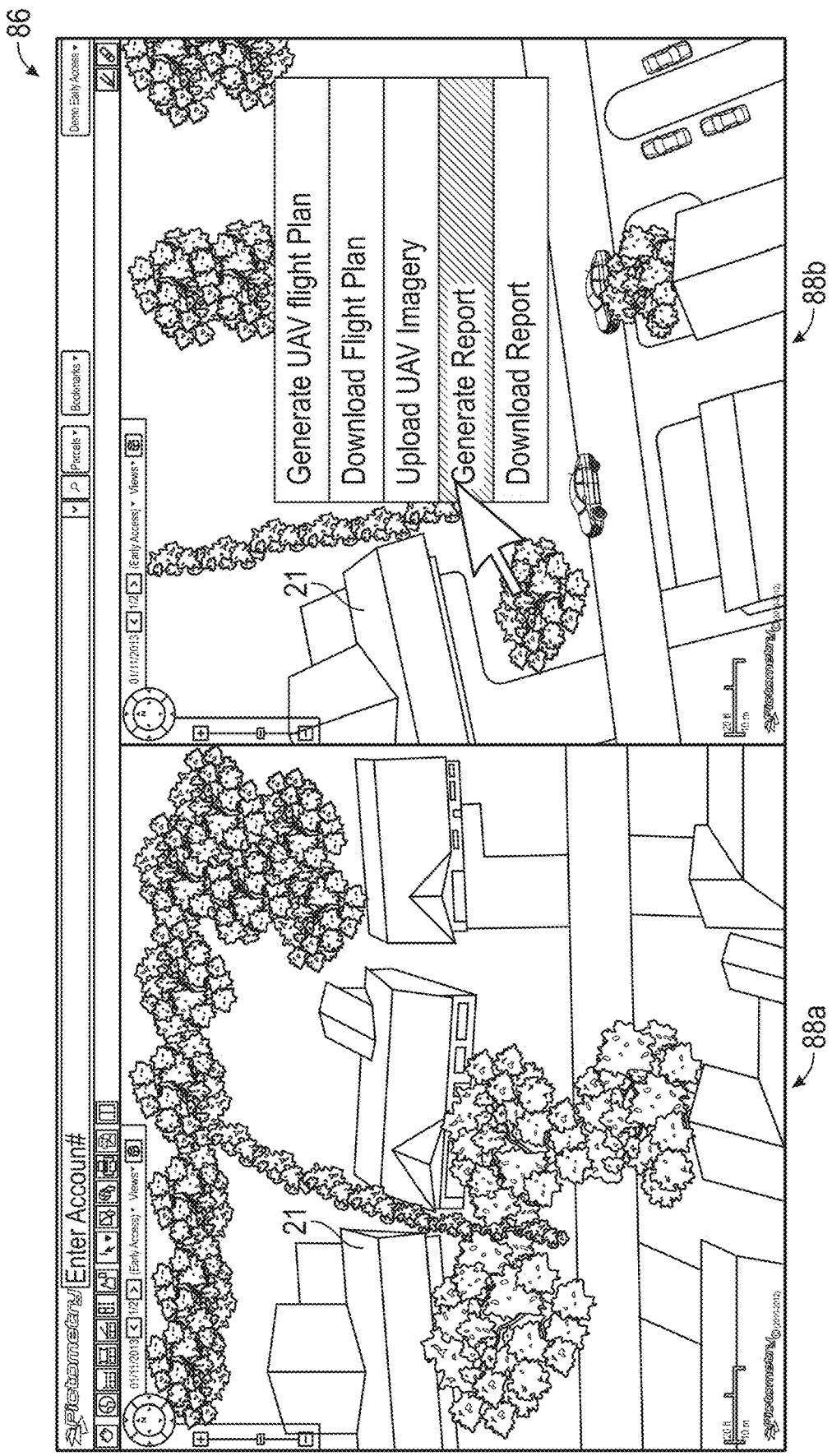
FIG. 10 is an exemplary screen shot of two oblique images of a structure, each oblique image showing the structure at a distinct time period.

In another example, the structure report 78 may be used in an insurance claim. In the case of a catastrophe of a customer, one or more databases may be used to provide an insurance dataset with claim information in the structure report 78. For example, an insurance database having a policy in force (PIF) and a weather database may be used to correlate information regarding an insurance claim for a particular roof. This information may be provided within the structure report 78. Additionally, in the case of loss or substantial alterations to the structure 21, multiple images 62 may be provided within the structure report 78 showing the structure 21 at different time periods (e.g., before loss, after loss). For example, FIG. 10 illustrates an exemplary screen shot 86 of the structure 21 having with an image 88*a* captured at a first time period (e.g., before loss), and an image 88*b* captured at a second time period (e.g., after loss).

Real estate and/or census data sets may also be including within structure report 78. The real estate and/or census data sets may be provided by one or more databases having detailed information of a home. For example, a real estate data set may include, but is not limited to, the homeowner's name, the purchase price of the home, number of times the home has been on the market, the number of days the home has been on the market, the lot size, and/or the like. The census data set may include information concerning the number of residents within the home. In some embodiments, the one or more databases may be hosted by a separate system (e.g., Core Logic) and provide information to the host system 12 to provide data sets as described herein.

Other services related to structure may be provided within the structure report 78. For example, using the square footage of the roofing footprint, a price quote may be generated on the cost of insulation for the roof (e.g., energy efficiency, insulation replacement, and the like). Additionally, audits may be performed using information within one or more databases. For example, using the roofing area of a structure, historically paid insurance claims for comparables, and validation of payment for a specific claim for the home, a comparison may be made to determine whether the service payment for the specific claim was within a certain threshold. Auditing, it should be understood, may be applied to other areas as described herein as well.

Although the images of residential structures are shown herein, it should be noted that the systems and methods in the present disclosure may be applied to any residential and/or commercial building or structure. Further, the systems and methods in the present disclosure may be applied to any man-made structure and/or naturally occurring structure.

From the above description, it is clear that the inventive concept(s) disclosed herein is well adapted to carry out the objects and to attain the advantages mentioned herein as well as those inherent in the inventive concept(s) disclosed herein. While presently preferred embodiments of the inventive concept(s) disclosed herein have been described for purposed of this disclosure, it will be understood that numerous changes may be made which will readily suggest themselves to those skilled in the art and which are accomplished within the scope and spirit of the inventive concept(s) disclosed herein and defined by the appended claims.

What is claimed is:

1. A system, comprising:
   one or more computer processors; and
   one or more non-transitory computer readable medium storing computer executable code that when executed by the one or more computer processors cause the one or more computer processors to:

receive a first sensor reading from one or more sensors on an unmanned aircraft at a first position indicative of a first distance between the unmanned aircraft and a roof of a structure;

receive a second sensor reading from the one or more sensors on the unmanned aircraft at the first position indicative of a second distance between the unmanned aircraft and the roof of the structure, wherein a second line along the second distance of the second sensor reading is at a known angle from a first line along the first distance of the first sensor reading;

determine a pitch of the roof using the first distance, the second distance, and the known angle;

determine a desired resolution for oblique images to be captured by a camera on the unmanned aircraft, the camera having camera parameters including focal length;

determine a swath width based on at least the desired resolution of the oblique images to be captured by the camera and a camera sensor size, the swath width indicative of a width of a portion of the structure for the camera to capture in each of the oblique images in a single pass of the structure by the unmanned aircraft;

determine a lateral offset and a vertical offset of the camera on the unmanned aircraft from the structure that achieves the desired resolution of the oblique images to be captured by the camera based on the camera parameters and the swath width;

move the unmanned aircraft into a predetermined range of image-capture distances based on the determined lateral offset and the determined vertical offset from the structure that achieves the desired resolution of oblique images captured by the camera;

orientate the camera on the unmanned aircraft to capture a field of view of the roof at a desired oblique angle in relation to a plane of the roof, based on the pitch of the roof;

determine a flight path for the unmanned aircraft about the structure at the predetermined range of image-capture distances and determine locations in the flight path from which to capture one or more oblique images of the roof of the structure with the camera, based on a size of a sensor of the camera, the desired resolution of the oblique images captured by the camera, and a desired overlap of the oblique images; and capture, with the camera on the unmanned aircraft, the one or more oblique images of the roof of the structure, the one or more oblique images having the desired resolution.

2. The system of claim 1, wherein the one or more sensors comprises two or more sensors.

3. The system of claim 1, wherein the computer executable code that when executed by the one or more computer processors further causes the one or more computer processors to:

determine, utilizing one or more of the first sensor and the second sensor on the unmanned aircraft, one or more third distances between the unmanned aircraft and a surface of the structure; and adjust navigation of the unmanned aircraft to maintain a consistent distance between the unmanned aircraft and the surface of the structure during navigation of a flight path of the unmanned aircraft based on the one or more third distances and the determined pitch of the surface of the structure.

4. The system of claim 1, wherein the desired oblique angle is an angle of forty degrees to fifty degrees in relation to the plane of the roof.

5. The system of claim 1, wherein the computer executable code that when executed by the one or more computer processors further causes the one or more computer processors to:

reduce the swath width by a buffer distance.

6. A method, comprising:

receiving, by a computer processor, a first sensor reading from one or more sensors on an unmanned aircraft at a first position indicative of a first distance between the unmanned aircraft and a roof of a structure;

receiving, by the computer processor, a second sensor reading from the one or more sensors on the unmanned aircraft at the first position indicative of a second distance between the unmanned aircraft and the roof of the structure, wherein a second line along the second sensor reading is at a known angle from a first line along the first distance of the first sensor reading; and determining, with the computer processor, a pitch of the roof using the first distance, the second distance, and the known angle;

determine a desired resolution for one or more oblique images to be captured by one or more cameras on the unmanned aircraft, the camera having camera parameters including focal length;

determining a swath width based on at least a desired resolution of the one or more oblique images to be captured by the one or more cameras and a sensor size of the one or more cameras, the swath width indicative of a width of a portion of the structure for the one or more cameras to capture in each of the one or more oblique images in a single pass of the structure by the unmanned aircraft;

determining a lateral offset and a vertical offset of the camera on the unmanned aircraft from the structure that achieves the desired resolution of the oblique images to be captured by the one or more cameras based on the camera parameters and the swath width;

moving the unmanned aircraft into a predetermined range of image-capture distances based on the determined lateral offset and the determined vertical offset from the structure that achieves the desired resolution of oblique images captured by the one or more cameras;

orientating one or more cameras on the unmanned aircraft to capture a field of view of the roof at a desired oblique angle in relation to a plane of the roof, based on the pitch of the roof;

determining a flight path for the unmanned aircraft about the structure at the predetermined range of image-capture distances and determine locations in the flight path from which to capture one or more oblique images of the roof of the structure with the one or more cameras, based on a size of a sensor of the one or more cameras, the desired resolution of the oblique images captured by the one or more cameras, and a desired overlap of the oblique images; and capturing, with the one or more cameras on the unmanned aircraft, the one or more oblique images of the roof of the structure, the one or more oblique images having the desired resolution.

7. A system, comprising:
one or more computer processors; and
one or more non-transitory computer readable medium storing computer executable code that when executed by the one or more computer processors cause the one or more computer processors to:
- receive a first sensor reading from one or more sensors on an unmanned aircraft at a first position indicative of a first distance between the unmanned aircraft and a roof of a structure;
- receive a second sensor reading from the one or more sensors on the unmanned aircraft at the first position indicative of a second distance between the unmanned aircraft and the roof of the structure, wherein a second line along the second distance of the second sensor reading is at a known angle from a first line along the first distance of the first sensor reading;
- determine a pitch of the roof using the first distance, the second distance, and the known angle;
- determine a desired resolution for oblique images to be captured by a camera on the unmanned aircraft, the camera having camera parameters including focal length;
- determine a swath width based on at least the desired resolution of the oblique images to be captured by the camera and a camera sensor size, the swath width indicative of a width of a portion of the structure for the camera to capture in each of the oblique images in a single pass of the structure by the unmanned aircraft;
- determine a lateral offset and a vertical offset of the camera on the unmanned aircraft from the structure that achieves the desired resolution of the oblique images to be captured by the camera based on the camera parameters and the swath width;
- move the unmanned aircraft into a predetermined range of image-capture distances based on the determined lateral offset and the determined vertical offset from the structure that achieves the desired resolution of oblique images captured by the camera;
- orientate the camera on the unmanned aircraft to capture a field of view of the roof at a desired oblique angle in relation to a plane of the roof, based on the pitch of the roof;
- capture, with the camera on the unmanned aircraft, one or more oblique images of the roof of the structure, the one or more oblique images having the desired resolution; and
- determine a plurality of target capture points based at least on the desired resolution multiplied by a number of pixels in a horizontal orientation of a sensor of the camera, the plurality of target capture points indicative of points along a flight path of the unmanned aircraft at which the camera captures the one or more oblique images of the roof of the structure.

8. The system of claim 7, wherein determining the plurality of target capture points is further based on a percentage of desired overlap between two or more of the one or more oblique images.

* * * * *

UNITED STATES PATENT AND TRADEMARK OFFICE
CERTIFICATE OF CORRECTION

| | | |
|---|---|---|
| PATENT NO. | : 12,332,660 B2 | Page 1 of 1 |
| APPLICATION NO. | : 16/691197 | |
| DATED | : June 17, 2025 | |
| INVENTOR(S) | : Frank D. Giuffrida et al. | |

It is certified that error appears in the above-identified patent and that said Letters Patent is hereby corrected as shown below:

In the Specification

Column 16, Line 44: Delete "pyrometers" and replace with -- gyrometers --

Signed and Sealed this
Second Day of September, 2025

Coke Morgan Stewart
*Acting Director of the United States Patent and Trademark Office*